United States Patent
Stephen et al.

(10) Patent No.: US 9,598,531 B2
(45) Date of Patent: Mar. 21, 2017

(54) OLEFIN METATHESIS CATALYST COMPOSITIONS COMPRISING AT LEAST TWO METAL CARBENE OLEFIN METATHESIS CATALYSTS

(71) Applicant: MATERIA, INC., Pasadena, CA (US)

(72) Inventors: Anthony R. Stephen, South Pasadena, CA (US); Christopher J. Cruce, Poway, CA (US); Michael A. Giardello, Pasadena, CA (US)

(73) Assignee: MATERIA, INC., Pasadena, CA (US)

( * ) Notice: Subject to any disclaimer, the term of this patent is extended or adjusted under 35 U.S.C. 154(b) by 0 days.

(21) Appl. No.: 14/843,448

(22) Filed: Sep. 2, 2015

(65) Prior Publication Data

US 2016/0185897 A1    Jun. 30, 2016

Related U.S. Application Data

(63) Continuation-in-part of application No. 14/192,552, filed on Feb. 27, 2014, now abandoned.
(Continued)

(51) Int. Cl.
*C08F 4/80* (2006.01)
*B01J 31/28* (2006.01)
(Continued)

(52) U.S. Cl.
CPC ........... *C08G 61/08* (2013.01); *C08F 4/80* (2013.01); *C08F 132/08* (2013.01); *B01J 31/28* (2013.01);
(Continued)

(58) Field of Classification Search
CPC ... C08F 32/06; C08F 32/00; C08F 4/80; B01J 31/28; B01J 2231/14; B01J 2231/54; B01J 2531/821
See application file for complete search history.

(56) References Cited

U.S. PATENT DOCUMENTS 2,887,472 A    5/1959 Fotis
3,906,026 A    9/1975 Nagase et al.
(Continued)

FOREIGN PATENT DOCUMENTS

CN    101090915 A    12/2007
CN    101980768 A    2/2011
(Continued)

OTHER PUBLICATIONS

Chevalier, P.M.; MacKinnon, I.A. J. Inorg. Organomet. Chem. 1999, 9, 151-164.*
(Continued)

*Primary Examiner* — Rip A Lee
(74) *Attorney, Agent, or Firm* — J.A. Lindeman & Co., PLLC

(57) ABSTRACT

This invention relates to olefin metathesis catalysts and methods for controlling olefin metathesis reactions. More particularly, the present invention relates to methods and compositions for catalyzing and controlling ring opening metathesis polymerization (ROMP) reactions and the manufacture of polymer articles via ROMP. This invention also relates to olefin metathesis catalyst compositions comprising at least two metal carbene olefin metathesis catalysts, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof. This invention also relates to a ROMP composition comprising a resin composition comprising at least one cyclic olefin, and an olefin metathesis catalyst composition comprising at least two metal carbene
(Continued)

olefin metathesis catalysts, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof. This invention also relates to a method of making an article comprising combining an olefin metathesis catalyst composition comprising at least two metal carbene olefin metathesis catalysts with a resin composition comprising at least one cyclic olefin, thereby forming a ROMP composition, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof. Polymer products produced via the metathesis reactions of the invention may be utilized for a wide range of materials and composite applications. The invention has utility in the fields of catalysis, organic synthesis, and polymer and materials chemistry and manufacture.

14 Claims, 3 Drawing Sheets

Related U.S. Application Data

(60) Provisional application No. 61/770,284, filed on Feb. 27, 2013, provisional application No. 61/799,827, filed on Mar. 15, 2013.

(51) Int. Cl.
*C08G 61/08* (2006.01)
*C08F 132/08* (2006.01)
*C08F 32/00* (2006.01)

(52) U.S. Cl.
CPC ........ *B01J 2231/14* (2013.01); *B01J 2231/54* (2013.01); *B01J 2531/821* (2013.01); *C08F 32/00* (2013.01); *C08G 2261/11* (2013.01); *C08G 2261/135* (2013.01); *C08G 2261/3325* (2013.01); *C08G 2261/418* (2013.01); *C08G 2261/76* (2013.01)

(56) References Cited

U.S. PATENT DOCUMENTS

| | | |
|---|---|---|
| 4,246,356 A | 1/1981 | Walmsley |
| 4,288,472 A | 9/1981 | Jorgensen |
| 4,696,985 A * | 9/1987 | Martin .......... C08G 61/08 526/119 |
| 4,902,560 A | 2/1990 | Silver |
| 4,990,549 A | 2/1991 | Delvin et al. |
| 5,055,499 A | 10/1991 | Endo et al. |
| 5,063,103 A | 11/1991 | Sugawara et al. |
| 5,096,644 A | 3/1992 | Endo et al. |
| 5,196,457 A | 3/1993 | Wilkinson et al. |
| 5,219,656 A | 6/1993 | Klett et al. |
| 5,266,665 A * | 11/1993 | Hardiman .......... C08G 61/08 428/403 |
| 5,268,232 A | 12/1993 | Khasat et al. |
| 5,312,940 A | 5/1994 | Grubbs et al. |
| 5,342,909 A | 8/1994 | Grubbs et al. |
| 5,428,098 A | 6/1995 | Brekner et al. |
| 5,728,785 A | 3/1998 | Grubbs et al. |
| 5,828,940 A | 10/1998 | Learman |
| 5,840,238 A | 11/1998 | Setiabudi et al. |
| 5,939,504 A * | 8/1999 | Woodson, Jr. .......... C08G 61/08 502/152 |
| 5,973,085 A | 10/1999 | Muhlebach et al. |
| 5,977,393 A | 11/1999 | Grubbs et al. |
| 6,001,909 A | 12/1999 | Setiabudi |
| 6,020,443 A | 2/2000 | Woodson et al. |
| 6,040,363 A | 3/2000 | Warner et al. |
| 6,107,420 A | 8/2000 | Grubbs et al. |
| 6,153,719 A | 11/2000 | Abbey et al. |
| 6,162,883 A | 12/2000 | Muhlebach et al. |
| 6,225,488 B1 * | 5/2001 | Mukerjee .......... B01J 31/2265 502/155 |
| 6,284,852 B1 * | 9/2001 | Lynn .......... B01J 31/04 525/269 |
| 6,310,121 B1 | 10/2001 | Woodson et al. |
| 6,409,875 B1 | 6/2002 | Giardello et al. |
| 6,436,476 B1 | 8/2002 | Sage, Jr. |
| 6,486,279 B2 | 11/2002 | Lynn et al. |
| 6,515,084 B2 | 2/2003 | Grubbs et al. |
| 6,525,125 B1 | 2/2003 | Giardello et al. |
| 6,552,139 B1 | 4/2003 | Herrmann et al. |
| 6,613,910 B2 | 9/2003 | Grubbs et al. |
| 6,620,955 B1 | 9/2003 | Pederson et al. |
| 6,635,768 B1 | 10/2003 | Herrmann et al. |
| 6,759,537 B2 | 7/2004 | Grubbs et al. |
| 6,787,620 B2 | 9/2004 | Herrmann et al. |
| RE38,676 E | 12/2004 | Grubbs et al. |
| 6,838,489 B2 | 1/2005 | Bell et al. |
| 6,890,650 B2 | 5/2005 | Hedden |
| 6,908,970 B2 | 6/2005 | Tsunogae et al. |
| 6,921,735 B2 | 7/2005 | Hoveyda et al. |
| 6,995,226 B2 | 2/2006 | Taguchi et al. |
| 7,026,495 B1 | 4/2006 | Pederson et al. |
| 7,294,717 B2 | 11/2007 | Herrmann et al. |
| 7,329,758 B1 | 2/2008 | Grubbs et al. |
| 7,339,006 B2 | 3/2008 | Giardello et al. |
| 7,374,863 B2 | 5/2008 | Sugasaki et al. |
| 7,378,528 B2 | 5/2008 | Herrmann et al. |
| 7,381,782 B2 | 6/2008 | Sugawara et al. |
| 7,465,773 B2 | 12/2008 | Kodemura et al. |
| 7,476,716 B2 | 1/2009 | Sugawara |
| 7,576,227 B2 | 8/2009 | Lysenko et al. |
| 7,652,145 B2 | 1/2010 | Herrmann et al. |
| 7,671,224 B2 | 3/2010 | Winde et al. |
| 7,687,635 B2 | 3/2010 | Verpoort et al. |
| 7,771,834 B2 | 8/2010 | Sugawara |
| 7,879,963 B2 | 2/2011 | Koeniger et al. |
| 7,902,279 B2 | 3/2011 | Lin et al. |
| 7,927,538 B2 | 4/2011 | Moszner et al. |
| 7,964,320 B2 | 6/2011 | Giardello et al. |
| 8,283,410 B2 | 10/2012 | Musa |
| 8,318,965 B2 | 11/2012 | Grela et al. |
| 8,557,921 B2 | 10/2013 | Arriola et al. |
| 8,597,794 B2 | 12/2013 | Giardello et al. |
| 8,642,824 B2 | 2/2014 | Lemke et al. |
| 2002/0166629 A1 | 11/2002 | Caster et al. |
| 2002/0172787 A1 | 11/2002 | Warner et al. |
| 2003/0055262 A1 | 3/2003 | Grubbs et al. |
| 2005/0261451 A1 * | 11/2005 | Ung .......... C07F 15/0046 526/171 |
| 2006/0211809 A1 | 9/2006 | Kodemura et al. |
| 2007/0037946 A1 | 2/2007 | Sugawara |
| 2007/0043188 A1 | 2/2007 | Schaubroeck et al. |
| 2007/0185343 A1 | 8/2007 | Verpoort et al. |
| 2008/0293905 A9 | 11/2008 | Schaubroeck et al. |
| 2009/0061713 A1 | 3/2009 | Lin et al. |
| 2009/0143510 A1 | 6/2009 | Lin et al. |
| 2010/0015871 A1 | 1/2010 | Tanimoto et al. |
| 2010/0029801 A1 | 2/2010 | Moszner et al. |
| 2010/0069573 A1 | 3/2010 | Arriola et al. |
| 2010/0144924 A1 | 6/2010 | Yoshiwara et al. |
| 2011/0065880 A1 | 3/2011 | Musa |
| 2011/0160472 A1 | 6/2011 | Lemke et al. |
| 2011/0237718 A1 | 9/2011 | Yoshiwara |
| 2012/0088879 A1 | 4/2012 | Yoshiwara |
| 2012/0271019 A1 | 10/2012 | Drozdzak |

(56) References Cited

U.S. PATENT DOCUMENTS

2014/0039090 A1    2/2014   Premachandran et al.
2014/0329017 A1*  11/2014   Wang .................... C08F 32/02
                                                         427/331

FOREIGN PATENT DOCUMENTS

| | | |
|---|---|---|
| EP | 1041078 A2 | 10/2000 |
| EP | 1535941 A1 | 6/2005 |
| EP | 1589055 A1 | 10/2005 |
| EP | 2151214 B1 | 2/2010 |
| EP | 2256164 A1 | 12/2010 |
| EP | 1757613 B1 | 1/2011 |
| EP | 2280017 B1 | 2/2011 |
| EP | 1577282 B1 | 6/2011 |
| EP | 2444438 A1 | 4/2012 |
| WO | 96/16008 A1 | 5/1996 |
| WO | 97/14738 A1 | 4/1997 |
| WO | 99/11454 A1 | 3/1999 |
| WO | 99/65665 A1 | 12/1999 |
| WO | 00/46257 A1 | 8/2000 |
| WO | 02/14376 A2 | 2/2002 |
| WO | 02/079208 A2 | 10/2002 |
| WO | 03/011455 A1 | 2/2003 |
| WO | 03/062253 A1 | 7/2003 |
| WO | 2005/094345 A2 | 10/2005 |
| WO | 2010/037550 A1 | 4/2010 |
| WO | 2010/147116 A1 | 12/2010 |
| WO | 2011079439 A1 | 7/2011 |
| WO | 2012/174502 A2 | 12/2012 |
| WO | WO 2012/174502 A2 * 12/2012 .............. C08L 45/00 |
| WO | 2013/025284 A1 | 2/2013 |
| WO | 2013025284 A1 | 2/2013 |

OTHER PUBLICATIONS

International Search Report and Written Opinion for PCT International Application No. PCT/US2012/042850, dated Jan. 21, 2013.
International Preliminary Report on Patentability for PCT International Application No. PCT/US2012/042850, dated Jan. 3, 2014.
International Preliminary Report on Patentability for PCT International Application No. PCT/US2014/019082, dated Sep. 11, 2015.
Supplementary Partial European Search Report for EP 12801260, dated Apr. 27, 2015.
Written Opinion and Search Report for SG 2013092911, dated Nov. 2, 2014.
Bradshaw et al., "Design of Experiment Study on Cure Reactivities of a BMC Material Affected by Temperature, Levels of Peroxides and Inhibitors," Composites Research Journal, vol. 1, Issue 4, 2007, pp. 1-8.
Hercules Incorporated, Improving Adhesion between Poly (Dicyclopentadiene) and Carbon Fiber,: Research Disclosure, Nov. 1992, No. 343.
Schwab et al., J. Am. Chem. Soc. 118:100-110 (1996).
Scholl et al., Org. Lett. 6:953-956 (1999).
Sanford et al., J. Am. Chem. Soc. 123:749-750 (2001).
Partial European Search Report for EP 12 17 5981 dated Sep. 25, 2012.
International Search Report in PCT/US2014/019082 dated May 14, 2014.
Extended European Search Report in corresponding EP Application No. 14757631, dated Sep. 2, 2016.
Chevalier et al., "Ring-Opening Olefin Metathesis Polymerisation (ROMP) as a Potential Cross-Linking Mechanism for Siloxane Polymers," J. of Inorganic and Organometallic Polymers, vol. 9, No. 3, 1999, pp. 151-164.

* cited by examiner

OLEFIN METATHESIS CATALYST COMPOSITIONS COMPRISING AT LEAST TWO METAL CARBENE OLEFIN METATHESIS CATALYSTS

CROSS REFERENCE TO RELATED APPLICATIONS

This application is a continuation-in-part of U.S. patent application Ser. No. 14/192,552, now abandoned, filed Feb. 27, 2014, which claims the benefit of U.S. Provisional Patent Application No. 61/799,827, filed Mar. 15, 2013, and of U.S. Provisional Patent Application No. 61/770,284, filed Feb. 27, 2013, and the contents of each are incorporated herein by reference.

TECHNICAL FIELD

The present invention relates to olefin metathesis catalysts and methods for controlling olefin metathesis reactions. More particularly, the present invention relates to methods and compositions for catalyzing and controlling ring opening metathesis polymerization (ROMP) reactions and the manufacture of polymer articles via ROMP. Polymer products produced via the metathesis reactions of the invention may be utilized for a wide range of materials and composite applications. The invention has utility in the fields of catalysis, organic synthesis, and polymer and materials chemistry and manufacture.

BACKGROUND

The molding of thermoset polymers is a technologically and commercially important processing technique. In one known version of this technique, a liquid cyclic olefin monomer resin is combined with a single metal carbene olefin metathesis catalyst to form a prior art ROMP composition, and the prior art ROMP composition is added (e.g., poured, cast, infused, injected, etc.) into a mold. The prior art ROMP composition is subjected to conditions effective to polymerize the prior art ROMP composition and on completion the molded article is removed from the mold for any optional post cure processing that may be required. For purposes of this disclosure it is important to emphasize that the term "prior art ROMP composition(s)" as used herein are those ROMP compositions which are formed by combining a liquid cyclic olefin monomer resin with only one metal carbene olefin metathesis catalyst (i.e., a single metal carbene olefin metathesis catalyst). As is known in the art, the liquid cyclic olefin monomer resin may optionally contain added modifiers, fillers, reinforcements, flame retardants, pigments, etc. Examples of such prior art ROMP compositions are disclosed in U.S. Pat. Nos. 5,342,909; 6,310,121; 6,515,084; 6,525,125; 6,759,537; 7,329,758, etc.

To successfully mold an article, it is important to be able to control the rate at which a ROMP composition polymerizes. As polymerization progresses, the viscosity of the ROMP composition increases, progressing from a liquid state, through a gel state, to the final hard polymer. At some point during this progression, the temperature generally begins to increase rapidly leading to a sharp exotherm. The viscosity of the ROMP composition must not increase too rapidly (build up too rapidly) before the ROMP composition can be introduced into the mold. In addition, the ROMP composition must not gel or exotherm (i.e., cure) before it can be introduced into the mold. Furthermore, the ROMP composition must not gel or exotherm before the mold is completely filled or before the catalyst has had sufficient time to completely disperse in the monomer. However, in some cases, for convenience and expedient cycle time, it may be important that the catalyst initiates polymerization of the monomer and the ROMP composition exotherms within a reasonable time after the mold is filled.

A general issue with molding articles with a prior art ROMP composition is that many of the metal carbene olefin metathesis catalysts (e.g., ruthenium metal carbene olefin metathesis catalysts) react rapidly with cyclic olefins and therefore are not particularly suitable for molding a wide array of polymer articles, such as large articles, composite articles, articles having complex geometries and/or areas of varying thickness, and/or articles which have thicknesses greater than ¼".

A particular issue with molding articles using prior art ROMP compositions is that various regions or sections of the article being molded may possess different degrees or states of polymerization (e.g., liquid, soft gel, hard polymer gel, exotherm) during the molding cycle. For example, during the molding of an article a prior art ROMP composition may be in a gelled state in one section or region of a mold and in a liquid state in another section or region of the mold. This is particularly problematic if the prior art ROMP composition begins to exotherm in one section of the mold, but is still in a liquid state in another section of the mold. The greater the amount of liquid cyclic olefin monomer present in a ROMP composition when the ROMP composition begins to exotherm the more likely the molded article will either possess defects requiring repair or need to be discarded, which in either situation leads to increased manufacturing costs. Without being bound by theory, certain defects in the molded article are thought to be formed when liquid cyclic olefin monomer (e.g., dicyclopentadiene) present in a ROMP composition is volatized (converted from a liquid state to a gaseous state) as a result of the high temperatures generated during exotherm of the ROMP composition.

In addition, the issue of volatilization of liquid cyclic olefin monomer has been found to be problematic during the molding of an article using prior art ROMP compositions, particularly when using a heated mold, where one mold surface may be at a higher temperature than another mold surface or where there is a temperature differential between the mold surfaces. This issue is exacerbated when molding composite articles, particularly thick composite articles or highly filled composite articles, as the substrate material (e.g., reinforcement material) may function as a heat sink, effectively cooling the prior art ROMP composition as it permeates through and/or around the substrate material when filling the mold cavity. In this situation, the portion of the prior art ROMP composition farthest from the heated mold surface may still be in a liquid state when the portion of the prior art ROMP composition closest to the heated mold surface begins to exotherm, thereby resulting in defects in the molded article due to volatilization of liquid cyclic olefin monomer.

Generally, it would be useful and commercially important to be able to control the rate of reaction of catalyzed metathesis reactions, particularly ROMP reactions. It would be particularly useful and commercially important to be able to control the rate of polymerization of a cyclic olefin resin composition catalyzed with a metal carbene olefin metathesis catalyst (e.g., a ruthenium or osmium carbene olefin metathesis catalyst). Moreover, it would be particularly useful and commercially important during the molding of an article to be able to control the polymerization of a ROMP composition in such a way that the liquid cyclic olefin monomer present in the ROMP composition has reached a uniformly formed gelled state throughout the different regions/sections of a mold or throughout the ROMP composition before the ROMP composition begins to exotherm. More specifically, it would be particularly useful and commercially important to have a means to independently control the time required for the ROMP composition to reach a hard polymer gel relative to the exotherm time.

Previously, there have been few methods for controlling the rate of polymerization of a cyclic olefin resin composition catalyzed with a metal carbene olefin metathesis catalyst (e.g., a ruthenium or osmium carbene olefin metathesis catalyst). One method for controlling the rate of polymerization of a prior art ROMP composition is by controlling/adjusting the temperature of the resin composition and/or the mold. Unfortunately, as is demonstrated in Table 11 infra, adjustment of the temperature of the resin composition and/or mold does not enable independent control over the time required for a prior art ROMP composition to reach a hard polymer gel relative to the exotherm time. In other words, following the catalyzation of a cyclic olefin resin composition with a single metal carbene olefin metathesis catalyst to form a prior art ROMP composition, the time for the prior art ROMP composition to reach a hard polymer gel and the time for the prior art ROMP composition to exotherm both decrease when the composition temperature and/or mold temperature is increased. Conversely, following the catalyzation of a cyclic olefin resin composition with a single metal carbene olefin metathesis catalyst to form a prior art ROMP composition, the time for the prior art ROMP composition to reach a hard polymer gel and the time for the prior art ROMP composition to exotherm both increase when the composition temperature and/or mold temperature is decreased.

Another method for controlling the rate of polymerization of a cyclic olefin resin composition catalyzed with a single metal carbene olefin metathesis catalyst (e.g., a ruthenium or osmium carbene olefin metathesis catalyst) has been disclosed in U.S. Pat. No. 5,939,504 and International Pat. App. No. PCT/US2012/042850, the contents of both of which are incorporated herein by reference. Here, exogenous (meaning external additive or other reactives that can be added to the resin composition, or mixed or combined with the single carbene catalyst) is distinguished from indigenous (meaning native or established by the components attached to the transition metal of the single carbene catalyst). U.S. Pat. No. 5,939,504 discloses the use of exogenous "gel modification additives" or exogenous inhibitors, such as a neutral electron donor or a neutral Lewis base, preferably trialkylphosphines and triarylphosphines, to modify the pot life of a prior art ROMP composition. International Pat. App. No. PCT/US2012/042850 discloses the use of exogenous hydroperoxide gel modifiers or exogenous inhibitors, such as cumene hydroperoxide, to modify the pot life of a prior art ROMP composition. The time during which a ROMP composition can be worked after the resin composition and the metal carbene olefin metathesis catalyst are combined is called the pot life.

While the use of exogenous inhibitors continues to be a valuable method for controlling the pot life of a prior art ROMP composition, the use of exogenous inhibitors has numerous limitations and several improvements are both needed and desired. Unfortunately, as is demonstrated in Table 12 infra, the use of exogenous inhibitors (e.g., triphenylphosphine or cumene hydroperoxide) in a prior art ROMP composition does not enable independent control over the time required for the prior art ROMP composition to reach a hard polymer gel relative to the exotherm time. In other words, following the formation of a prior art ROMP composition, the time for the prior art ROMP composition to reach a hard polymer gel and the time for the prior art ROMP composition to exotherm both increase when the concentration of exogenous inhibitor is increased. Conversely, following the formation of a prior art ROMP composition, the time for the prior art ROMP composition to reach a hard polymer gel and the time for the prior art ROMP composition to exotherm both decrease when the concentration of exogenous inhibitor is decreased. However, use of higher amounts of exogenous inhibitor in a prior art ROMP composition may have undesirable effects on the properties of a polymer and/or polymer composite formed from the prior art ROMP composition (e.g., decreased mechanical and/or thermal properties).

Another previously known method for controlling the rate of a catalyzed metathesis reaction is through the modification of the character of the ligands attached to the ruthenium or osmium transition metal of the carbene olefin metathesis catalyst (indigenous modification). For example, $RuCl_2(PPh_3)_2(=CHPh)$ reacts more slowly with cyclic olefins than $RuCl_2(PCy_3)_2(=CHPh)$, while $RuCl_2(PPh_3)sIMes(=CHPh)$ reacts more rapidly with cyclic olefins than $RuCl_2(PCy_3)sIMes(=CHPh)$, where sIMes represents 1,3-Bis(2,4,6-trimethylphenyl)-2-imidazolidinylidene and Cy represents cyclohexyl. Furthermore, ligand modification, for example, has been used to prepare latent metal carbene olefin metathesis catalysts such as C771, C835, and C871 disclosed herein. Several other latent metal carbene olefin metathesis catalysts for ROMP are known and have been disclosed in U.S. Pat. Appl. Pub. Nos. 2005/0261451 and 2012/0271019, U.S. Pat. No. RE38676, etc. Unfortunately, as is demonstrated infra, latent metal carbene olefin metathesis catalysts (e.g., latent ruthenium or osmium olefin metathesis catalysts) do not enable independent control over the time required for a prior art ROMP composition to reach a hard polymer gel relative to the exotherm time.

Another previously known method for controlling the rate of polymerization of a cyclic olefin resin composition has been disclosed in U.S. Pat. No. 6,162,883 where a catalyst mixture of a thermal carbene-free ruthenium catalyst and a thermal ruthenium carbene catalyst were used to generate a latent catalyst for the ROMP of strained cycloolefins. However, U.S. Pat. No. 6,162,883 does not address the issues associated with the volatilization of liquid cyclic olefin monomer during ROMP of a liquid cyclic olefin monomer resin, nor does it provide solutions to address these issues. Moreover, U.S. Pat. No. 6,162,883 does not address the issue of enabling independent control over the time required for a ROMP composition to reach a hard polymer gel relative to the exotherm time.

Therefore, despite advances achieved in the art, particularly in properties of olefin metathesis polymers and their associated applications, a continuing need therefore exists for further improvement in a number of areas, including methods and compositions for catalyzing and controlling olefin metathesis reactions, particularly ROMP reactions.

SUMMARY OF INVENTION

The present invention relates to methods and compositions for catalyzing and controlling ring opening metathesis polymerization (ROMP) reactions and the manufacture of polymer articles via ROMP.

It is an object of the present invention to provide olefin metathesis catalyst compositions for use in olefin metathesis processes. In particular, it is an object of the present invention to provide olefin metathesis catalyst compositions for use in ROMP compositions and ROMP processes, which overcomes the disadvantages of prior art ROMP compositions. Furthermore, it is an object of the present invention to provide polymer articles and/or polymer composites having less than one visible void per square inch of polymer. These objects are solved by providing olefin metathesis catalyst compositions comprising at least two metal carbene olefin metathesis catalysts. These objects are solved by providing olefin metathesis catalyst compositions comprising at least two metal carbene olefin metathesis catalysts, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof. These objects are solved by providing olefin metathesis catalyst compositions comprising at least two metal carbene olefin metathesis catalysts, wherein the at least two metal carbene olefin metathesis catalysts are structurally different, are chemically different, and are not isomers.

The inventors have discovered that olefin metathesis catalyst compositions comprising at least two metal carbene olefin metathesis catalysts, when combined with a resin composition comprising at least one cyclic olefin and an optional exogenous inhibitor to form a ROMP composition, enables independent control over the time required for the ROMP composition to reach a hard polymer gel relative to the exotherm time. This hard polymer gel may be subsequently cured through the addition of an external energy source (e.g., heating of a mold surface and/or post cure step) and/or through internal energy (e.g., in the form of exothermic heat of reaction generated by ring opening during ROMP).

The inventors have discovered that olefin metathesis catalyst compositions comprising at least two metal carbene olefin metathesis catalysts, when combined with a resin composition comprising at least one cyclic olefin and an optional exogenous inhibitor to form a ROMP composition, enables independent control over the time required for the ROMP composition to reach a hard polymer gel relative to the exotherm time, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof. This hard polymer gel may be subsequently cured through the addition of an external energy source (e.g., heating of a mold surface and/or post cure step) and/or through internal energy (e.g., in the form of exothermic heat of reaction generated by ring opening during ROMP).

More particularly, the inventors have discovered that ROMP compositions comprising an olefin metathesis catalyst composition comprising at least two metal carbene olefin metathesis catalysts and a resin composition comprising at least one cyclic olefin and an optional exogenous inhibitor enables various regions or sections of an article being molded to uniformly form a hard polymer gel before various regions or sections of an article being molded begin to exotherm, thereby reducing and/or eliminating the volatilization of liquid cyclic olefin monomer which in turn leads to a reduction and/or elimination of defects (e.g., voids, bubbles, etc.) in the molded article.

The inventors have discovered that ROMP compositions comprising an olefin metathesis catalyst composition comprising at least two metal carbene olefin metathesis catalysts, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, and comprising a resin composition comprising at least one cyclic olefin and an optional exogenous inhibitor enables various regions or sections of an article being molded to uniformly form a hard polymer gel before various regions or sections of an article being molded begin to exotherm, thereby reducing and/or eliminating the volatilization of liquid cyclic olefin monomer which in turn leads to a reduction and/or elimination of defects (e.g., voids, bubbles, etc.) in the molded article.

In one embodiment the present invention provides a composition comprising at least two metal carbene olefin metathesis catalysts.

In one embodiment the present invention provides a composition comprising at least two metal carbene olefin metathesis catalysts, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a composition comprising at least two metal carbene olefin metathesis catalysts, wherein the at least two metal carbene olefin metathesis catalysts are structurally different from each other.

In another embodiment the present invention provides a composition comprising at least two metal carbene olefin metathesis catalysts, wherein the at least two metal carbene olefin metathesis catalysts are chemically different from each other.

In another embodiment the present invention provides a composition comprising at least two metal carbene olefin metathesis catalysts, wherein the at least two metal carbene olefin metathesis catalysts are distinct compounds.

In another embodiment the present invention provides a composition comprising at least two metal carbene olefin metathesis catalysts, wherein the at least two metal carbene olefin metathesis catalysts are not structural isomers of each other.

In another embodiment the present invention provides a composition comprising at least two metal carbene olefin metathesis catalysts, wherein the at least two metal carbene olefin metathesis catalysts are not diastereoisomers of each other.

In another embodiment the present invention provides a composition comprising at least two metal carbene olefin metathesis catalysts, wherein the at least two metal carbene olefin metathesis catalysts are not stereoisomers of each other.

In another embodiment the present invention provides a composition comprising at least two metal carbene olefin metathesis catalysts, wherein the at least two metal carbene olefin metathesis catalysts are not enantiomers of each other.

In one embodiment the present invention provides an olefin metathesis catalyst composition comprising at least two metal carbene olefin metathesis catalysts.

In one embodiment the present invention provides an olefin metathesis catalyst composition comprising at least two metal carbene olefin metathesis catalysts, wherein the at least two metal carbene olefin metathesis catalysts are structurally different, are chemically different, are distinct compounds, are not isomers, are not structural isomers, are not diastereoisomers, are not stereoisomers, or are not enantiomers, are not cis/trans isomers of each other, or any combinations thereof.

In another embodiment the present invention provides an olefin metathesis catalyst composition comprising at least two metal carbene olefin metathesis catalysts, wherein the at least two metal carbene olefin metathesis catalysts are structurally different from each other.

In another embodiment the present invention provides an olefin metathesis catalyst composition comprising at least two metal carbene olefin metathesis catalysts, wherein the at least two metal carbene olefin metathesis catalysts are chemically different from each other.

In another embodiment the present invention provides an olefin metathesis catalyst composition comprising at least two metal carbene olefin metathesis catalysts, wherein the at least two metal carbene olefin metathesis catalysts are distinct compounds.

In another embodiment the present invention provides an olefin metathesis catalyst composition comprising at least two metal carbene olefin metathesis catalysts, wherein the at least two metal carbene olefin metathesis catalysts are not structural isomers of each other.

In another embodiment the present invention provides an olefin metathesis catalyst composition comprising at least two metal carbene olefin metathesis catalysts, wherein the at least two metal carbene olefin metathesis catalysts are not diastereoisomers of each other.

In another embodiment the present invention provides an olefin metathesis catalyst composition comprising at least two metal carbene olefin metathesis catalysts, wherein the at least two metal carbene olefin metathesis catalysts are not stereoisomers of each other.

In another embodiment the present invention provides an olefin metathesis catalyst composition comprising at least two metal carbene olefin metathesis catalysts, wherein the at least two metal carbene olefin metathesis catalysts are not enantiomers of each other.

In one embodiment the present invention provides a composition comprising at least one cyclic olefin and at least two metal carbene olefin metathesis catalysts.

In one embodiment the present invention provides a composition comprising at least one cyclic olefin and at least two metal carbene olefin metathesis catalysts, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a composition comprising at least one cyclic olefin and at least two metal carbene olefin metathesis catalysts, wherein the at least two metal carbene olefin metathesis catalysts are structurally different from each other.

In another embodiment the present invention provides a composition comprising at least one cyclic olefin and at least two metal carbene olefin metathesis catalysts, wherein the at least two metal carbene olefin metathesis catalysts are chemically different from each other.

In another embodiment the present invention provides a composition comprising at least one cyclic olefin and at least two metal carbene olefin metathesis catalysts, wherein the at least two metal carbene olefin metathesis catalysts are distinct compounds.

In another embodiment the present invention provides a composition comprising at least one cyclic olefin and at least two metal carbene olefin metathesis catalysts, wherein the at least two metal carbene olefin metathesis catalysts are not structural isomers of each other.

In another embodiment the present invention provides a composition comprising at least one cyclic olefin and at least two metal carbene olefin metathesis catalysts, wherein the at least two metal carbene olefin metathesis catalysts are not diastereoisomers of each other.

In another embodiment the present invention provides a composition comprising at least one cyclic olefin and at least two metal carbene olefin metathesis catalysts, wherein the at least two metal carbene olefin metathesis catalysts are not stereoisomers of each other.

In another embodiment the present invention provides a composition comprising at least one cyclic olefin and at least two metal carbene olefin metathesis catalysts, wherein the at least two metal carbene olefin metathesis catalysts are not enantiomers of each other.

In one embodiment the present invention provides a composition comprising an olefin metathesis catalyst composition comprising at least two metal carbene olefin metathesis catalysts, a resin composition comprising at least one cyclic olefin, and an optional exogenous inhibitor.

In one embodiment the present invention provides a composition comprising an olefin metathesis catalyst composition comprising at least two metal carbene olefin metathesis catalysts, a resin composition comprising at least one cyclic olefin, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a composition comprising an olefin metathesis catalyst composition comprising at least two metal carbene olefin metathesis catalysts, a resin composition comprising at least one cyclic olefin, and an optional exogenous inhibitor, and wherein the at least two metal carbene olefin metathesis catalysts are structurally different from each other.

In another embodiment the present invention provides a composition comprising an olefin metathesis catalyst composition comprising at least two metal carbene olefin metathesis catalysts, a resin composition comprising at least one cyclic olefin, and an optional exogenous inhibitor, and wherein the at least two metal carbene olefin metathesis catalysts are chemically different from each other.

In another embodiment the present invention provides a composition comprising an olefin metathesis catalyst composition comprising at least two metal carbene olefin metathesis catalysts, a resin composition comprising at least one cyclic olefin, and an optional exogenous inhibitor, and wherein the at least two metal carbene olefin metathesis catalysts are distinct compounds.

In another embodiment the present invention provides a composition comprising an olefin metathesis catalyst composition comprising at least two metal carbene olefin metathesis catalysts, a resin composition comprising at least wherein the at least two metal carbene olefin metathesis catalysts are not structural isomers of each other.

In another embodiment the present invention provides a composition comprising an olefin metathesis catalyst composition comprising at least two metal carbene olefin metathesis catalysts, a resin composition comprising at least one cyclic olefin, and an optional exogenous inhibitor, and wherein the at least two metal carbene olefin metathesis catalysts are not diastereoisomers of each other.

In another embodiment the present invention provides a composition comprising an olefin metathesis catalyst composition comprising at least two metal carbene olefin metathesis catalysts, a resin composition comprising at least one cyclic olefin, and an optional exogenous inhibitor, and wherein the at least two metal carbene olefin metathesis catalysts are not stereoisomers of each other.

In another embodiment the present invention provides a composition comprising an olefin metathesis catalyst composition comprising at least two metal carbene olefin metathesis catalysts, a resin composition comprising at least one cyclic olefin, and an optional exogenous inhibitor, and wherein the at least two metal carbene olefin metathesis catalysts are not enantiomers of each other.

In one embodiment the present invention provides a composition comprising an olefin metathesis catalyst composition comprising at least two metal carbene olefin metathesis catalysts, a resin composition comprising at least one cyclic olefin, at least one substrate material, and an optional exogenous inhibitor.

In one embodiment the present invention provides a composition comprising an olefin metathesis catalyst composition comprising at least two metal carbene olefin metathesis catalysts, a resin composition comprising at least one cyclic olefin, at least one substrate material, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a composition comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are structurally different from each other.

In another embodiment the present invention provides a composition comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are chemically different from each other.

In another embodiment the present invention provides a composition comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are distinct compounds.

In another embodiment the present invention provides a composition comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are not structural isomers of each other.

In another embodiment the present invention provides a composition comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are not diastereoisomers of each other.

In another embodiment the present invention provides a composition comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are not stereoisomers of each other.

In another embodiment the present invention provides a composition comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are not enantiomers of each other.

In one embodiment the present invention provides a composition comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor.

In one embodiment the present invention provides a composition comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are structurally different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are chemically different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are distinct compounds.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are not structural isomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are not diastereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are not stereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are not enantiomers of each other.

In one embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor.

In one embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are structurally different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are chemically different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are distinct compounds.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are not structural isomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are not diastereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are not stereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are not enantiomers of each other.

In one embodiment the present invention provides a composition comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor.

In one embodiment the present invention provides a composition comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a composition comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are structurally different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are chemically different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are distinct compounds.

In another embodiment the present invention provides a composition comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are not structural isomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are not diastereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are not stereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are not enantiomers of each other.

In one embodiment the present invention provides a ROMP composition comprising an olefin metathesis catalyst composition comprising at least two metal carbene olefin metathesis catalysts and a resin composition comprising at least one cyclic olefin.

In one embodiment the present invention provides a ROMP composition comprising an olefin metathesis catalyst composition comprising at least two metal carbene olefin metathesis catalysts and a resin composition comprising at least one cyclic olefin, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a ROMP composition comprising an olefin metathesis catalyst composition comprising at least two metal carbene olefin metathesis catalysts and a resin composition comprising at least one cyclic olefin, and wherein the at least two metal carbene olefin metathesis catalysts are structurally different from each other.

In another embodiment the present invention provides a ROMP composition comprising an olefin metathesis catalyst composition comprising at least two metal carbene olefin metathesis catalysts and a resin composition comprising at least one cyclic olefin, and wherein the at least two metal carbene olefin metathesis catalysts are chemically different from each other.

In another embodiment the present invention provides a ROMP composition comprising an olefin metathesis catalyst composition comprising at least two metal carbene olefin metathesis catalysts and a resin composition comprising at least one cyclic olefin, and wherein the at least two metal carbene olefin metathesis catalysts are distinct compounds.

In another embodiment the present invention provides a ROMP composition comprising an olefin metathesis catalyst composition comprising at least two metal carbene olefin metathesis catalysts and a resin composition comprising at least one cyclic olefin, and wherein the at least two metal carbene olefin metathesis catalysts are not structural isomers of each other.

In another embodiment the present invention provides a ROMP composition comprising an olefin metathesis catalyst composition comprising at least two metal carbene olefin metathesis catalysts and a resin composition comprising at least one cyclic olefin, and wherein the at least two metal carbene olefin metathesis catalysts are not diastereoisomers of each other.

In another embodiment the present invention provides a ROMP composition comprising an olefin metathesis catalyst composition comprising at least two metal carbene olefin metathesis catalysts and a resin composition comprising at least one cyclic olefin, and wherein the at least two metal carbene olefin metathesis catalysts are not stereoisomers of each other.

In another embodiment the present invention provides a ROMP composition comprising an olefin metathesis catalyst composition comprising at least two metal carbene olefin metathesis catalysts and a resin composition comprising at least one cyclic olefin, and wherein the at least two metal carbene olefin metathesis catalysts are not enantiomers of each other.

In one embodiment the present invention provides a ROMP composition comprising an olefin metathesis catalyst composition comprising at least two metal carbene olefin metathesis catalysts and a resin composition comprising at least one cyclic olefin and an optional exogenous inhibitor.

In one embodiment the present invention provides a ROMP composition comprising an olefin metathesis catalyst composition comprising at least two metal carbene olefin metathesis catalysts and a resin composition comprising at least one cyclic olefin and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a ROMP composition comprising an olefin metathesis catalyst composition comprising at least two metal carbene olefin metathesis catalysts and a resin composition comprising at least one cyclic olefin and an optional exogenous inhibitor, and wherein the at least two metal carbene olefin metathesis catalysts are structurally different from each other.

In another embodiment the present invention provides a ROMP composition comprising an olefin metathesis catalyst composition comprising at least two metal carbene olefin metathesis catalysts and a resin composition comprising at least one cyclic olefin and an optional exogenous inhibitor, and wherein the at least two metal carbene olefin metathesis catalysts are chemically different from each other.

In another embodiment the present invention provides a ROMP composition comprising an olefin metathesis catalyst composition comprising at least two metal carbene olefin metathesis catalysts and a resin composition comprising at least one cyclic olefin and an optional exogenous inhibitor, and wherein the at least two metal carbene olefin metathesis catalysts are distinct compounds.

In another embodiment the present invention provides a ROMP composition comprising an olefin metathesis catalyst composition comprising at least two metal carbene olefin metathesis catalysts and a resin composition comprising at least one cyclic olefin and an optional exogenous inhibitor, and wherein the at least two metal carbene olefin metathesis catalysts are not structural isomers of each other.

In another embodiment the present invention provides a ROMP composition comprising an olefin metathesis catalyst composition comprising at least two metal carbene olefin metathesis catalysts and a resin composition comprising at least one cyclic olefin and an optional exogenous inhibitor, and wherein the at least two metal carbene olefin metathesis catalysts are not diastereoisomers of each other.

In another embodiment the present invention a ROMP composition comprising an olefin metathesis catalyst composition comprising at least two metal carbene olefin metathesis catalysts and a resin composition comprising at least one cyclic olefin and an optional exogenous inhibitor, and wherein the at least two metal carbene olefin metathesis catalysts are not stereoisomers of each other.

In another embodiment the present invention provides a ROMP composition comprising an olefin metathesis catalyst composition comprising at least two metal carbene olefin metathesis catalysts and a resin composition comprising at least one cyclic olefin and an optional exogenous inhibitor, and wherein the at least two metal carbene olefin metathesis catalysts are not enantiomers of each other.

In one embodiment the present invention provides a composition comprising an olefin metathesis catalyst composition comprising at least two metal carbene olefin metathesis catalysts, a resin composition comprising at least one cyclic olefin, at least one adhesion promoter, and an optional exogenous inhibitor.

In one embodiment the present invention provides a composition comprising an olefin metathesis catalyst composition comprising at least two metal carbene olefin metathesis catalysts, a resin composition comprising at least one cyclic olefin, at least one adhesion promoter, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a composition comprising an olefin metathesis catalyst composition comprising at least two metal carbene olefin metathesis catalysts, a resin composition comprising at least one cyclic olefin, at least one adhesion promoter, and an optional exogenous inhibitor, and wherein the at least two metal carbene olefin metathesis catalysts are structurally different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter, and an optional exogenous inhibitor, and wherein the at least two metal carbene olefin metathesis catalysts are chemically different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter, and an optional exogenous inhibitor, and wherein the at least two metal carbene olefin metathesis catalysts are distinct compounds.

In another embodiment the present invention provides a composition comprising an olefin metathesis catalyst composition comprising at least two metal carbene olefin metathesis catalysts, a resin composition comprising at least one cyclic olefin, at least one adhesion promoter, and an optional exogenous inhibitor, and wherein the at least two metal carbene olefin metathesis catalysts are not structural isomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, and an optional exogenous inhibitor, and wherein the at least two metal carbene olefin metathesis catalysts are not diastereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, and an optional exogenous inhibitor, and wherein the at least two metal carbene olefin metathesis catalysts are not stereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, and an optional exogenous inhibitor, and wherein the at least two metal carbene olefin metathesis catalysts are not enantiomers of each other.

In one embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor.

In one embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor, and wherein the at least two metal carbene olefin metathesis catalysts are structurally different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor, and wherein the at least two metal carbene olefin metathesis catalysts are chemically different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor, and wherein the at least two metal carbene olefin metathesis catalysts are distinct compounds.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor, and wherein the at least two metal carbene olefin metathesis catalysts are not structural isomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor, and wherein the at least two metal carbene olefin metathesis catalysts are not diastereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor, and wherein the at least two metal carbene olefin metathesis catalysts are not stereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor, and wherein the at least two metal carbene olefin metathesis catalysts are not enantiomers of each other.

In one embodiment, the present invention provides a composition comprising an olefin metathesis catalyst composition comprising at least two metal carbene olefin metathesis catalysts, a resin composition comprising at least one cyclic olefin, at least one adhesion promoter composition, and an optional exogenous inhibitor.

In one embodiment, the present invention provides a composition comprising an olefin metathesis catalyst composition comprising at least two metal carbene olefin metathesis catalysts, a resin composition comprising at least one cyclic olefin, at least one adhesion promoter composition, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a composition comprising an olefin metathesis catalyst composition comprising at least two metal carbene olefin metathesis catalysts, a resin composition comprising at least one cyclic olefin, at least one adhesion promoter composition, and an optional exogenous inhibitor, and wherein the at least two metal carbene olefin metathesis catalysts are structurally different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter composition, and an optional exogenous inhibitor, and wherein the at least two metal carbene olefin metathesis catalysts are chemically different from each other.

In another embodiment the present invention provides a composition comprising an olefin metathesis catalyst composition comprising at least two metal carbene olefin metathesis catalysts, a resin composition comprising at least one cyclic olefin, at least one adhesion promoter composition, and an optional exogenous inhibitor, and wherein the at least two metal carbene olefin metathesis catalysts are distinct compounds.

In another embodiment the present invention provides a composition an olefin metathesis catalyst composition comprising at least two metal carbene olefin metathesis catalysts, a resin composition comprising at least one cyclic olefin, at least one adhesion promoter composition, and an optional exogenous inhibitor, and wherein the at least two metal carbene olefin metathesis catalysts are not structural isomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter composition, and an optional exogenous inhibitor, and wherein the at least two metal carbene olefin metathesis catalysts are not diastereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter composition, and an optional exogenous inhibitor, and wherein the at least two metal carbene olefin metathesis catalysts are not stereoisomers of each other.

In another embodiment the present invention provides a composition comprising an olefin metathesis catalyst composition comprising at least two metal carbene olefin metathesis catalysts, a resin composition comprising at least one cyclic olefin, at least one adhesion promoter composition, and an optional exogenous inhibitor, and wherein the at least two metal carbene olefin metathesis catalysts are not enantiomers of each other.

In one embodiment the present invention provides a method for polymerizing a resin composition comprising at least one cyclic olefin and an optional exogenous inhibitor, by combining an olefin metathesis catalyst composition comprising at least two metal carbene olefin metathesis catalysts with the resin composition, and subjecting the combined composition to conditions effective to polymerize the combined composition.

In one embodiment the present invention provides a method for polymerizing a resin composition comprising at least one cyclic olefin and an optional exogenous inhibitor, by combining an olefin metathesis catalyst composition comprising at least two metal carbene olefin metathesis catalysts with the resin composition, and subjecting the combined composition to conditions effective to polymerize the combined composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method for polymerizing a resin composition comprising at least one cyclic olefin and an optional exogenous inhibitor, by combining an olefin metathesis catalyst composition comprising at least two metal carbene olefin metathesis catalysts with the resin composition, and subjecting the combined composition to conditions effective to polymerize the combined composition, and wherein the at least two metal carbene olefin metathesis catalysts are structurally different from each other.

In another embodiment the present invention provides a method for polymerizing a resin composition comprising at least one cyclic olefin and an optional exogenous inhibitor, by combining an olefin metathesis catalyst composition comprising at least two metal carbene olefin metathesis catalysts with the resin composition, and subjecting the combined composition to conditions effective to polymerize the combined composition, and wherein the at least two metal carbene olefin metathesis catalysts are chemically different from each other.

In another embodiment the present invention provides a method for polymerizing a resin composition comprising at least one cyclic olefin and an optional exogenous inhibitor, by combining an olefin metathesis catalyst composition comprising at least two metal carbene olefin metathesis catalysts with the resin composition, and subjecting the combined composition to conditions effective to polymerize the combined composition, and wherein the at least two metal carbene olefin metathesis catalysts are distinct compounds.

In another embodiment the present invention provides a method for polymerizing a resin composition comprising at least one cyclic olefin and an optional exogenous inhibitor, by combining an olefin metathesis catalyst composition comprising at least two metal carbene olefin metathesis catalysts with the resin composition, and subjecting the combined composition to conditions effective to polymerize the combined composition, and wherein the at least two metal carbene olefin metathesis catalysts are not structural isomers of each other.

In another embodiment the present invention provides a method for polymerizing a resin composition comprising at least one cyclic olefin and an optional exogenous inhibitor, by combining an olefin metathesis catalyst composition comprising at least two metal carbene olefin metathesis catalysts with the resin composition, and subjecting the combined composition to conditions effective to polymerize the combined composition, and wherein the at least two metal carbene olefin metathesis catalysts are not diastereoisomers of each other.

In another embodiment the present invention provides a method for polymerizing a resin composition comprising at least one cyclic olefin and an optional exogenous inhibitor, by combining an olefin metathesis catalyst composition comprising at least two metal carbene olefin metathesis catalysts with the resin composition, and subjecting the combined composition to conditions effective to polymerize the combined composition, and wherein the at least two metal carbene olefin metathesis catalysts are not stereoisomers of each other.

In another embodiment the present invention provides a method for polymerizing a resin composition comprising at least one cyclic olefin and an optional exogenous inhibitor, by combining an olefin metathesis catalyst composition comprising at least two metal carbene olefin metathesis catalysts with the resin composition, and subjecting the combined composition to conditions effective to polymerize the combined composition, and wherein the at least two metal carbene olefin metathesis catalysts are not enantiomers of each other.

In one embodiment the present invention provides a method for making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition.

In one embodiment the present invention provides a method for making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method for making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, and wherein the at least two metal carbene olefin metathesis catalysts are structurally different from each other.

In another embodiment the present invention provides a method for making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, and wherein the at least two metal carbene olefin metathesis catalysts are chemically different from each other.

In another embodiment the present invention provides a method for making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, and wherein the at least two metal carbene olefin metathesis catalysts are distinct compounds.

In another embodiment the present invention provides a method for making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, and wherein the at least two metal carbene olefin metathesis catalysts are not structural isomers of each other.

In another embodiment the present invention provides a method for making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, and wherein the at least two metal carbene olefin metathesis catalysts are not diastereoisomers of each other.

In another embodiment the present invention provides a method for making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, and wherein the at least two metal carbene olefin metathesis catalysts are not stereoisomers of each other.

In another embodiment the present invention provides a method for making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, and wherein the at least two metal carbene olefin metathesis catalysts are not enantiomers of each other.

In one embodiment the present invention provides a method of making an article comprising, combining a resin composition comprising at least one cyclic olefin and an olefin metathesis catalyst composition comprising at least two metal carbene olefin metathesis catalysts to form a ROMP composition, contacting the ROMP composition with a substrate material, and subjecting the ROMP composition to conditions effective to polymerize the ROMP composition.

In one embodiment the present invention provides a method of making an article comprising, combining a resin composition comprising at least one cyclic olefin and an olefin metathesis catalyst composition comprising at least two metal carbene olefin metathesis catalysts to form a ROMP composition, contacting the ROMP composition with a substrate material, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising, combining a resin composition comprising at least one cyclic olefin and an olefin metathesis catalyst composition comprising at least two metal carbene olefin metathesis catalysts to form a ROMP composition, contacting the ROMP composition with a substrate material, and subjecting the ROMP composition to conditions effective to polymerize the ROMP composition, and wherein the at least two metal carbene olefin metathesis catalysts are structurally different from each other.

In another embodiment the present invention provides a method of making an article comprising, combining a resin composition comprising at least one cyclic olefin and an olefin metathesis catalyst composition comprising at least two metal carbene olefin metathesis catalysts to form a ROMP composition, contacting the ROMP composition with a substrate material, and subjecting the ROMP composition to conditions effective to polymerize the ROMP composition, and wherein the at least two metal carbene olefin metathesis catalysts are chemically different from each other.

In another embodiment the present invention provides a method of making an article comprising, combining a resin composition comprising at least one cyclic olefin and an olefin metathesis catalyst composition comprising at least two metal carbene olefin metathesis catalysts to form a ROMP composition, contacting the ROMP composition with a substrate material, and subjecting the ROMP composition to conditions effective to polymerize the ROMP composition, and wherein the at least two metal carbene olefin metathesis catalysts are distinct compounds.

In another embodiment the present invention provides a method of making an article comprising, combining a resin composition comprising at least one cyclic olefin and an olefin metathesis catalyst composition comprising at least two metal carbene olefin metathesis catalysts to form a ROMP composition, contacting the ROMP composition with a substrate material, and subjecting the ROMP composition to conditions effective to polymerize the ROMP composition, and wherein the at least two metal carbene olefin metathesis catalysts are not structural isomers of each other.

In another embodiment the present invention provides a method of making an article comprising, combining a resin composition comprising at least one cyclic olefin and an olefin metathesis catalyst composition comprising at least two metal carbene olefin metathesis catalysts to form a ROMP composition, contacting the ROMP composition with a substrate material, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising, combining a resin composition comprising at least one cyclic olefin and an olefin metathesis catalyst composition comprising at least two metal carbene olefin metathesis catalysts to form a ROMP composition, contacting the ROMP composition with a substrate material, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising, combining a resin composition comprising at least one cyclic olefin and an olefin metathesis catalyst composition comprising at least two metal carbene olefin metathesis catalysts to form a ROMP composition, contacting the ROMP composition with a substrate material, and subjecting the ROMP composition to conditions effective to polymerize the ROMP composition, and wherein the at least two metal carbene olefin metathesis catalysts are not enantiomers of each other.

In one embodiment the present invention provides a method of making an article comprising, combining an olefin metathesis catalyst composition comprising at least two metal carbene olefin metathesis catalysts and a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition.

In one embodiment the present invention provides a method of making an article comprising, combining an olefin metathesis catalyst composition comprising at least two metal carbene olefin metathesis catalysts and a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are structurally different from each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are chemically different from each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are distinct compounds.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not structural isomers of each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not enantiomers of each other.

In one embodiment the present invention provides a method of making an article comprising, combining an olefin metathesis catalyst composition comprising at least two metal carbene olefin metathesis catalysts and a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition.

In one embodiment the present invention provides a method of making an article comprising, combining an olefin metathesis catalyst composition comprising at least two metal carbene olefin metathesis catalysts and a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are structurally different from each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are chemically different from each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are distinct compounds.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not structural isomers of each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not enantiomers of each other.

In one embodiment the present invention provides a method of making an article comprising, combining an olefin metathesis catalyst composition comprising at least two metal carbene olefin metathesis catalysts and a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition.

In one embodiment the present invention provides a method of making an article comprising, combining an olefin metathesis catalyst composition comprising at least two metal carbene olefin metathesis catalysts and a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are structurally different from each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are chemically different from each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are distinct compounds.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not structural isomers of each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition.

In one embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are not enantiomers of each other.

In one embodiment the present invention provides a method of making an article comprising, combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition.

In one embodiment the present invention provides a method of making an article comprising, combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising, combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are structurally different from each other.

In another embodiment the present invention provides a method of making an article comprising, combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are chemically different from each other.

In another embodiment the present invention provides a method of making an article comprising, combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are distinct compounds.

In another embodiment the present invention provides a method of making an article comprising, combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not structural isomers of each other.

In another embodiment the present invention provides a method of making an article comprising, combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising, combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising, combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, wherein the article has less than one visible void per square inch of polymer.

In one embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer.

In one embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, wherein the article has less than one visible void per square inch of polymer, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, wherein the article has less than one visible void per square inch of polymer.

In one embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, wherein the article has less than one visible void per square inch of polymer.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, wherein the article has less than one visible void per square inch of polymer.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, wherein the article has less than one visible void per square inch of polymer.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, wherein the article has less than one visible void per square inch of polymer, and wherein the at least two metal carbene olefin metathesis catalysts are not enantiomers of each other.

In one embodiment the present invention provides an article of manufacture comprising an olefin metathesis catalyst composition comprising at least two metal carbene olefin metathesis catalysts, and a resin composition comprising at least one cyclic olefin and an optional exogenous inhibitor.

In one embodiment the present invention provides an article of manufacture comprising an olefin metathesis catalyst composition comprising at least two metal carbene olefin metathesis catalysts, and a resin composition comprising at least one cyclic olefin and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides an article of manufacture comprising an olefin metathesis catalyst composition comprising at least two metal carbene olefin metathesis catalysts, and a resin composition comprising at least one cyclic olefin and an optional exogenous inhibitor, wherein the at least two metal carbene olefin metathesis catalysts are structurally different from each other.

In another embodiment the present invention provides an article of manufacture comprising an olefin metathesis catalyst composition comprising at least two metal carbene olefin metathesis catalysts, and a resin composition comprising at least one cyclic olefin and an optional exogenous inhibitor, and wherein the at least two metal carbene olefin metathesis catalysts are chemically different from each other.

In another embodiment the present invention provides an article of manufacture comprising an olefin metathesis catalyst composition comprising at least two metal carbene olefin metathesis catalysts, and a resin composition comprising at least one cyclic olefin and an optional exogenous inhibitor, and wherein the at least two metal carbene olefin metathesis catalysts are distinct compounds.

In another embodiment the present invention provides an article of manufacture comprising an olefin metathesis catalyst composition comprising at least two metal carbene olefin metathesis catalysts, and a resin composition comprising at least one cyclic olefin and an optional exogenous inhibitor, and wherein the at least two metal carbene olefin metathesis catalysts are not structural isomers of each other.

In another embodiment the present invention provides an article of manufacture comprising an olefin metathesis catalyst composition comprising at least two metal carbene olefin metathesis catalysts, and a resin composition comprising at least one cyclic olefin and an optional exogenous inhibitor, and wherein the at least two metal carbene olefin metathesis catalysts are not diastereoisomers of each other.

In another embodiment the present invention provides an article of manufacture comprising an olefin metathesis catalyst composition comprising at least two metal carbene olefin metathesis catalysts, and a resin composition comprising at least one cyclic olefin and an optional exogenous inhibitor, and wherein the at least two metal carbene olefin metathesis catalysts are not stereoisomers of each other.

In another embodiment the present invention provides an article of manufacture comprising an olefin metathesis catalyst composition comprising at least two metal carbene olefin metathesis catalysts, and a resin composition comprising at least one cyclic olefin and an optional exogenous inhibitor, and wherein the at least two metal carbene olefin metathesis catalysts are not enantiomers of each other.

In one embodiment the present invention provides an article of manufacture comprising an olefin metathesis catalyst composition comprising at least two metal carbene olefin metathesis catalysts, a resin composition comprising at least one cyclic olefin, and an optional exogenous inhibitor, wherein the article has less than one visible void per square inch of polymer.

In one embodiment the present invention provides an article of manufacture comprising an olefin metathesis catalyst composition comprising at least two metal carbene olefin metathesis catalysts, a resin composition comprising at least one cyclic olefin, and an optional exogenous inhibitor, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides an article of manufacture comprising an olefin metathesis catalyst composition comprising at least two metal carbene olefin metathesis catalysts, a resin composition comprising at least one cyclic olefin, and an optional exogenous inhibitor, wherein the article has less than one visible void per square inch of polymer, and wherein the at least two metal carbene olefin metathesis catalysts are structurally different from each other.

In another embodiment the present invention provides an article of manufacture comprising an olefin metathesis catalyst composition comprising at least two metal carbene olefin metathesis catalysts, a resin composition comprising at least one cyclic olefin, and an optional exogenous inhibitor, wherein the article has less than one visible void per square inch of polymer, and wherein the at least two metal carbene olefin metathesis catalysts are chemically different from each other.

In another embodiment the present invention provides an article of manufacture comprising an olefin metathesis catalyst composition comprising at least two metal carbene olefin metathesis catalysts, a resin composition comprising at least one cyclic olefin, and an optional exogenous inhibitor, wherein the article has less than one visible void per square inch of polymer, and wherein the at least two metal carbene olefin metathesis catalysts are distinct compounds.

In another embodiment the present invention provides an article of manufacture comprising an olefin metathesis catalyst composition comprising at least two metal carbene olefin metathesis catalysts, a resin composition comprising at least one cyclic olefin, and an optional exogenous inhibitor, wherein the article has less than one visible void per square inch of polymer, and wherein the at least two metal carbene olefin metathesis catalysts are not structural isomers of each other.

In another embodiment the present invention provides an article of manufacture comprising an olefin metathesis catalyst composition comprising at least two metal carbene olefin metathesis catalysts, a resin composition comprising at least one cyclic olefin, and an optional exogenous inhibitor, wherein the article has less than one visible void per square inch of polymer, and wherein the at least two metal carbene olefin metathesis catalysts are not diastereoisomers of each other.

In another embodiment the present invention provides an article of manufacture comprising an olefin metathesis catalyst composition comprising at least two metal carbene olefin metathesis catalysts, a resin composition comprising at least one cyclic olefin, and an optional exogenous inhibitor, wherein the article has less than one visible void per square inch of polymer, and wherein the at least two metal carbene olefin metathesis catalysts are not stereoisomers of each other.

In another embodiment the present invention provides an article of manufacture comprising an olefin metathesis catalyst composition comprising at least two metal carbene olefin metathesis catalysts, a resin composition comprising at least one cyclic olefin, and an optional exogenous inhibitor, wherein the article has less than one visible void per square inch of polymer, and wherein the at least two metal carbene olefin metathesis catalysts are not enantiomers of each other.

In one embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor.

In one embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are structurally different from each other.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are chemically different from each other.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are distinct compounds.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are not structural isomers of each other.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are not diastereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are not stereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, and wherein the at least two metal carbene olefin metathesis catalysts are not enantiomers of each other.

In one embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, wherein the article has less than one visible void per square inch of polymer.

In one embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, wherein the article has less than one visible void per square inch of polymer, and wherein the at least two metal carbene olefin metathesis catalysts are structurally different from each other.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, wherein the article has less than one visible void per square inch of polymer, and wherein the at least two metal carbene olefin metathesis catalysts are chemically different from each other.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, wherein the article has less than one visible void per square inch of polymer, and wherein the at least two metal carbene olefin metathesis catalysts are distinct compounds.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, wherein the article has less than one visible void per square inch of polymer, and wherein the at least two metal carbene olefin metathesis catalysts are not structural isomers of each other.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, wherein the article has less than one visible void per square inch of polymer, and wherein the at least two metal carbene olefin metathesis catalysts are not diastereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, wherein the article has less than one visible void per square inch of polymer, and wherein the at least two metal carbene olefin metathesis catalysts are not stereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor, wherein the article has less than one visible void per square inch of polymer, and wherein the at least two metal carbene olefin metathesis catalysts are not enantiomers of each other.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are structurally different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are chemically different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are distinct compounds.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are not structural isomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are not diastereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are not stereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, and wherein the at least two metal carbene olefin metathesis catalysts are not enantiomers of each other.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, wherein the article has less than one visible void per square inch of polymer.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, wherein the article has less than one visible void per square inch of polymer, and wherein the at least two metal carbene olefin metathesis catalysts are structurally different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, wherein the article has less than one visible void per square inch of polymer, and wherein the at least two metal carbene olefin metathesis catalysts are chemically different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, wherein the article has less than one visible void per square inch of polymer, and wherein the at least two metal carbene olefin metathesis catalysts are distinct compounds.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, wherein the article has less than one visible void per square inch of polymer, and wherein the at least two metal carbene olefin metathesis catalysts are not structural isomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, wherein the article has less than one visible void per square inch of polymer, and wherein the at least two metal carbene olefin metathesis catalysts are not diastereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, wherein the article has less than one visible void per square inch of polymer, and wherein the at least two metal carbene olefin metathesis catalysts are not stereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor, wherein the article has less than one visible void per square inch of polymer, and wherein the at least two metal carbene olefin metathesis catalysts are not enantiomers of each other.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are structurally different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are chemically different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are distinct compounds.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are not structural isomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are not diastereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are not stereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, and wherein the at least two metal carbene olefin metathesis catalysts are not enantiomers of each other.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, wherein the article has less than one visible void per square inch of polymer.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, wherein the article has less than one visible void per square inch of polymer, and wherein the at least two metal carbene olefin metathesis catalysts are structurally different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, wherein the article has less than one visible void per square inch of polymer, and wherein the at least two metal carbene olefin metathesis catalysts are chemically different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, wherein the article has less than one visible void per square inch of polymer, and wherein the at least two metal carbene olefin metathesis catalysts are distinct compounds.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, wherein the article has less than one visible void per square inch of polymer, and wherein the at least two metal carbene olefin metathesis catalysts are not structural isomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, wherein the article has less than one visible void per square inch of polymer, and wherein the at least two metal carbene olefin metathesis catalysts are not diastereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, wherein the article has less than one visible void per square inch of polymer, and wherein the at least two metal carbene olefin metathesis catalysts are not stereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor, wherein the article has less than one visible void per square inch of polymer, and wherein the at least two metal carbene olefin metathesis catalysts are not enantiomers of each other.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are structurally different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are chemically different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are distinct compounds.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are not structural isomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are not diastereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are not stereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, and wherein the at least two metal carbene olefin metathesis catalysts are not enantiomers.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, wherein the article has less than one visible void per square inch of polymer.

In one embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, wherein the article has less than one visible void per square inch of polymer, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, wherein the article has less than one visible void per square inch of polymer, and wherein the at least two metal carbene olefin metathesis catalysts are structurally different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, wherein the article has less than one visible void per square inch of polymer, and wherein the at least two metal carbene olefin metathesis catalysts are chemically different from each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, wherein the article has less than one visible void per square inch of polymer, and wherein the at least two metal carbene olefin metathesis catalysts are distinct compounds.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, wherein the article has less than one visible void per square inch of polymer, and wherein the at least two metal carbene olefin metathesis catalysts are not structural isomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, wherein the article has less than one visible void per square inch of polymer, and wherein the at least two metal carbene olefin metathesis catalysts are not diastereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, wherein the article has less than one visible void per square inch of polymer, and wherein the at least two metal carbene olefin metathesis catalysts are not stereoisomers of each other.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor, wherein the article has less than one visible void per square inch of polymer, and wherein the at least two metal carbene olefin metathesis catalysts are not enantiomers of each other.

In one embodiment, the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition.

In one embodiment, the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment, the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are structurally different from each other.

In another embodiment, the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are chemically different from each other.

In another embodiment, the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are distinct compounds.

In another embodiment, the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not structural isomers of each other.

In another embodiment, the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not diastereoisomers of each other.

In another embodiment, the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not stereoisomers of each other.

In another embodiment, the present invention provides a method of making an article comprising combining an olefin metathesis catalyst composition comprising at least two metal carbene olefin metathesis catalysts, a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, and an optional exogenous inhibitor to form a ROMP composition, contacting the ROMP composition with a substrate material, and subjecting the ROMP composition to conditions effective to polymerize the ROMP composition, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one substrate material, and an optional exogenous inhibitor to form a ROMP composition, and subjecting the ROMP composition to conditions effective to polymerize the ROMP composition, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter, at least one compound comprising a heteroatom-containing functional group and a metathesis active olefin, at least one substrate material, and an optional exogenous inhibitor to form a ROMP composition, and subjecting the ROMP composition to conditions effective to polymerize the ROMP composition, and wherein the at least two metal carbene olefin metathesis catalysts are not enantiomers of each other.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition.

In one embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are structurally different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are chemically different from each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are distinct compounds.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are not structural isomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are not diastereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are not stereoisomers of each other.

In another embodiment the present invention provides a method of making an article comprising combining an olefin metathesis catalyst composition comprising at least two metal carbene olefin metathesis catalysts, a resin composition comprising at least one cyclic olefin, at least one adhesion promoter composition, at least one substrate material, and an optional exogenous inhibitor to form a ROMP composition, and subjecting the ROMP composition to conditions effective to polymerize the ROMP composition, and wherein the at least two metal carbene olefin metathesis catalysts are not enantiomers of each other.

While the present invention is of particular benefit for ring-opening metathesis polymerization (ROMP) reactions, it may also find use with other metathesis reactions, such as a ring-opening cross metathesis reaction, a cross metathesis reaction, a ring-closing metathesis reaction, a self-metathesis reaction, an ethenolysis reaction, an alkenolysis reaction, or an acyclic diene metathesis polymerization reaction, as well as combinations of such metathesis reactions.

These and other aspects of the present invention will be apparent to the skilled artisan in light of the following detailed description and examples.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE DISCLOSURE

Terminology and Definitions

Figure 1:
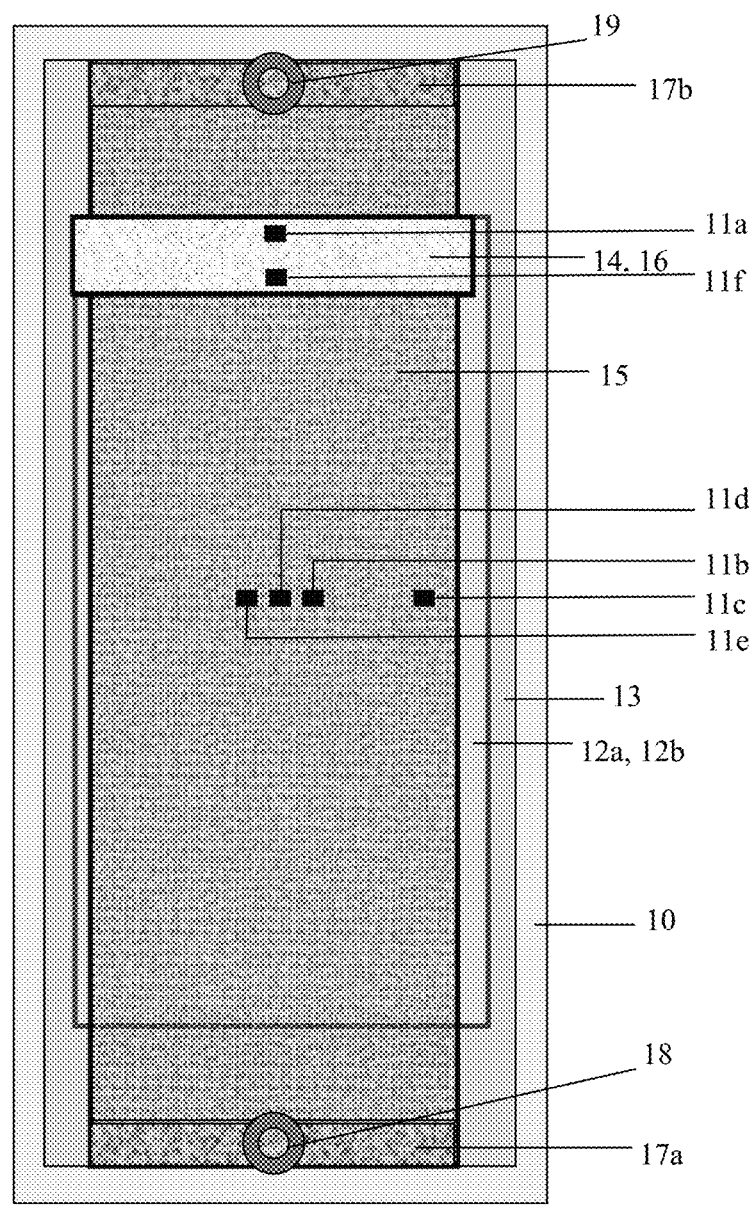
FIG. 1 is a diagram of the composite laminate as described in Examples 58 and 59.

Unless otherwise indicated, the invention is not limited to specific reactants, substituents, catalysts, catalyst compositions, resin compositions, reaction conditions, or the like, as such may vary. It is also to be understood that the terminology used herein is for the purpose of describing particular embodiments only and is not to be interpreted as being limiting.

As used in the specification and the appended claims, the singular forms "a," "an," and "the" include plural referents unless the context clearly dictates otherwise. Thus, for example, reference to "an α-olefin" includes a single α-olefin as well as a combination or mixture of two or more α-olefins, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl, and the like. Generally, although again not necessarily, alkyl groups herein contain 1 to about 12 carbon atoms. The term "lower alkyl" refers to an alkyl group of 1 to 6 carbon atoms, and the specific term "cycloalkyl" refers to a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" refers to an alkenyl group of 2 to 6 carbon atoms, and the specific term "cycloalkenyl" refers to a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" refers to an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein refers to an alkyl group bound through a single, terminal ether linkage; that is, an "alkoxy" group may be represented as —O-alkyl where alkyl is as defined above. A "lower alkoxy" group refers to an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, without limitation, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, —(CO)-aralkyl, —(CO)-alkaryl, —(CO)-alkenyl, or —(CO)-alkynyl, and the term "acyloxy" refers to substituents having the formula —O(CO)-alkyl, —O(CO)-aryl, —O(CO)-aralkyl, —O(CO)-alkaryl, —O(CO)-alkenyl, —O(CO)-alkynyl wherein "alkyl," "aryl," "aralkyl," "alkaryl," "alkenyl," and "alkynyl" are as defined above.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic.

The terms "halo" and "halogen" are used in the conventional sense to refer to a chloro, bromo, fluoro, or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated, and unsaturated species, such as alkyl groups, alkenyl groups, alkynyl groups, aryl groups, and the like. The term "lower hydrocarbyl" intends a hydrocarbyl group of 1 to 6 carbon atoms, preferably 1 to 4 carbon atoms, and the term "hydrocarbylene" refers to a divalent hydrocarbyl moiety containing 1 to about 30 carbon atoms, preferably 1 to about 24 carbon atoms, most preferably 1 to about 12 carbon atoms, including linear, branched, cyclic, saturated, and unsaturated species. The term "lower hydrocarbylene" refers to a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and heteratom-containing hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus, or silicon, typically nitrogen, oxygen, or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include without limitation alkoxyaryl, alkylsulfanyl-substituted alkyl, N-alkylated amino alkyl, and the like. Examples of heteroaryl substituents include without limitation pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups include without limitation pyrrolidino, morpholino, piperazino, piperidino, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—(CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO—), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), di-N—($C_1$-$C_{24}$ alkyl),N—($C_5$-$C_{24}$ aryl)-substituted carbamoyl (—(CO)—N($C_1$-$C_{24}$ alkyl)($C_5$-$C_{24}$ aryl), thiocarbamoyl (—(CS)—NH$_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), di-N—($C_1$-$C_{24}$ alkyl), N—($C_5$-$C_{24}$ aryl)-substituted thiocarbamoyl (—(CS)—N($C_1$-$C_{24}$ alkyl)($C_5$-$C_{24}$ aryl), carbamido (—NH—(CO)—NH$_2$), cyano (—C≡N), cyanato (—O—C≡N), thiocyanato (—S—C≡N), isocyanate (—N═C═O), thioisocyanate (—N═C═S), formyl (—(CO)—H), thioformyl (—(CS)—H), amino (—NH$_2$), mono-($C_1$-$C_{24}$ alkyl)-substituted amino (—NH($C_1$-$C_{24}$ alkyl), di-($C_1$-$C_{24}$ alkyl)-substituted amino (—N($C_1$-$C_{24}$ alkyl)$_2$), mono-($C_5$-$C_{24}$ aryl)-substituted amino (—NH($C_5$-$C_{24}$ aryl), di-($C_5$-$C_{24}$ aryl)-substituted amino (—N($C_5$-$C_{24}$ aryl)$_2$), $C_2$-$C_{24}$ alkylamido (—NH—(CO)-alkyl), $C_6$-$C_{24}$ arylamido (—NH—(CO)-aryl), imino (—CR═NH where R includes without limitation hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR═N(alkyl), where R includes without limitation hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR═N(aryl), where R includes without limitation hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$—OH), sulfonato (—SO$_2$—O—), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_1$-$C_{24}$ monoalkylaminosulfonyl (—SO$_2$—N(H) alkyl), $C_1$-$C_{24}$ dialkylaminosulfonyl (—SO$_2$—N(alkyl)$_2$), $C_5$-$C_{24}$ arylsulfonyl (—SO$_2$-aryl), boryl (—BH$_2$), borono (—B(OH)$_2$), boronato (—B(OR)$_2$ where R includes without limitation alkyl or other hydrocarbyl), phosphono (—P(O)(OH)$_2$), phosphonato (—P(O)(O$^-$)$_2$), phosphinato (—P(O)(O$^-$)), phospho (—PO$_2$), and phosphino (—PH$_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl).

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one hydrogen atom bound to a carbon (or other) atom is replaced with one or more functional groups such as those described hereinabove. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups may, if a particular group permits, be further substituted with one or more additional functional groups or with one or more hydrocarbyl moieties such as those specifically mentioned above. Analogously, the above-mentioned hydrocarbyl moieties may be further substituted with one or more functional groups or additional hydrocarbyl moieties as noted above.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The term "substrate material" as used herein, is intended to generally mean any material that the resin compositions of the invention or ROMP compositions (e.g., polymerizable compositions) of the invention may be contacted with, applied to, or have the substrate material incorporated in to the resin. Without limitation, such materials include reinforcing materials, such as filaments, fibers, rovings, mats, weaves, fabrics, knitted material, cloth or other known structures, glass fibers and fabrics, carbon fibers and fabrics, aramid fibers and fabrics, and polyolefin or other polymer fibers or fabrics. Other suitable substrate materials include metallic density modulators, microparticulate density modulators, such as microspheres, and macroparticulate density modulators, such as glass or ceramic beads.

The term "isomers" as used herein, refers to compounds which have the same molecular formula.

The term "structural isomers" as used herein, refers to compounds which have the same molecular formula but the atoms are linked together in different ways.

The term "stereoisomers" as used herein, refers to compounds which contain the same number and types of atoms, and bonds (i.e., the connectivity between atoms is the same), but their atoms and groups of atoms are arranged differently in space.

The term "diastereoisomers" as used herein, refers to stereoisomers that are not mirror images of one another and are not non-superimposable on one another.

The term "enantiomers" as used herein, refers to a pair of molecules that are mirror image of each other.

As used herein the term "structurally different" means that for the at least two metal carbene olefin metathesis catalysts, each of the metal carbene olefin metathesis catalysts possess at least one different ligand attached to the Group 8 transition metal (e.g., Ru). Therefore, two or more metal carbene olefin metathesis catalysts which are structurally different are not isomers, are not structural isomers, are not diastereomers, are not stereoisomers, are not enantiomers, or are not cis/trans isomers of each other. For example, metal carbene olefin metathesis catalysts C848 and C827 (described below) are structurally different from each other. As another example, metal carbene olefin metathesis catalysts C771, C713, and C747 (described below) are each structurally different from one another.

As used herein the term "chemically different" refers to compounds which have different molecular formulae.

As used in the specification and the appended claims, the terms "reactive formulation," "polymerizable composition," and "ROMP composition" have the same meaning and are used interchangeably herein.

In reference to the ROMP reaction of a resin composition comprising at least one cyclic olefin catalyzed by a single metal carbene olefin metathesis catalyst or the ROMP reaction of a resin composition comprising at least one cyclic olefin catalyzed by an olefin metathesis catalyst composition comprising at least two metal carbene olefin metathesis catalysts, the term "onset of a ROMP reaction" generally refers to the increase in the viscosity of the resin composition that occurs during polymerization just prior to gelation. The progress of an olefin metathesis polymerization can be cheaply and conveniently monitored by measuring the increase in viscosity as the reaction proceeds from the liquid monomer state to the gelled state.

The progress of an olefin metathesis polymerization may also be cheaply and conveniently monitored by measuring the temperature increase as the metathesis reaction proceeds from the monomer to the cured state. In general, measurement of the exotherm profile is convenient and provides an understanding of the cure behavior and when the cured state is achieved. The exotherm peak temperature is the maximum temperature the resin or ROMP composition reaches during the polymerization and may be related to the completeness of the polymerization reaction. Lower exotherm peak temperatures may in some instances be an indication of incomplete polymerization. However, it is important to note that there are some instances in which it is desirable that the resin or ROMP composition not exotherm or that the exotherm peak temperature is lowered or suppressed or the time to exotherm is delayed. For example, it may be advantageous or desirable that the resin or ROMP composition not exotherm or possess a lowered exotherm peak temperature or possess a delayed time to exotherm when molding polymer articles or polymer composites using non-metal tooling or molds, such as composite tooling or molds.

The terms "pot life" and "gel time" are generally used interchangeably. Various techniques and equipment useful for determining gel time are known in the art and may be utilized in the present invention. For example, the gel behavior, including the gel time and pot life, may be cheaply and conveniently determined using a viscometer, as described in the examples, or by other suitable techniques. In many cases, it is convenient and sufficient to estimate the gel time by qualitative observation of properties such as pourability or elasticity. Such techniques must necessarily allow for an increase in the gel time to be determined, such that, in the context of the present invention, the difference in gel time can be determined between (i) cyclic olefin resin compositions combined with a single metal carbene olefin metathesis catalyst; and (ii) cyclic olefin resin compositions combined with an olefin metathesis catalyst composition comprising at least two metal carbene olefin metathesis catalysts. The skilled artisan will appreciate that measurement of the actual gel time may depend on the equipment and techniques utilized, as well as the type of composition being evaluated. However, in the context of the present invention, a determination of the relative increase or decrease in gel time achieved through the use of an olefin metathesis catalyst composition comprising at least two metal carbene olefin metathesis catalysts should not be affected by the particular technique or equipment utilized to determine the gel time.

The skilled artisan will also appreciate that the "working time" (or "workable pot life") may vary for different ROMP compositions and, for a particular ROMP composition, may also depend on the application or equipment utilized. Typically, the working time is greater than the time to onset of the polymerization (e.g., when the viscosity begins to rise), but less than the exotherm time.

The term "hard polymer gel" as used herein is intended to mean a polymer gel having a durometer hardness in the range of 1-70, preferably in the range of 5-60, more preferably in the range of 10-50, as measured using a durometer (Model HP-10F-M) from Albuquerque Industrial Inc.

Controlling the Polymerization of ROMP Reactions

In general, metal carbene olefin metathesis catalysts for use with the present invention may be selected from any metal carbene olefin metathesis catalyst. Preferably, metal carbene olefin metathesis catalysts for use with the present invention may be selected from any of the ruthenium or osmium metal carbene olefin metathesis catalysts disclosed herein.

Without being bound by theory, as discussed supra it is known that the ligand environment of a metal carbene olefin metathesis catalyst can affect the polymerization properties (e.g., rate of initiation, rate of propagation, rate of polymerization, initiation rate constant ($k_i$), propagation rate constant ($k_p$), initiation rate constant/propagation rate constant ratio ($k_i/k_p$ ratio), rate of viscosity increase, time to 30 cP viscosity, time to hard polymer gel, time to peak exotherm temperature, etc.) of cyclic olefin monomer in a ROMP reaction.

For example, for what are commonly known as Second Generation Grubbs Catalysts, as shown below in Table 1, metal carbene olefin metathesis catalysts possessing a benzylidene moiety generally possess faster rates of initiation than metal carbene olefin metathesis catalysts possessing a dimethylvinyl alkylidene moiety, where the remainder of the ligands attached to the transition metal (e.g., ruthenium) are the same. Furthermore, as shown in Table 1, metal carbene olefin metathesis catalysts possessing a phenylindenylidene moiety generally possess slower rates of initiation than metal carbene olefin metathesis catalysts possessing a dimethylvinyl alkylidene moiety, where the remainder of the ligands attached to the transition metal (e.g., ruthenium) are the same. In summary, as shown in Table 1 the rate of initiation decreases in the following order: benzylidene>dimethylvinyl alkylidene>phenylindenylidene.

Further examination of Table 1, also demonstrates the effect of tertiary phosphine ligand structure has on the rate of initiation of Second Generation Grubbs Catalysts where the remainder of the ligands attached to the transition metal (e.g., ruthenium) are the same. In summary, as shown in Table 1, the rate of initiation decreases as a function of the tertiary phosphine structure in the following order: $PPh_3>PMePh_2>PCy_3>PEt_2Ph>P(n-Bu)_3$.

TABLE 1
Rates of initiation as a function of ligand environment for Second Generation Grubbs Catalysts.
| PPh$_3$ | PMePh$_2$ | PCy$_3$ | |
|---|---|---|---|
| 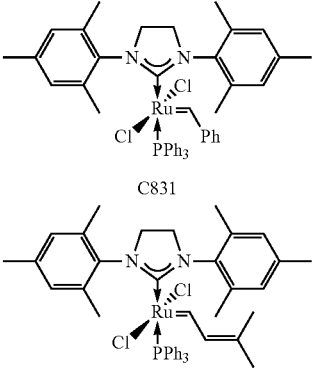<br>C831 | 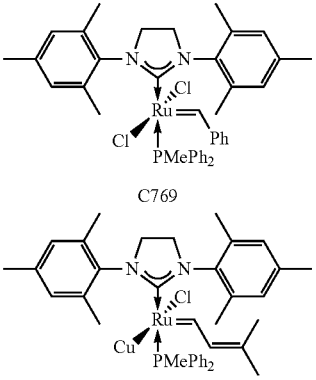<br>C769 | 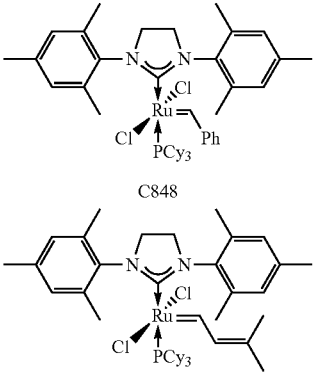<br>C848 | Fast initiators |
| 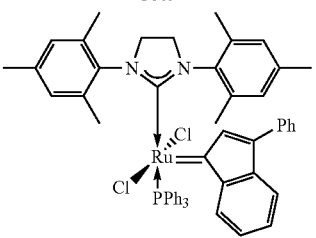<br>C809 | 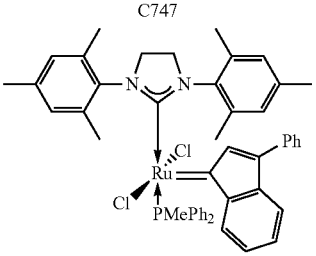<br>C747 | 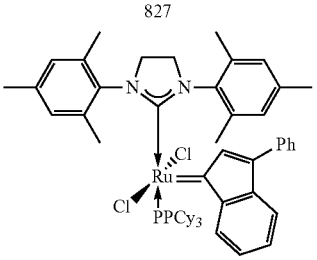<br>827 | |
| 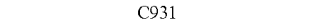<br>C931 | 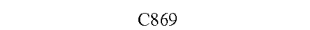<br>C869 | 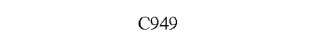<br>C949 | Slow initiators |
Fast initiators ⎯⎯⎯⎯⎯⎯⎯⎯⎯⎯⎯⎯⎯⎯⎯⎯→
| PEt$_2$Ph | P(nBu)$_3$ | |
|---|---|---|
| 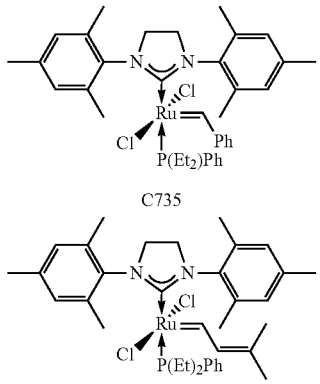<br>C735 | 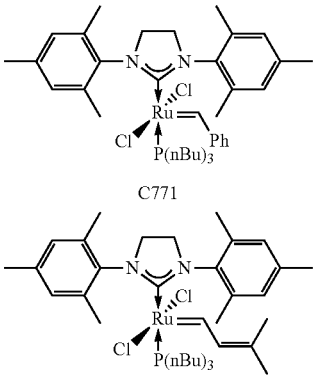<br>C771 | Fast initiators |
| 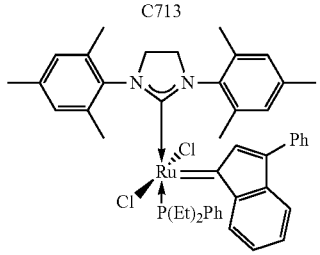<br>C713 | 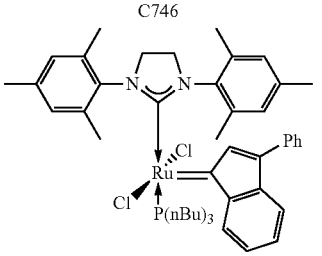<br>C746 | |
| 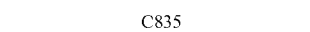<br>C835 | 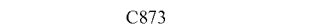<br>C873 | Slow initiators |
Fast initiators ⎯⎯⎯⎯⎯⎯⎯⎯⎯⎯⎯⎯⎯⎯⎯⎯→

Surprisingly, the inventors have discovered that one or more of the polymerization properties of individual metal carbene olefin metathesis catalysts (e.g., rate of initiation, rate of propagation, rate of polymerization, initiation rate constant ($k_i$), propagation rate constant ($k_p$), initiation rate constant/propagation rate constant ratio ($k_i/k_p$ ratio), rate of viscosity increase, time to 30 cP viscosity, time to hard polymer gel, time to peak exotherm temperature, etc.) can be used to form olefin metathesis catalyst compositions comprising at least two metal carbene olefin metathesis catalysts, wherein the olefin metathesis catalyst compositions comprising at least two metal carbene olefin metathesis catalysts can be combined with a resin composition comprising at least one cyclic olefin to form a ROMP composition, where the ROMP composition can be used to prepare a polymer article with improved properties compared to the same polymer article prepared with a prior art ROMP composition.

The inventors have discovered that one or more of the polymerization properties of individual metal carbene olefin metathesis catalysts (e.g., rate of initiation, rate of propagation, rate of polymerization, initiation rate constant ($k_i$), propagation rate constant ($k_p$), initiation rate constant/propagation rate constant ratio ($k_i/k_p$ ratio), rate of viscosity increase, time to 30 cP viscosity, time to hard polymer gel, time to peak exotherm temperature, etc.) can be used to form olefin metathesis catalyst compositions comprising at least two metal carbene olefin metathesis catalysts, wherein the olefin metathesis catalyst compositions comprising at least two metal carbene olefin metathesis catalysts can be combined with a resin composition comprising at least one cyclic olefin to form a ROMP composition, where the ROMP composition can be used to prepare a polymer article with improved properties compared to the same polymer article prepared with a prior art ROMP composition, and wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

More particularly, the inventors have discovered that olefin metathesis catalyst compositions comprising at least two metal carbene olefin metathesis catalysts, when combined with a resin composition comprising at least one cyclic olefin and an optional exogenous inhibitor to form a ROMP composition, enables independent control over the time required for the ROMP composition to reach a hard polymer gel relative to the exotherm time. This hard polymer gel may be subsequently cured through the addition of an external energy source (e.g., heating of a mold surface and/or post cure step) and/or through internal energy (e.g., in the form of exothermic heat of reaction generated by ring opening during ROMP).

The inventors have discovered that olefin metathesis catalyst compositions comprising at least two metal carbene olefin metathesis catalysts, when combined with a resin composition comprising at least one cyclic olefin and an optional exogenous inhibitor to form a ROMP composition, enables independent control over the time required for the ROMP composition to reach a hard polymer gel relative to the exotherm time, and wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

Furthermore, the inventors have discovered that ROMP compositions comprising an olefin metathesis catalyst composition comprising at least two metal carbene olefin metathesis catalysts and a resin composition comprising at least one cyclic olefin and an optional exogenous inhibitor enables various regions or sections of an article being molded to uniformly form a hard polymer gel before various regions or sections of an article being molded begin to exotherm, thereby reducing and/or eliminating the volatilization of liquid cyclic olefin monomer which in turn leads to a reduction and/or elimination of defects in the molded article.

Moreover, the inventors have discovered that ROMP compositions comprising an olefin metathesis catalyst composition comprising at least two metal carbene olefin metathesis catalysts, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof, and a resin composition comprising at least one cyclic olefin and an optional exogenous inhibitor enables various regions or sections of an article being molded to uniformly form a hard polymer gel before various regions or sections of an article being molded begin to exotherm, thereby reducing and/or eliminating the volatilization of liquid cyclic olefin monomer which in turn leads to a reduction and/or elimination of defects in the molded article.

Furthermore, the inventors have discovered that under the same molding conditions and using the same cyclic olefin resin composition, the time required to make an article is reduced when an olefin metathesis catalyst composition comprising at least two metal carbene olefin metathesis catalysts is used in place of a single metal carbene olefin metathesis catalyst. This reduction in time (reduction in cycle time) provides for an economic advantage in that more articles can be made during the same time period when an olefin metathesis catalyst composition comprising at least two metal carbene olefin metathesis catalysts is used in place of a single metal carbene olefin metathesis catalyst in the ROMP of a cyclic olefin resin. Therefore, an advantage of the invention is that more articles can be made during the same time period when an olefin metathesis catalyst composition comprising at least two metal carbene olefin metathesis catalysts is used, in place of a single metal carbene olefin metathesis catalyst in the ROMP of a cyclic olefin resin, wherein the at least two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

Before selecting the individual metal carbene olefin metathesis catalysts for use in the catalyst compositions of the invention and before preparing a catalyst composition of the invention it is important to examine the ligand environment and to measure one or more of the polymerization properties (e.g., rate of initiation, rate of propagation, rate of polymerization, initiation rate constant ($k_i$), propagation rate constant ($k_p$), initiation rate constant/propagation rate constant ratio ($k_i/k_p$ ratio), rate of viscosity increase, time to 30 cP viscosity, time to hard polymer gel, time to peak exotherm temperature, etc.) of the individual metal carbene olefin metathesis catalysts. Methods for categorizing and selecting the individual metal carbene olefin metathesis catalysts for use in preparing catalyst compositions of the invention are discussed below.

Olefin Metathesis Catalyst Compositions Comprising at Least Two Metal Carbene Olefin Metathesis Catalysts When selecting the individual metal carbene olefin metathesis catalysts for use in a catalyst composition of the invention one will typically select individual metal carbene olefin metathesis catalysts having dissimilar activity/behavior in an olefin metathesis reaction (e.g., ROMP of a cyclic olefin). However, before individual metal carbene olefin metathesis catalysts can be selected for use in a catalyst composition of the invention, the individual metal carbene olefin metathesis catalysts must first be categorized into different groups based on their activity/behavior in an olefin metathesis reaction (e.g., ROMP of a cyclic olefin) under identical conditions. One will typically select individual metal carbene olefin metathesis catalysts which are structurally different, are chemically different, are distinct compounds, are not isomers, are not structural isomers, are not diastereoisomers, are not stereoisomers, are not enantiomers, or are not cis/trans isomers of each other, or any combinations thereof.

Different criteria may be used for categorizing the individual metal carbene olefin metathesis catalysts for use in a catalyst composition of the invention. Such criteria include, but are not limited to one or more of the polymerization properties displayed by the individual metal carbene olefin metathesis catalysts when combined with a cyclic olefin resin, where the polymerization properties include but are not limited to the rate of initiation, rate of propagation, rate of polymerization, initiation rate constant ($k_i$), propagation rate constant ($k_p$), initiation rate constant/propagation rate constant ratio ($k_i/k_p$ ratio), rate of viscosity increase, time to 30 cP viscosity, time to hard polymer gel, time to peak exotherm temperature, etc.

For example, one type of criteria which may be used for categorizing the individual metal carbene olefin metathesis catalysts for use in the catalyst compositions of the invention is the time required for a cyclic olefin resin catalyzed with a single metal carbene olefin metathesis catalyst to reach a measurable viscosity at a constant temperature. As shown in Table 5 herein, the individual metal carbene olefin metathesis catalysts were categorized as being fast, moderate, or slow initiators based on the time required for Resin Composition A, described infra, when combined with a single metal carbene olefin metathesis catalyst to reach a viscosity of 30 cP at 30° C. according to the methodology described infra. Using this criteria and methodology, individual metal carbene olefin metathesis catalysts having a time to 30 cP viscosity at 30° C. of less than 1 minute were categorized as fast initiators; individual metal carbene olefin metathesis catalysts having a time to 30 cP viscosity at 30° C. of greater than 1 minute, but less than 10 minutes, were categorized as moderate initiators; and individual metal carbene olefin metathesis catalysts having a time to 30 cP viscosity at 30° C. of greater than 10 minutes were categorized as slow initiators. Using this criteria and methodology, as shown herein in Table 1 and/or listed in Table 5, individual metal carbene olefin metathesis catalysts, where the monomer to catalyst ratio was 45,000:1 at 2 grams of catalyst suspension per 100 grams of DCPD monomer, were categorized as (i) fast initiators C627, C831, C848, C747; (ii) moderate initiators C827, C713, C869; and (iii) slow initiators C771, C835, C871. In addition, using this criteria and methodology, as shown herein in Table 1 and/or listed in Table 5, individual metal carbene olefin metathesis catalysts, where the monomer to catalyst ratio was 15,000:1 at 2 grams of catalyst suspension per 100 grams of DCPD monomer, were categorized as (i) fast initiators C747, C848, C827; (ii) moderate initiators C713, C771; and (iii) slow initiators C835, C871. In addition, using this criteria and methodology, as shown herein in Table 1 and/or listed in Table 5, individual metal carbene olefin metathesis catalysts, where the monomer to catalyst ratio was 90,000:1 at 2 grams of catalyst suspension per 100 grams of DCPD monomer, were categorized as (i) fast initiators C747; (ii) moderate initiators C848, C827, C713; and (iii) slow initiators C771, C835, C871.

Once the individual metal carbene olefin metathesis catalysts were categorized as fast, moderate, or slow initiators, then this information may be used to prepare olefin metathesis catalyst compositions of the invention (i.e., olefin metathesis catalyst compositions comprising at least two metal carbene olefin metathesis catalysts). The individual metal carbene olefin metathesis catalysts selected from the different categories presented herein, and selected to prepare olefin metathesis catalyst compositions comprising at least two metal carbene olefin metathesis catalysts, are structurally different, are chemically different, are distinct compounds, are not isomers, are not structural isomers, are not diastereoisomers, are not stereoisomers, are not enantiomers, or are not cis/trans isomers of each other, or any combinations thereof.

As discussed supra, in order to recognize the benefits of the invention, the individual metal carbene olefin metathesis catalysts used in the catalyst composition should have dissimilar activity/behavior (e.g., time to 30 cP viscosity, initiation rate constant ($k_i$), etc.) in an olefin metathesis reaction (e.g., ROMP) under identical conditions.

An olefin metathesis catalyst composition comprising two metal carbene olefin metathesis catalysts can have several different combinations of individual metal carbene olefin metathesis catalysts, wherein each metal carbene olefin metathesis catalyst is categorized as a fast initiator, a moderate initiator, or a slow initiator. Using these fast, moderate, and slow categories, according to the broadest construction, olefin metathesis catalyst compositions comprising two metal carbene olefin metathesis catalysts could have up to six different general combinations: (i) fast-fast; (ii) fast-moderate; (iii) fast-slow; (iv) moderate-moderate; (v) moderate-slow; and (vi) slow-slow. In one preferred embodiment, an olefin metathesis catalyst composition comprising two metal carbene olefin metathesis catalysts comprises a first metal carbene olefin metathesis catalyst and a second metal carbene olefin metathesis catalyst, wherein the first metal carbene olefin metathesis catalyst is categorized as a fast initiator and the second metal carbene olefin metathesis catalyst is categorized as a moderate initiator. In another embodiment, an olefin metathesis catalyst composition comprising two metal carbene olefin metathesis catalysts comprises a first metal carbene olefin metathesis catalyst and a second metal carbene olefin metathesis catalyst, wherein the first metal carbene olefin metathesis catalyst is categorized as a fast initiator and the second metal carbene olefin metathesis catalyst is categorized as a moderate initiator, and wherein the two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another preferred embodiment, an olefin metathesis catalyst composition comprising two metal carbene olefin metathesis catalysts comprises a first metal carbene olefin metathesis catalyst and a second metal carbene olefin metathesis catalyst, wherein the first metal carbene olefin metathesis catalyst is categorized as a fast initiator and the second metal carbene olefin metathesis catalyst is categorized as a slow initiator. In another embodiment, an olefin metathesis catalyst composition comprising two metal carbene olefin metathesis catalysts comprises a first metal carbene olefin metathesis catalyst and a second metal carbene olefin metathesis catalyst, wherein the first metal carbene olefin metathesis catalyst is categorized as a fast initiator and the second metal carbene olefin metathesis catalyst is categorized as a slow initiator, and wherein the two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

In another preferred embodiment, an olefin metathesis catalyst composition comprising two metal carbene olefin metathesis catalysts comprises a first metal carbene olefin metathesis catalyst and a second metal carbene olefin metathesis catalyst, wherein the first metal carbene olefin metathesis catalyst is categorized as a moderate initiator and the second metal carbene olefin metathesis catalyst is categorized as a slow initiator. In another embodiment, an olefin metathesis catalyst composition comprising two metal carbene olefin metathesis catalysts comprises a first metal carbene olefin metathesis catalyst and a second metal carbene olefin metathesis catalyst, wherein the first metal carbene olefin metathesis catalyst is categorized as a moderate initiator and the second metal carbene olefin metathesis catalyst is categorized as a slow initiator, and wherein the two metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

Without being bound by theory, generally for olefin metathesis catalyst compositions comprising two metal carbene olefin metathesis catalysts, if there is a large difference in the relative rates of initiation or time to 30 cP viscosity between the first metal carbene olefin metathesis catalyst (i.e., a catalyst categorized as a fast initiator) and a second metal carbene olefin metathesis catalyst (i.e., a catalyst categorized as a slow initiator), then generally the benefits of the present invention (e.g., independent control over the time required for the ROMP composition to reach a hard polymer gel relative to the peak exotherm time; reduction and/or elimination of molded article defects; reduction and/or elimination of liquid cyclic olefin monomer volatilization during ROMP, etc.) may be recognized by having a greater concentration of the second metal carbene olefin metathesis catalyst (i.e., a catalyst categorized as a slow initiator) and lower concentration of the first metal carbene olefin metathesis catalyst (i.e., a catalyst categorized as a fast initiator). Experimental support for this is provided in Table 6 (Examples 26, 30, 31, 32, 35, 39), infra.

In comparison, without being bound by theory, generally for olefin metathesis catalyst compositions comprising two metal carbene olefin metathesis catalysts, if the relative rates of initiation or time to 30 cP viscosity between the first metal carbene olefin metathesis catalyst (i.e., a catalyst categorized as a moderate initiator) and the second olefin metathesis catalyst (i.e., a catalyst categorized as a fast initiator or a slow initiator) are more similar, then generally the benefit of the present invention may be recognized by (i) having an equal concentration of both the first and second metal carbene olefin metathesis catalysts; or (ii) having a greater concentration of the second metal carbene olefin metathesis catalyst (i.e., a catalyst categorized as a slow initiator) and a lower concentration of the first metal carbene olefin metathesis catalyst (i.e., a catalyst categorized as a moderate initiator); or (iii) having a greater concentration of the first metal carbene olefin metathesis catalyst (i.e., a catalyst categorized as a moderate initiator) and a lower concentration of the second metal carbene olefin metathesis catalyst (i.e., a catalyst categorized as a fast initiator). Experimental support for this is provided in Table 6 (Examples 27, 28, 34, 37, 38, 40, 41, 42, 58, 60, 63), infra.

Generally, for an olefin metathesis catalyst composition comprising two metal carbene olefin metathesis catalysts, when expressed as the molar ratio of monomer to catalyst (the "monomer to catalyst ratio"), the catalyst loading will generally be presented as an overall monomer to catalyst ratio (the "total monomer to catalyst ratio"), where the overall monomer to catalyst ratio is the sum of the monomer to catalyst ratio of the first metal carbene olefin metathesis catalyst and the monomer to catalyst ratio of the second metal carbene olefin metathesis catalyst. The overall catalyst loading (the overall monomer to catalyst ratio) will generally be present in an amount that ranges from about 10,000,000:1 to about 1,000:1, preferably from about 1,000,000:1 to 5,000:1, more preferably from about 500,000:1 to 10,000:1, even more preferably from about 250,000:1 to 20,000:1, As one example, at an overall monomer to catalyst ratio of 45,000:1, for an olefin metathesis catalyst composition comprising two metal carbene olefin metathesis catalysts, where the first metal carbene olefin metathesis catalyst is categorized as a fast initiator and the second metal carbene olefin metathesis catalyst is categorized as a slow initiator, the first metal carbene olefin metathesis catalyst will generally be present in an amount (monomer to catalyst ratio) from 5,000,000:1 to 500,000:1, the second metal carbene olefin metathesis catalyst will generally be present in an amount (monomer to catalyst ratio) from 45,409:1 to 49,451:1.

As another example, at an overall monomer to catalyst ratio of 45,000:1, for an olefin metathesis catalyst composition comprising two metal carbene olefin metathesis catalysts, where the first metal carbene olefin metathesis catalyst is categorized as a fast initiator and the second metal carbene olefin metathesis catalyst is categorized as a moderate initiator, the first metal carbene olefin metathesis catalyst will generally be present in an amount (monomer to catalyst ratio) from 3,000,000:1 to 90,000:1, the second metal carbene olefin metathesis catalyst will generally be present in an amount (monomer to catalyst ratio) from 45,685:1 to 90,000:1.

As another example, at an overall monomer to catalyst ratio of 45,000:1, for an olefin metathesis catalyst composition comprising two metal carbene olefin metathesis catalysts, where the first metal carbene olefin metathesis catalyst is categorized as a moderate initiator and the second metal carbene olefin metathesis catalyst is categorized as a slow initiator, the first metal carbene olefin metathesis catalyst will generally be present in an amount (monomer to catalyst ratio) from 1,000,000:1 to 90,000:1, the second metal carbene olefin metathesis catalyst will generally be present in an amount (monomer to catalyst ratio) from 47,120:1 to 90,000:1.

As another example, at an overall monomer to catalyst ratio of 15,000:1, for an olefin metathesis catalyst composition comprising two metal carbene olefin metathesis catalysts, where the first metal carbene olefin metathesis catalyst is categorized as a fast initiator and the second metal carbene olefin metathesis catalyst is categorized as a slow initiator, the first metal carbene olefin metathesis catalyst will generally be present in an amount (monomer to catalyst ratio) from 5,000,000:1 to 500,000:1, the second metal carbene olefin metathesis catalyst will generally be present in an amount (monomer to catalyst ratio) from 15,045:1 to 15,464:1.

As another example, at an overall monomer to catalyst ratio of 15,000:1, for an olefin metathesis catalyst composition comprising two metal carbene olefin metathesis catalysts, where the first metal carbene olefin metathesis catalyst is categorized as a fast initiator and the second metal carbene olefin metathesis catalyst is categorized as a moderate initiator, the first metal carbene olefin metathesis catalyst will generally be present in an amount (monomer to catalyst ratio) from 3,000,000:1 to 30,000:1, the second metal carbene olefin metathesis catalyst will generally be present in an amount (monomer to catalyst ratio) from 15,075:1 to 30,000:1.

As another example, at an overall monomer to catalyst ratio of 15,000:1, for an olefin metathesis catalyst composition comprising two metal carbene olefin metathesis catalysts, where the first metal carbene olefin metathesis catalyst is categorized as a moderate initiator and the second metal carbene olefin metathesis catalyst is categorized as a slow initiator, the first metal carbene olefin metathesis catalyst will generally be present in an amount (monomer to catalyst ratio) from 1,000,000:1 to 30,000:1, the second metal carbene olefin metathesis catalyst will generally be present in an amount (monomer to catalyst ratio) from 15,228:1 to 30,000:1.

As another example, at an overall monomer to catalyst ratio of 90,000:1, for an olefin metathesis catalyst composition comprising two metal carbene olefin metathesis catalysts, where the first metal carbene olefin metathesis catalyst is categorized as a fast initiator and the second metal carbene olefin metathesis catalyst is categorized as a slow initiator, the first metal carbene olefin metathesis catalyst will generally be present in an amount (monomer to catalyst ratio) from 5,000,000:1 to 500,000:1, the second metal carbene olefin metathesis catalyst will generally be present in an amount (monomer to catalyst ratio) from 91,650:1 to 109,756:1.

As another example, at an overall monomer to catalyst ratio of 90,000:1, for an olefin metathesis catalyst composition comprising two metal carbene olefin metathesis catalysts, where the first metal carbene olefin metathesis catalyst is categorized as a fast initiator and the second metal carbene olefin metathesis catalyst is categorized as a moderate initiator, the first metal carbene olefin metathesis catalyst will generally be present in an amount (monomer to catalyst ratio) from 3,000,000:1 to 180,000:1, the second metal carbene olefin metathesis catalyst will generally be present in an amount (monomer to catalyst ratio) from 92,784:1 to 180,000:1.

As another example, at an overall monomer to catalyst ratio of 90,000:1, for an olefin metathesis catalyst composition comprising two metal carbene olefin metathesis catalysts, where the first metal carbene olefin metathesis catalyst is categorized as a moderate initiator and the second metal carbene olefin metathesis catalyst is categorized as a slow initiator, the first metal carbene olefin metathesis catalyst will generally be present in an amount (monomer to catalyst ratio) from 1,000,000:1 to 180,000:1, the second metal carbene olefin metathesis catalyst will generally be present in an amount (monomer to catalyst ratio) from 98,901:1 to 180,000:1.

The olefin metathesis catalyst composition comprising two metal carbene olefin metathesis catalysts, in any monomer to catalyst ratio as described herein, refers to a composition wherein the two metal carbene olefin metathesis catalysts, are structurally different, are chemically different, are distinct compounds, are not isomers, are not structural isomers, are not diastereoisomers, are not stereoisomers, are not enantiomers, or are not cis/trans isomers of each other, or any combinations thereof.

A composition comprising a first metal carbene olefin metathesis catalyst and a second metal carbene olefin metathesis catalyst, wherein the first metal carbene olefin metathesis catalyst and the second metal carbene olefin metathesis catalyst are structurally different, are chemically different, are distinct compounds, are not isomers, are not structural isomers, are not diastereoisomers, are not stereoisomers, are not enantiomers, or are not cis/trans isomers of each other, or any combination thereof.

A composition comprising a first metal carbene olefin metathesis catalyst and a second metal carbene olefin metathesis catalyst, wherein the first metal carbene olefin metathesis catalyst and the second metal carbene olefin metathesis catalyst are structurally different from each other.

An olefin metathesis catalyst composition comprising a first metal carbene olefin metathesis catalyst and a second metal carbene olefin metathesis catalyst, wherein the first metal carbene olefin metathesis catalyst and the second metal carbene olefin metathesis catalyst are structurally different, are chemically different, are distinct compounds, are not isomers, are not structural isomers, are not diastereoisomers, are not stereoisomers, are not enantiomers, or are not cis/trans isomers of each other, or any combination thereof.

An olefin metathesis catalyst composition comprising a first metal carbene olefin metathesis catalyst and a second metal carbene olefin metathesis catalyst, wherein the first metal carbene olefin metathesis catalyst and the second metal carbene olefin metathesis catalyst are structurally different from each other.

A composition comprising a first metal carbene olefin metathesis catalyst, a second metal carbene olefin metathesis catalyst, and a third metal carbene olefin metathesis catalyst, wherein the first metal carbene olefin metathesis catalyst, the second metal carbene olefin metathesis catalyst, and the third metal carbene olefin metathesis catalyst are structurally different, are chemically different, are distinct compounds, are not isomers, are not structural isomers, are not diastereoisomers, are not stereoisomers, are not enantiomers, or are not cis/trans isomers of each other, or any combination thereof.

A composition comprising a first metal carbene olefin metathesis catalyst, a second metal carbene olefin metathesis catalyst, and a third metal carbene olefin metathesis catalyst, wherein the first metal carbene olefin metathesis catalyst, the second metal carbene olefin metathesis catalyst, and the third metal carbene olefin metathesis catalyst are structurally different from each other.

An olefin metathesis catalyst composition comprising a first metal carbene olefin metathesis catalyst, a second metal carbene olefin metathesis catalyst, and a third metal carbene olefin metathesis catalyst, wherein the first metal carbene olefin metathesis catalyst, the second metal carbene olefin metathesis catalyst, and the third metal carbene olefin metathesis catalyst are structurally different, are chemically different, are distinct compounds, are not isomers, are not structural isomers, are not diastereoisomers, are not stereoisomers, are not enantiomers, or are not cis/trans isomers of each other, or any combination thereof.

An olefin metathesis catalyst composition comprising a first metal carbene olefin metathesis catalyst, a second metal carbene olefin metathesis catalyst, and a third metal carbene olefin metathesis catalyst, wherein the first metal carbene olefin metathesis catalyst, the second metal carbene olefin metathesis catalyst, and the third metal carbene olefin metathesis catalyst are each structurally different from one another.

An olefin metathesis catalyst composition comprising three metal carbene olefin metathesis catalysts can have several different combinations of individual metal carbene olefin metathesis catalysts, wherein each metal carbene olefin metathesis catalyst is categorized as a fast initiator, a moderate initiator, or a slow initiator. The olefin metathesis catalyst composition comprising three metal carbene olefin metathesis catalysts as described herein, refers to several different combinations of individual metal carbene olefin metathesis catalysts, wherein each metal carbene olefin metathesis catalyst is categorized as a fast initiator, a moderate initiator, or a slow initiator, and wherein the three metal carbene olefin metathesis catalysts, are structurally different, are chemically different, are distinct compounds, are not isomers, are not structural isomers, are not diastereoisomers, are not stereoisomers, are not enantiomers, or are not cis/trans isomers of each other, or any combinations thereof.

Using these fast, moderate, and slow categories, according to the broadest construction, olefin metathesis catalyst compositions comprising three metal carbene olefin metathesis catalysts could have up to ten different general combinations: (i) fast-fast-fast; (ii) fast-moderate-fast; (iii) fast-slow-fast; (iv) moderate-fast-moderate; (v) moderate-moderate-moderate; (vi) moderate-slow-moderate; (vii) slow-fast-slow; (viii) slow-moderate-slow; (ix) slow-slow-slow; and (x) fast-moderate-slow. In one preferred embodiment, an olefin metathesis catalyst composition comprising three metal carbene olefin metathesis catalysts comprises a first metal carbene olefin metathesis catalyst, a second metal carbene olefin metathesis catalyst, and a third metal carbene olefin metathesis catalyst, wherein the first metal carbene olefin metathesis catalyst is a fast initiator, the second metal carbene olefin metathesis catalyst is a moderate initiator, and the third metal carbene olefin metathesis catalyst is a slow initiator.

Generally, for an olefin metathesis catalyst composition comprising three metal carbene olefin metathesis catalysts, when expressed as the molar ratio of monomer to catalyst (the "monomer to catalyst ratio"), the catalyst loading will generally be presented as an overall monomer to catalyst ratio (the "total monomer to catalyst ratio"), where the overall monomer to catalyst ratio is the sum of the monomer to catalyst ratio of the first metal carbene olefin metathesis catalyst and the monomer to catalyst ratio of the second metal carbene olefin metathesis catalyst and the monomer to catalyst ratio of the third metal carbene olefin metathesis catalyst. The overall catalyst loading (the overall monomer to catalyst ratio) will generally be present in an amount that ranges from about 10,000,000:1 to about 1,000:1, preferably from about 1,000,000:1 to 5,000:1, more preferably from about 500,000:1 to 10,000:1, even more preferably from about 250,000:1 to 20,000:1.

The olefin metathesis catalyst composition comprising three metal carbene olefin metathesis catalysts, in any monomer to catalyst ratio as described herein, refers to a composition wherein the three metal carbene olefin metathesis catalysts, are structurally different, are chemically different, are distinct compounds, are not isomers, are not structural isomers, are not diastereoisomers, are not stereoisomers, are not enantiomers, or are not cis/trans isomers of each other, or any combinations thereof.

As one example, at an overall monomer to catalyst ratio of 45,000:1, for an olefin metathesis catalyst composition comprising three metal carbene olefin metathesis catalysts, where the first metal carbene olefin metathesis catalyst is categorized as a fast initiator, the second metal carbene olefin metathesis catalyst is categorized as a moderate initiator, and the third metal carbene olefin metathesis catalyst is categorized as a slow initiator, the first metal carbene olefin metathesis catalyst will generally be present in an amount (monomer to catalyst ratio) from 5,000,000:1 to 500,000:1, the second metal carbene olefin metathesis catalyst will generally be present in an amount (monomer to catalyst ratio) from 3,000,000:1 to 100,000:1, and the third metal carbene olefin metathesis catalyst will generally be present in an amount (monomer to catalyst ratio) from 46,107:1 to 97,826:1.

As one example, at an overall monomer to catalyst ratio of 15,000:1, for an olefin metathesis catalyst composition comprising three metal carbene olefin metathesis catalysts, where the first metal carbene olefin metathesis catalyst is categorized as a fast initiator, the second metal carbene olefin metathesis catalyst is categorized as a moderate initiator, and the third metal carbene olefin metathesis catalyst is categorized as a slow initiator, the first metal carbene olefin metathesis catalyst will generally be present in an amount (monomer to catalyst ratio) from 5,000,000:1 to 500,000:1, the second metal carbene olefin metathesis catalyst will generally be present in an amount (monomer to catalyst ratio) from 3,000,000:1 to 100,000:1, and the third metal carbene olefin metathesis catalyst will generally be present in an amount (monomer to catalyst ratio) from 15,121:1 to 18,293:1.

As one example, at an overall monomer to catalyst ratio of 90,000:1 for an olefin catalyst composition comprising three metal carbene olefin metathesis catalysts, where the first metal carbene olefin metathesis catalyst is categorized as a fast initiator, the second metal carbene olefin metathesis catalyst is categorized as a moderate initiator, and the third metal carbene olefin metathesis catalyst is categorized as a slow initiator, the first metal carbene olefin metathesis catalyst will generally be present in an amount (monomer to catalyst ratio) from 5,000,000:1 to 500,000:1, the second metal carbene olefin metathesis catalyst will generally be present in an amount (monomer to catalyst ratio) from 3,000,000:1 to 220,000:1, and the third metal carbene olefin metathesis catalyst will generally be present in an amount (monomer to catalyst ratio) from 94,538:1 to 219,027:1.

The invention also encompasses an olefin metathesis catalyst composition comprising four or more metal carbene olefin metathesis catalysts and can have several different combinations of individual metal carbene olefin metathesis catalysts, wherein each metal carbene olefin metathesis catalyst is categorized as a fast initiator, a moderate initiator, or a slow initiator; and wherein the metal carbene olefin metathesis catalysts are structurally different, are chemically different, are distinct compounds, are not isomers, are not structural isomers, are not diastereoisomers, are not stereoisomers, are not enantiomers, or are not cis/trans isomers of each other, or any combinations thereof.

Cyclic Olefin

Resin compositions that may be used with the present invention disclosed herein comprise one or more cyclic olefins. In general, any cyclic olefin suitable for the metathesis reactions disclosed herein may be used. Such cyclic olefins may be optionally substituted, optionally heteroatom-containing, mono-unsaturated, di-unsaturated, or poly-unsaturated $C_5$ to $C_{24}$ hydrocarbons that may be mono-, di-, or poly-cyclic. The cyclic olefin may generally be any strained or unstrained cyclic olefin, provided the cyclic olefin is able to participate in a ROMP reaction either individually or as part of a ROMP cyclic olefin composition. While certain unstrained cyclic olefins such as cyclohexene are generally understood to not undergo ROMP reactions by themselves, under appropriate circumstances, such unstrained cyclic olefins may nonetheless be ROMP active. For example, when present as a co-monomer in a ROMP composition, unstrained cyclic olefins may be ROMP active. Accordingly, as used herein and as would be appreciated by the skilled artisan, the term "unstrained cyclic olefin" is intended to refer to those unstrained cyclic olefins that may undergo a ROMP reaction under any conditions, or in any ROMP composition, provided the unstrained cyclic olefin is ROMP active.

In general, the cyclic olefin may be represented by the structure of formula (A)

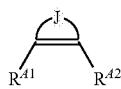

(A)

wherein J, $R^{A1}$, and $R^{A2}$ are as follows:

$R^{A1}$ and $R^{A2}$ is selected independently from the group consisting of hydrogen, hydrocarbyl (e.g., $C_1$-$C_{20}$ alkyl, $C_5$-$C_{20}$ aryl, $C_5$-$C_{30}$ aralkyl, or $C_5$-$C_{30}$ alkaryl), substituted hydrocarbyl (e.g., substituted $C_1$-$C_{20}$ alkyl, $C_5$-$C_{20}$ aryl, $C_5$-$C_{30}$ aralkyl, or $C_5$-$C_{30}$ alkaryl), heteroatom-containing hydrocarbyl (e.g., $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl), and substituted heteroatom-containing hydrocarbyl (e.g., substituted $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl) and, if substituted hydrocarbyl or substituted heteroatom-containing hydrocarbyl, wherein the substituents may be functional groups ("Fn") such as phosphonato, phosphoryl, phosphanyl, phosphino, sulfonato, $C_1$-$C_{20}$ alkylsulfanyl, $C_5$-$C_{20}$ arylsulfanyl, $C_1$-$C_{20}$ alkylsulfonyl, $C_5$-$C_{20}$ arylsulfonyl, $C_1$-$C_{20}$ alkylsulfinyl, $C_5$-$C_{20}$ arylsulfinyl, sulfonamido, amino, amido, imino, nitro, nitroso, hydroxyl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge). $R^{A1}$ and $R^{A2}$ may itself be one of the aforementioned groups, such that the Fn moiety is directly bound to the olefinic carbon atom indicated in the structure. In the latter case, however, the functional group will generally not be directly bound to the olefinic carbon through a heteroatom containing one or more lone pairs of electrons, e.g., an oxygen, sulfur, nitrogen, or phosphorus atom, or through an electron-rich metal or metalloid such as Ge, Sn, As, Sb, Se, Te, etc. With such functional groups, there will normally be an intervening linkage $Z^*$, such that $R^{A1}$ and/or $R^{A2}$ then has the structure —$(Z^*)_n$-Fn wherein n is 1, Fn is the functional group, and $Z^*$ is a hydrocarbylene linking group such as an alkylene, substituted alkylene, heteroalkylene, substituted heteroalkene, arylene, substituted arylene, heteroarylene, or substituted heteroarylene linkage.

J is a saturated or unsaturated hydrocarbylene, substituted hydrocarbylene, heteroatom-containing hydrocarbylene, or substituted heteroatom-containing hydrocarbylene linkage, wherein when J is substituted hydrocarbylene or substituted heteroatom-containing hydrocarbylene, the substituents may include one or more —$(Z^*)_n$-Fn groups, wherein n is zero or 1, and Fn and $Z^*$ are as defined previously. Additionally, two or more substituents attached to ring carbon (or other) atoms within J may be linked to form a bicyclic or polycyclic olefin. J will generally contain in the range of approximately 5 to 14 ring atoms, typically 5 to 8 ring atoms, for a monocyclic olefin, and, for bicyclic and polycyclic olefins, each ring will generally contain 4 to 8, typically 5 to 7, ring atoms.

Mono-unsaturated cyclic olefins encompassed by structure (A) may be represented by the structure (B)

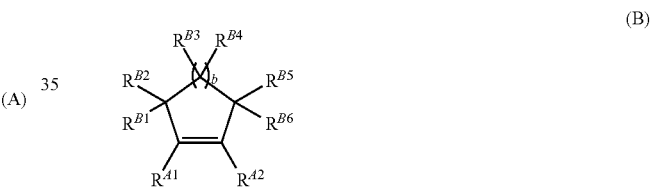

(B)

wherein b is an integer generally although not necessarily in the range of 1 to 10, typically 1 to 5, $R^{A1}$ and $R^{A2}$ are as defined above for structure (A), and $R^{B1}$, $R^{B2}$, $R^{B3}$, $R^{B4}$, $R^{B5}$, and $R^{B6}$ are independently selected from the group consisting of hydrogen, hydrocarbyl, substituted hydrocarbyl, heteroatom-containing hydrocarbyl, substituted heteroatom-containing hydrocarbyl and —$(Z^*)_n$-Fn where n, $Z^*$, and Fn are as defined previously, and wherein if any of the $R^{B1}$ through $R^{B6}$ moieties is substituted hydrocarbyl or substituted heteroatom-containing hydrocarbyl, the substituents may include one or more —$(Z^*)_n$-Fn groups. Accordingly, $R^{B1}$, $R^{B2}$, $R^{B3}$, $R^{B4}$, $R^{B5}$, and $R^{B6}$ may be, for example, hydrogen, hydroxyl, $C_1$-$C_{20}$ alkyl, $C_5$-$C_{20}$ aryl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, amino, amido, nitro, etc. Furthermore, any of the $R^{B1}$, $R^{B2}$, $R^{B3}$, $R^{B4}$, $R^{B5}$, and $R^{B6}$ moieties can be linked to any of the other $R^{B1}$, $R^{B2}$, $R^{B3}$, $R^{B4}$, $R^{B5}$, and $R^{B6}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The alicyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn are as defined previously, and functional groups (Fn) provided above.

Examples of monounsaturated, monocyclic olefins encompassed by structure (B) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, l-chloropentene, 1-fluorocyclopentene, 4-methylcyclopentene, 4-methoxy-cyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc.

Monocyclic diene reactants encompassed by structure (A) may be generally represented by the structure (C)

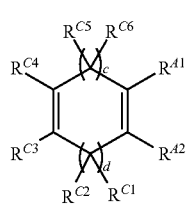

(C)

wherein c and d are independently integers in the range of 1 to about 8, typically 2 to 4, preferably 2 (such that the reactant is a cyclooctadiene), $R^{A1}$ and $R^{A2}$ are as defined above for structure (A), and $R^{C1}$, $R^{C2}$, $R^{C3}$, $R^{C4}$, $R^{C5}$, and $R^{C6}$ are defined as for $R^{B1}$ through $R^{B6}$. In this case, it is preferred that $R^{C3}$ and $R^{C4}$ be non-hydrogen substituents, in which case the second olefinic moiety is tetrasubstituted. Examples of monocyclic diene reactants include, without limitation, 1,3-cyclopentadiene, 1,3-cyclohexadiene, 1,4-cyclohexadiene, 5-ethyl-1,3-cyclohexadiene, 1,3-cycloheptadiene, cyclohexadiene, 1,5-cyclooctadiene, 1,3-cyclooctadiene, and substituted analogs thereof. Triene reactants are analogous to the diene structure (C), and will generally contain at least one methylene linkage between any two olefinic segments.

Bicyclic and polycyclic olefins encompassed by structure (A) may be generally represented by the structure (D)

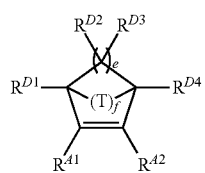

(D)

wherein $R^{A1}$ and $R^{A2}$ are as defined above for structure (A), $R^{D1}$, $R^{D2}$, $R^{D3}$, and $R^{D4}$ are as defined for $R^{B1}$ through $R^{B6}$, e is an integer in the range of 1 to 8 (typically 2 to 4), f is generally 1 or 2; T is lower alkylene or alkenylene (generally substituted or unsubstituted methyl or ethyl), CHR$^{G1}$, C(R$^{G1}$)$_2$, O, S, N—R$^{G1}$, P—R$^{G1}$, O=P—R$^{G1}$, Si(R$^{G1}$)$_2$, B—R$^{G1}$, or As—R$^{G1}$ where R$^{G1}$ is alkyl, alkenyl, cycloalkyl, cycloalkenyl, aryl, alkaryl, aralkyl, or alkoxy. Furthermore, any of the $R^{D1}$, $R^{D2}$, $R^{D3}$, and $R^{D4}$ moieties can be linked to any of the other $R^{D1}$, $R^{D2}$, $R^{D3}$, and $R^{D4}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The cyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn are as defined previously, and functional groups (Fn) provided above.

Cyclic olefins encompassed by structure (D) are in the norbornene family. As used herein, norbornene means any compound that includes at least one norbornene or substituted norbornene moiety, including without limitation norbornene, substituted norbornene(s), norbornadiene, substituted norbornadiene(s), polycyclic norbornenes, and substituted polycyclic norbornene(s). Norbornenes within this group may be generally represented by the structure (E)

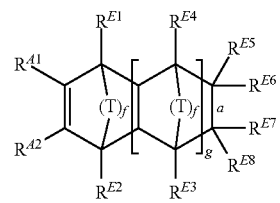

(E)

wherein $R^{A1}$ and $R^{A2}$ are as defined above for structure (A), T is as defined above for structure (D), $R^{E1}$, $R^{E2}$, $R^{E3}$, $R^{E4}$, $R^{E5}$, $R^{E6}$, $R^{E7}$, and $R^{E8}$ are as defined for $R^{B1}$ through $R^{B6}$, and "a" represents a single bond or a double bond, f is generally 1 or 2, "g" is an integer from 0 to 5, and when "a" is a double bond one of $R^{E5}$, $R^{E6}$ and one of $R^{E7}$, $R^{E8}$ is not present.

Furthermore, any of the $R^{E5}$, $R^{E6}$, $R^{E7}$, and $R^{E8}$ moieties can be linked to any of the other $R^{E5}$, $R^{E6}$, $R^{E7}$, and $R^{E8}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The cyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn are as defined previously, and functional groups (Fn) provided above.

More preferred cyclic olefins possessing at least one norbornene moiety have the structure (F):

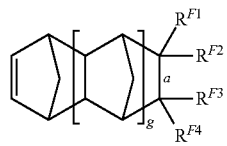

(F)

wherein, $R^{F1}$, $R^{F2}$, $R^{F3}$, and $R^{F4}$, are as defined for $R^{B1}$ through $R^{B6}$, and "a" represents a single bond or a double bond, "g" is an integer from 0 to 5, and when "a" is a double bond one of $R^{F1}$, $R^{F2}$ and one of $R^{F3}$, $R^{F4}$ is not present.

Furthermore, any of the $R^{F1}$, $R^{F2}$, $R^{F3}$, and $R^{F4}$ moieties can be linked to any of the other $R^{F1}$, $R^{F2}$, $R^{F3}$, and $R^{F4}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The alicyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn are as defined previously, and functional groups (Fn) provided above.

One route for the preparation of hydrocarbyl substituted and functionally substituted norbornenes employs the Diels-Alder cycloaddition reaction in which cyclopentadiene or substituted cyclopentadiene is reacted with a suitable dienophile at elevated temperatures to form the substituted norbornene adduct generally shown by the following reaction Scheme 1:

SCHEME 1

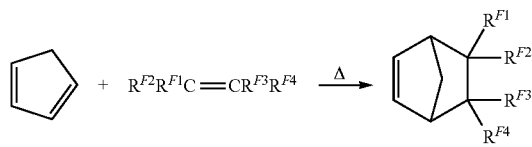

wherein $R^{F1}$ to $R^{F4}$ are as previously defined for structure (F).

Other norbornene adducts can be prepared by the thermal pyrolysis of dicyclopentadiene in the presence of a suitable dienophile. The reaction proceeds by the initial pyrolysis of dicyclopentadiene to cyclopentadiene followed by the Diels-Alder cycloaddition of cyclopentadiene and the dienophile to give the adduct shown below in Scheme 2:

SCHEME 2

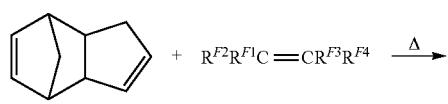

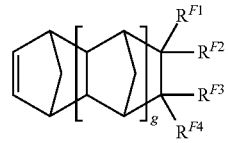

wherein "g" is an integer from 0 to 5, and $R^{F1}$ to $R^{F4}$ are as previously defined for structure (F).

Norbornadiene and higher Diels-Alder adducts thereof similarly can be prepared by the thermal reaction of cyclopentadiene and dicyclopentadiene in the presence of an acetylenic reactant as shown below in Scheme 3:

SCHEME 3

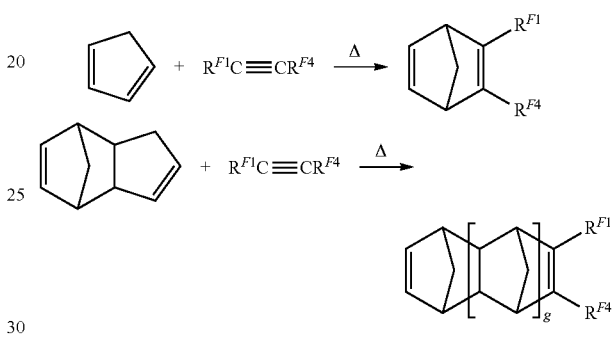

wherein "g" is an integer from 0 to 5, $R^{F1}$ and $R^{F4}$ are as previously defined for structure (F).

Examples of bicyclic and polycyclic olefins thus include, without limitation, dicyclopentadiene (DCPD); trimer and other higher order oligomers of cyclopentadiene including without limitation tricyclopentadiene (cyclopentadiene trimer), cyclopentadiene tetramer, and cyclopentadiene pentamer; ethylidenenorbornene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethyoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5,6-dimethoxycarbonylnorbornene; endo,endo-5,6-dimethoxycarbonylnorbornene; 2,3-dimethoxynorbornene; norbornadiene; tricycloundecene; tetracyclododecene; 8-methyltetracyclododecene; 8-ethyltetracyclododecene; 8-methoxycarbonyltetracyclododecene; 8-methyl-8-tetracyclododecene; 8-cyanotetracyclododecene; pentacyclopentadecene; pentacyclohexadecene; and the like, and their structural isomers, stereoisomers, and mixtures thereof. Additional examples of bicyclic and polycyclic olefins include, without limitation, $C_2$-$C_{12}$ hydrocarbyl substituted norbornenes such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, and 5-butenyl-2-norbornene, and the like.

Preferred cyclic olefins include $C_5$ to $C_{24}$ unsaturated hydrocarbons. Also preferred are $C_5$ to $C_{24}$ cyclic hydrocarbons that contain one or more (typically 2 to 12) heteroatoms such as O, N, S, or P. For example, crown ether cyclic olefins may include numerous O heteroatoms throughout the cycle, and these are within the scope of the invention. In addition, preferred cyclic olefins are $C_5$ to $C_{24}$ hydrocarbons that contain one or more (typically 2 or 3) olefins. For example, the cyclic olefin may be mono-, di-, or tri-unsaturated. Examples of cyclic olefins include without limitation cyclooctene, cyclododecene, and (c,t,t)-1,5,9-cyclododecatriene.

The cyclic olefins may also comprise multiple (typically 2 or 3) rings. For example, the cyclic olefin may be mono-, di-, or tri-cyclic. When the cyclic olefin comprises more than one ring, the rings may or may not be fused. Preferred examples of cyclic olefins that comprise multiple rings include norbornene, dicyclopentadiene, tricyclopentadiene, and 5-ethylidene-2-norbornene.

The cyclic olefin may also be substituted, for example, a $C_5$ to $C_{24}$ cyclic hydrocarbon wherein one or more (typically 2, 3, 4, or 5) of the hydrogens are replaced with non-hydrogen substituents. Suitable non-hydrogen substituents may be chosen from the substituents described hereinabove. For example, functionalized cyclic olefins, i.e., $C_5$ to $C_{24}$ cyclic hydrocarbons wherein one or more (typically 2, 3, 4, or 5) of the hydrogens are replaced with functional groups, are within the scope of the invention. Suitable functional groups may be chosen from the functional groups described hereinabove. For example, a cyclic olefin functionalized with an alcohol group may be used to prepare a telechelic polymer comprising pendent alcohol groups. Functional groups on the cyclic olefin may be protected in cases where the functional group interferes with the metathesis catalyst, and any of the protecting groups commonly used in the art may be employed. Acceptable protecting groups may be found, for example, in Greene et al., Protective Groups in Organic Synthesis, 3rd Ed. (New York: Wiley, 1999). Examples of functionalized cyclic olefins include without limitation 2-hydroxymethyl-5-norbornene, 2-[(2-hydroxyethyl)carboxylate]-5-norbornene, cydecanol, 5-n-hexyl-2-norbornene, 5-n-butyl-2-norbornene.

Cyclic olefins incorporating any combination of the abovementioned features (i.e., heteroatoms, substituents, multiple olefins, multiple rings) are suitable for the methods disclosed herein. Additionally, cyclic olefins incorporating any combination of the abovementioned features (i.e., heteroatoms, substituents, multiple olefins, multiple rings) are suitable for the invention disclosed herein.

The cyclic olefins useful in the methods disclosed herein may be strained or unstrained. It will be appreciated that the amount of ring strain varies for each cyclic olefin compound, and depends upon a number of factors including the size of the ring, the presence and identity of substituents, and the presence of multiple rings. Ring strain is one factor in determining the reactivity of a molecule towards ring-opening olefin metathesis reactions. Highly strained cyclic olefins, such as certain bicyclic compounds, readily undergo ring opening reactions with olefin metathesis catalysts. Less strained cyclic olefins, such as certain unsubstituted hydrocarbon monocyclic olefins, are generally less reactive. In some cases, ring opening reactions of relatively unstrained (and therefore relatively unreactive) cyclic olefins may become possible when performed in the presence of the olefinic compounds disclosed herein. Additionally, cyclic olefins useful in the invention disclosed herein may be strained or unstrained.

The resin compositions of the present invention may comprise a plurality of cyclic olefins. A plurality of cyclic olefins may be used to prepare metathesis polymers from the olefinic compound. For example, two cyclic olefins selected from the cyclic olefins described hereinabove may be employed in order to form metathesis products that incorporate both cyclic olefins. Where two or more cyclic olefins are used, one example of a second cyclic olefin is a cyclic alkenol, i.e., a $C_5$-$C_{24}$ cyclic hydrocarbon wherein at least one of the hydrogen substituents is replaced with an alcohol or protected alcohol moiety to yield a functionalized cyclic olefin.

The use of a plurality of cyclic olefins, and in particular when at least one of the cyclic olefins is functionalized, allows for further control over the positioning of functional groups within the products. For example, the density of cross-linking points can be controlled in polymers and macromonomers prepared using the methods disclosed herein. Control over the quantity and density of substituents and functional groups also allows for control over the physical properties (e.g., melting point, tensile strength, glass transition temperature, etc.) of the products. Control over these and other properties is possible for reactions using only a single cyclic olefin, but it will be appreciated that the use of a plurality of cyclic olefins further enhances the range of possible metathesis products and polymers formed.

More preferred cyclic olefins include dicyclopentadiene; tricyclopentadiene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5-6-dimethoxycarbonylnorbornene; endo, endo-5,6-dimethoxycarbonylnorbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene; 8-methyl-8-tetracyclo-dodecene; 8-cyanotetracyclododecene; pentacyclopentadecene; pentacyclohexadecene; higher order oligomers of cyclopentadiene such as cyclopentadiene tetramer, cyclopentadiene pentamer, and the like; and $C_2$-$C_{12}$ hydrocarbyl substituted norbornenes such as 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene, and the like. Even more preferred cyclic olefins include dicyclopentadiene, tricyclopentadiene, and higher order oligomers of cyclopentadiene, such as cyclopentadiene tetramer, cyclopentadiene pentamer, and the like, tetracyclododecene, norbornene, and $C_2$-$C_{12}$ hydrocarbyl substituted norbornenes, such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, 5-butenyl-2-norbornene, and the like.

Metal Carbene Olefin Metathesis Catalysts

A metal carbene olefin metathesis catalyst that may be used in the invention disclosed herein, is preferably a Group 8 transition metal complex having the structure of formula (I)

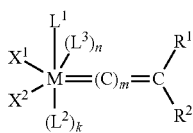

(I)

in which:
M is a Group 8 transition metal;
$L^1$, $L^2$, and $L^3$ are neutral electron donor ligands;
n is 0 or 1, such that $L^3$ may or may not be present;
m is 0, 1, or 2;
k is 0 or 1;
$X^1$ and $X^2$ are anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

Additionally, in formula (I), one or both of $R^1$ and $R^2$ may have the structure $-(W)_n-U^+V^-$, in which W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is zero or 1. Furthermore, $R^1$ and $R^2$ may be taken together to form an indenylidene moiety; preferably phenylindenylidene.

Preferred metal carbene olefin metathesis catalysts contain Ru or Os as the Group 8 transition metal, with Ru particularly preferred.

Numerous embodiments of the metal carbene olefin metathesis catalysts useful in the reactions disclosed herein are described in more detail infra. For the sake of convenience, the metal carbene olefin metathesis catalysts are described in groups, but it should be emphasized that these groups are not meant to be limiting in any way. That is, any of the metal carbene olefin metathesis catalysts useful in the invention may fit the description of more than one of the groups described herein.

A first group of metal carbene olefin metathesis catalysts, then, are commonly referred to as First Generation Grubbs-type catalysts, and have the structure of formula (I). For the first group of metal carbene olefin metathesis catalysts, M is a Group 8 transition metal, m is 0, 1, or 2, and n, $X^1$, $X^2$, $L^1$, $L^2$, $L^3$, $R^1$, and $R^2$ are described as follows.

For the first group of metal carbene olefin metathesis catalysts, n is 0, and $L^1$ and $L^2$ are independently selected from phosphine, sulfonated phosphine, phosphite, phosphinite, phosphonite, arsine, stibine, ether, (including cyclic ethers), amine, amide, imine, sulfoxide, carboxyl, nitrosyl, pyridine, substituted pyridine, imidazole, substituted imidazole, pyrazine, substituted pyrazine and thioether. Exemplary ligands are trisubstituted phosphines. Preferred trisubstituted phosphines are of the formula $PR^{H1}R^{H2}R^{H3}$, where $R^{H1}$, $R^{H2}$, and $R^{H3}$ are each independently substituted or unsubstituted aryl or $C_1-C_{10}$ alkyl, particularly primary alkyl, secondary alkyl, or cycloalkyl. In the most preferred, $L^1$ and $L^2$ are independently selected from the group consisting of trimethylphosphine ($PMe_3$), triethylphosphine ($PEt_3$), tri-n-butylphosphine ($PBu_3$), tri(ortho-tolyl)phosphine (P-o-tolyl$_3$), tri-tert-butylphosphine (P-tert-Bu$_3$), tricyclopentylphosphine (PCyclopentyl$_3$), tricyclohexylphosphine ($PCy_3$), triisopropylphosphine (P-i-Pr$_3$), trioctylphosphine ($POct_3$), triisobutylphosphine, (P-i-Bu$_3$), triphenylphosphine ($PPh_3$), tri(pentafluorophenyl)phosphine ($P(C_6F_5)_3$), methyldiphenylphosphine ($PMePh_2$), dimethylphenylphosphine ($PMe_2Ph$), and diethylphenylphosphine ($PEt_2Ph$). Alternatively, $L^1$ and $L^2$ may be independently selected from phosphabicycloalkane (e.g., monosubstituted 9-phosphabicyclo-[3.3.1]nonane, or monosubstituted 9-phosphabicyclo[4.2.1]nonane] such as cyclohexylphoban, isopropylphoban, ethylphoban, methylphoban, butylphoban, pentylphoban, and the like).

$X^1$ and $X^2$ are anionic ligands, and may be the same or different, or are linked together to form a cyclic group, typically although not necessarily a five- to eight-membered ring. In preferred embodiments, $X^1$ and $X^2$ are each independently hydrogen, halide, or one of the following groups: $C_1-C_{20}$ alkyl, $C_5-C_{24}$ aryl, $C_1-C_{20}$ alkoxy, $C_5-C_{24}$ aryloxy, $C_2-C_{20}$ alkoxycarbonyl, $C_6-C_{24}$ aryloxycarbonyl, $C_2-C_{24}$ acyl, $C_2-C_{24}$ acyloxy, $C_1-C_{20}$ alkylsulfonato, $C_5-C_{24}$ arylsulfonato, $C_1-C_{20}$ alkylsulfanyl, $C_5-C_{24}$ arylsulfanyl, $C_1-C_{20}$ alkylsulfinyl, $NO_3$, $-N=C=O$, $-N=C=S$, or $C_5-C_{24}$ arylsulfinyl. Optionally, $X^1$ and $X^2$ may be substituted with one or more moieties selected from $C_1-C_{12}$ alkyl, $C_1-C_{12}$ alkoxy, $C_5-C_{24}$ aryl, and halide, which may, in turn, with the exception of halide, be further substituted with one or more groups selected from halide, $C_1-C_6$ alkyl, $C_1-C_6$ alkoxy, and phenyl. In more preferred embodiments, $X^1$ and $X^2$ are halide, benzoate, $C_2-C_6$ acyl, $C_2-C_6$ alkoxycarbonyl, $C_1-C_6$ alkyl, phenoxy, $C_1-C_6$ alkoxy, $C_1-C_6$ alkylsulfanyl, aryl, or $C_1-C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethane-sulfonate. In the most preferred embodiments, $X^1$ and $X^2$ are each chloride.

$R^1$ and $R^2$ are independently selected from hydrogen, hydrocarbyl (e.g., $C_1-C_{20}$ alkyl, $C_2-C_{20}$ alkenyl, $C_2-C_{20}$ alkynyl, $C_5-C_{24}$ aryl, $C_6-C_{24}$ alkaryl, $C_6-C_{24}$ aralkyl, etc.), substituted hydrocarbyl (e.g., substituted $C_1-C_{20}$ alkyl, $C_2-C_{20}$ alkenyl, $C_2-C_{20}$ alkynyl, $C_5-C_{24}$ aryl, $C_6-C_{24}$ alkaryl, $C_6-C_{24}$ aralkyl, etc.), heteroatom-containing hydrocarbyl (e.g., heteroatom-containing $C_1-C_{20}$ alkyl, $C_2-C_{20}$ alkenyl, $C_2-C_{20}$ alkynyl, $C_5-C_{24}$ aryl, $C_6-C_{24}$ alkaryl, $C_6-C_{24}$ aralkyl, etc.), and substituted heteroatom-containing hydrocarbyl (e.g., substituted heteroatom-containing $C_1-C_{20}$ alkyl, $C_2-C_{20}$ alkenyl, $C_2-C_{20}$ alkynyl, $C_5-C_{24}$ aryl, $C_6-C_{24}$ alkaryl, $C_6-C_{24}$ aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred metal carbene olefin metathesis catalysts, $R^1$ is hydrogen and $R^2$ is selected from $C_1-C_{20}$ alkyl, $C_2-C_{20}$ alkenyl, and $C_5-C_{24}$ aryl, more preferably $C_1-C_6$ alkyl, $C_2-C_6$ alkenyl, and $C_5-C_{14}$ aryl. Still more preferably, $R^2$ is phenyl, vinyl, methyl, isopropyl, or t-butyl, optionally substituted with one or more moieties selected from $C_1-C_6$ alkyl, $C_1-C_6$ alkoxy, phenyl, and a functional group Fn as defined earlier herein. Most preferably, $R^2$ is phenyl or vinyl substituted with one or more moieties selected from methyl, ethyl, chloro, bromo, iodo, fluoro, nitro, dimethylamino, methyl, methoxy, and phenyl. Optimally, $R^2$ is phenyl or $-CH=C(CH_3)_2$.

Any two or more (typically two, three, or four) of $X^1$, $X^2$, $L^1$, $L^2$, $L^3$, $R^1$, and $R^2$ can be taken together to form a cyclic group, including bidentate or multidentate ligands, as disclosed, for example, in U.S. Pat. No. 5,312,940, the disclosure of which is incorporated herein by reference. When any of $X^1$, $X^2$, $L^1$, $L^2$, $L^3$, $R^1$, and $R^2$ are linked to form cyclic groups, those cyclic groups may contain 4 to 12, preferably 4, 5, 6, 7, or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of metal carbene olefin metathesis catalysts, commonly referred to as Second Generation Grubbs-type catalysts, have the structure of formula (I), wherein $L^1$ is a carbene ligand having the structure of formula (II)

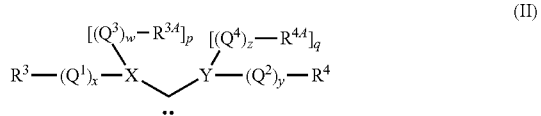

(II)

such that the complex may have the structure of formula (III)

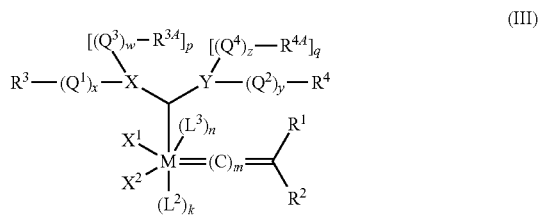

(III)

wherein M, m, n, $X^1$, $X^2$, $L^2$, $L^3$, $R^1$, and $R^2$ are as defined for the first group of metal carbene olefin metathesis catalysts, and the remaining substituents are as follows;

X and Y are heteroatoms typically selected from N, O, S, and P. Since O and S are divalent, p is necessarily zero when X is O or S, q is necessarily zero when Y is O or S, and k is zero or 1. However, when X is N or P, then p is 1, and when Y is N or P, then q is 1. In a preferred embodiment, both X and Y are N;

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within $Q^1$, $Q^2$, $Q^3$, and $Q^4$ may be linked to form an additional cyclic group; and $R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl. In addition, X and Y may be independently selected from carbon and one of the heteroatoms mentioned above, preferably no more than one of X or Y is carbon. Also, $L^2$ and $L^3$ may be taken together to form a single bindentate electron-donating heterocyclic ligand. Furthermore, $R^1$ and $R^2$ may be taken together to form an indenylidene moiety, preferably phenylindenylidene. Moreover, $X^1$, $X^2$, $L^2$, $L^3$, X, and Y may be further coordinated to boron or to a carboxylate.

In addition, any two or more of $X^1$, $X^2$, $L^1$, $L^2$, $L^3$, $R^1$, $R^2$, $R^3$, $R^{3A}$, $R^4$, $R^{4A}$, $Q^1$, $Q^2$, $Q^3$, and $Q^4$ can be taken together to form a cyclic group, and any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support. Any two or more of $X^1$, $X^2$, $L^1$, $L^2$, $L^3$, $R^1$, $R^2$, $R^3$, $R^{3A}$, $R^4$, and $R^{4A}$ can also be taken to be -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein hetero atoms and/or functional groups may be present in either the aryl or the alkyl portions of the alkylene and arylalkylene groups, and Fn is a functional group, or together to form a cyclic group, and any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support.

A particular class of carbene ligands having the structure of formula (II), where $R^{3A}$ and $R^{4A}$ are linked to form a cyclic group and at least one of X or Y is a nitrogen, or at least one of $Q^3$ or $Q^4$ is a heteroatom-containing hydrocarbylene or substituted heteroatom-containing hydrocarbylene, where at least one heteroatom is a nitrogen, are commonly referred to as N-heterocyclic carbene (NHC) ligands.

Preferably, $R^{3A}$ and $R^{4A}$ are linked to form a cyclic group so that the carbene ligand has the structure of formula (IV)

(IV)

wherein $R^3$ and $R^4$ are as defined for the second group of metal carbene olefin metathesis catalysts above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although not necessarily, a two-atom linkage or a three-atom linkage.

Examples of N-heterocyclic carbene (NHC) ligands and acyclic diaminocarbene ligands suitable as $L^1$ thus include, but are not limited to, the following where DIPP or DiPP is diisopropylphenyl and Mes is 2,4,6-trimethylphenyl:

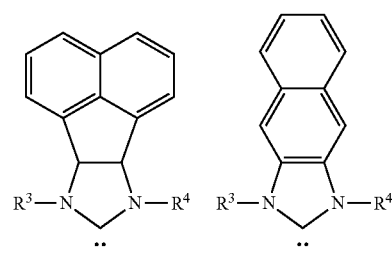

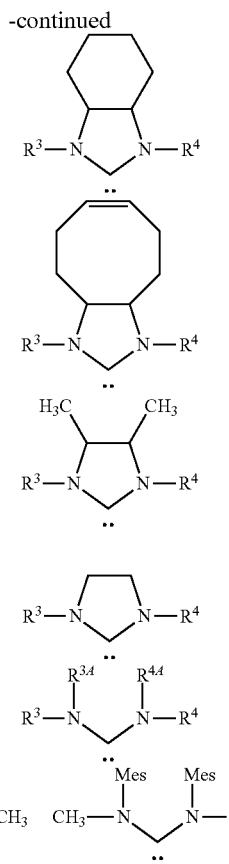

Additional examples of N-heterocyclic carbene (NHC) ligands and acyclic diaminocarbene ligands suitable as $L^1$ thus include, but are not limited to the following:

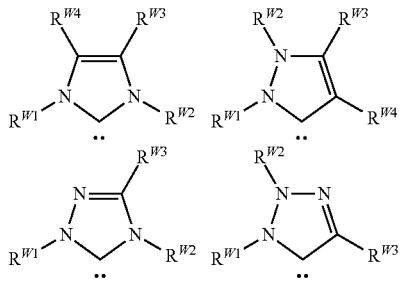

wherein $R^{W1}$, $R^{W2}$, $R^{W3}$, $R^{W4}$ are independently hydrogen, unsubstituted hydrocarbyl, substituted hydrocarbyl, or heteroatom containing hydrocarbyl, and where one or both of $R^{W3}$ and $R^{W4}$ may be in independently selected from halogen, nitro, amido, carboxyl, alkoxy, aryloxy, sulfonyl, carbonyl, thio, or nitroso groups.

Additional examples of N-heterocyclic carbene (NHC) ligands suitable as $L^1$ are further described in U.S. Pat. Nos. 7,378,528; 7,652,145; 7,294,717; 6,787,620; 6,635,768; and 6,552,139, the contents of each are incorporated herein by reference.

Additionally, thermally activated N-Heterocyclic Carbene Precursors as disclosed in U.S. Pat. No. 6,838,489, the contents of which are incorporated herein by reference, may also be used with the present invention.

When M is ruthenium, then, the preferred complexes have the structure of formula (V)

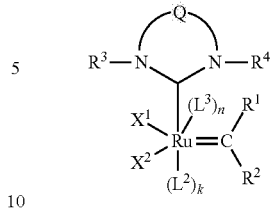

(V)

In a more preferred embodiment, Q is a two-atom linkage having the structure $-CR^{11}R^{12}-CR^{13}R^{14}-$ or $-CR^{11}=CR^{13}-$, preferably $-CR^{11}R^{12}-CR^{13}R^{14}-$, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include without limitation carboxyl, $C_1$-$C_{20}$ alkoxy, $C_5$-$C_{24}$ aryloxy, $C_2$-$C_{20}$ alkoxycarbonyl, $C_5$-$C_{24}$ alkoxycarbonyl, $C_2$-$C_{24}$ acyloxy, $C_1$-$C_{20}$ alkylthio, $C_5$-$C_{24}$ arylthio, $C_1$-$C_{20}$ alkylsulfonyl, and $C_1$-$C_{20}$ alkylsulfinyl, optionally substituted with one or more moieties selected from $C_1$-$C_{12}$ alkyl, $C_1$-$C_{12}$ alkoxy, $C_5$-$C_{14}$ aryl, hydroxyl, sulfhydryl, formyl, and halide. $R^{11}$, $R^{12}$, $R^{13}$, and $R^{14}$ are preferably independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl. Alternatively, any two of $R^{11}$, $R^{12}$, $R^{13}$, and $R^{14}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents. In one further aspect, any one or more of $R^{11}$, $R^{12}$, $R^{13}$, and $R^{14}$ comprises one or more of the linkers. Additionally, $R^3$ and $R^4$ may be unsubstituted phenyl or phenyl substituted with one or more substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Furthermore, $X^1$ and $X^2$ may be halogen.

When $R^3$ and $R^4$ are aromatic, they are typically although not necessarily composed of one or two aromatic rings, which may or may not be substituted, e.g., $R^3$ and $R^4$ may be phenyl, substituted phenyl, biphenyl, substituted biphenyl, or the like. In one preferred embodiment, $R^3$ and $R^4$ are the same and are each unsubstituted phenyl or phenyl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Preferably, any substituents present are hydrogen, $C_1$-$C_{12}$ alkyl, $C_1$-$C_{12}$ alkoxy, $C_5$-$C_{14}$ aryl, substituted $C_5$-$C_{14}$ aryl, or halide. As an example, $R^3$ and $R^4$ are mesityl (i.e., Mes as defined herein).

In a third group of metal carbene olefin metathesis catalysts having the structure of formula (I), M, m, n, $X^1$, $X^2$, $R^1$, and $R^2$ are as defined for the first group of metal carbene olefin metathesis catalysts, $L^1$ is a strongly coordinating neutral electron donor ligand such as any of those described for the first and second group of metal carbene olefin metathesis catalysts, and $L^2$ and $L^3$ are weakly coordinating neutral electron donor ligands in the form of optionally substituted heterocyclic groups. Again, n is zero or 1, such that $L^3$ may or may not be present. Generally, in the third group of metal carbene olefin metathesis catalysts, $L^2$ and $L^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of metal carbene olefin metathesis catalysts, examples of $L^2$ and $L^3$ include, without limitation, heterocycles containing nitrogen, sulfur, oxygen, or a mixture thereof.

Examples of nitrogen-containing heterocycles appropriate for $L^2$ and $L^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole. Additionally, the nitrogen-containing heterocycles may be optionally substituted on a non-coordinating heteroatom with a non-hydrogen substituent.

Examples of sulfur-containing heterocycles appropriate for $L^2$ and $L^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for $L^2$ and $L^3$ include 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for $L^2$ and $L^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred $L^2$ and $L^3$ ligands are aromatic nitrogen-containing and oxygen-containing heterocycles, and particularly preferred $L^2$ and $L^3$ ligands are monocyclic N-heteroaryl ligands that are optionally substituted with 1 to 3, preferably 1 or 2, substituents. Specific examples of particularly preferred $L^2$ and $L^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on $L^2$ and/or $L^3$ are selected from halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ arylcarbonyl, $C_2$-$C_{20}$ alkylcarbonyloxy, $C_6$-$C_{24}$ arylcarbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl),N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di($C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

In certain embodiments, $L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of formula (VI)

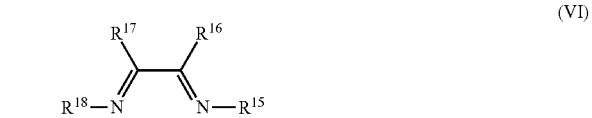

(VI)

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and $R^{18}$, (3) $R^{16}$ and $R^{17}$, or (4) both $R^{15}$ and $R^{16}$, and $R^{17}$ and $R^{18}$, may be taken together to form a ring, i.e., an N-heterocycle. Preferred cyclic groups in such a case are five- and six-membered rings, typically aromatic rings.

In a fourth group of metal carbene olefin metathesis catalysts that have the structure of formula (I), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$-,   —As(Ph)$_2$CH$_2$CH$_2$As(Ph$_2$)-, —P(Ph)$_2$CH$_2$CH$_2$C(CF$_3$)$_2$O—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$CH$_2$CH$_2$P(Ph)$_2$- and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N(CH$_3$)$_2$. Other preferred tridentate ligands are those in which any three of $X^1$, $X^2$, $L^1$, $L^2$, $L^3$, $R^1$, and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, $C_1$-$C_{20}$ alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$, and $L^2$ may be taken together to be cyclopentadienyl, optionally substituted with vinyl, hydrogen, methyl, or phenyl. Tetradentate ligands include, but are not limited to O$_2$C(CH$_2$)$_2$P(Ph)(CH$_2$)$_2$P(Ph)(CH$_2$)$_2$CO$_2$, phthalocyanines, and porphyrins.

Complexes wherein Y is coordinated to the metal are examples of a fifth group of metal carbene olefin metathesis catalysts, and are commonly called "Grubbs-Hoveyda" catalysts. Grubbs-Hoveyda metathesis-active metal carbene complexes may be described by the formula (VII)

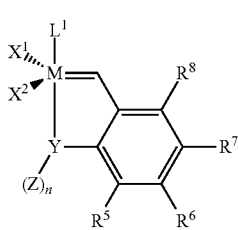

(VII)

wherein,

M is a Group 8 transition metal, particularly Ru or Os, or, more particularly, Ru;

$X^1$, $X^2$, and $L^1$ are as previously defined herein for the first and second groups of metal carbene olefin metathesis catalysts;

Y is a heteroatom selected from N, O, S, and P; preferably Y is O or N;

$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, borate, or -A-Fn, wherein "A" and Fn have been defined above; and any combination of Y, Z, $R^5$, $R^6$, $R^7$, and $R^8$ can be linked to form one or more cyclic groups;

n is 0, 1, or 2, such that n is 1 for the divalent heteroatoms O or S, and n is 2 for the trivalent heteroatoms N or P; and Z is a group selected from hydrogen, alkyl, aryl, functionalized alkyl, functionalized aryl where the functional group(s) may independently be one or more of the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl; and wherein any combination or combinations of $X^1$, $X^2$, $L^1$, Y, Z, $R^5$, $R^6$, $R^7$, and $R^8$ may be linked to a support. Additionally, $R^5$, $R^6$, $R^7$, $R^8$, and Z may independently be thioisocyanate, cyanato, or thiocyanato.

Examples of complexes (metal carbene olefin metathesis catalysts) comprising Grubbs-Hoveyda ligands suitable in the invention include:

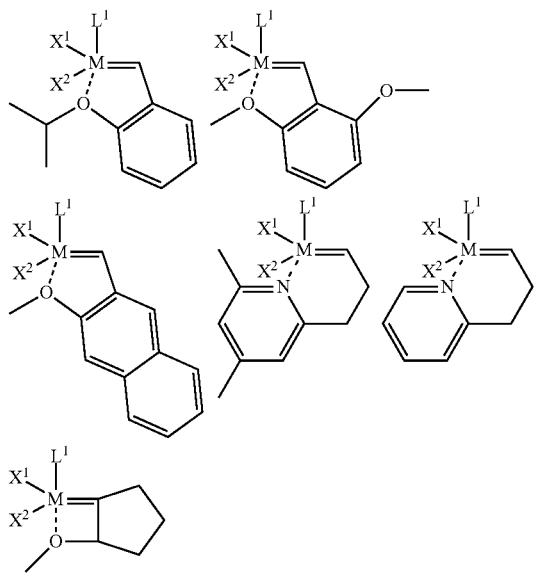

wherein, $L^1$, $X^1$, $X^2$, and M are as described for any of the other groups of catalysts. Suitable chelating carbenes and carbene precursors are further described by Pederson et al. (U.S. Pat. Nos. 7,026,495 and 6,620,955, the disclosures of both of which are incorporated herein by reference) and Hoveyda et al. (U.S. Pat. No. 6,921,735 and WO 02/14376, the disclosures of both of which are incorporated herein by reference).

Other useful complexes (metal carbene olefin metathesis catalysts) include structures wherein $L^2$ and $R^2$ according to formulae (I), (III), or (V) are linked, such as styrenic compounds that also include a functional group for attachment to a support. Examples in which the functional group is a trialkoxysilyl functionalized moiety include, but are not limited to, the following:

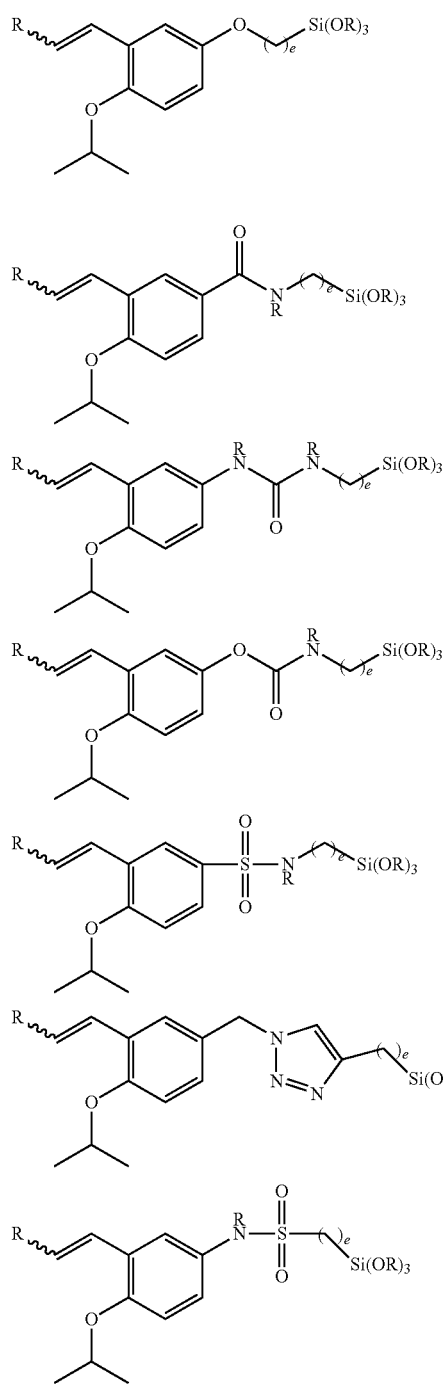
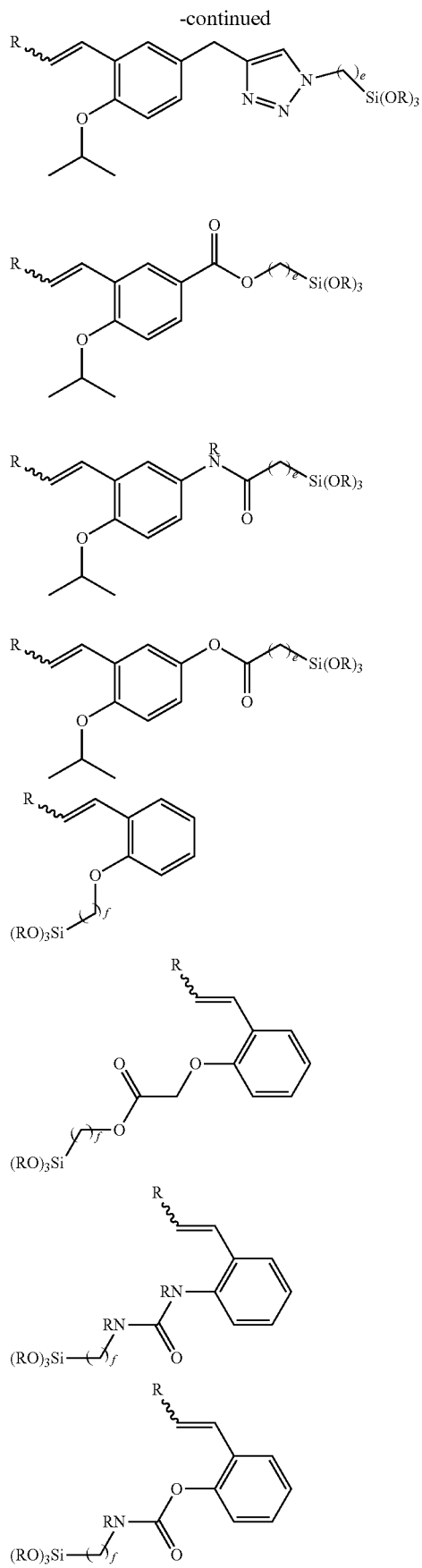

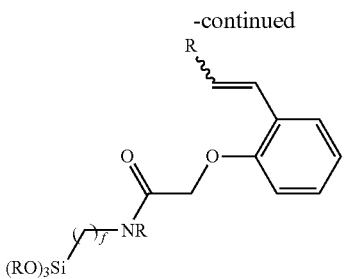

Further examples of complexes (metal carbene olefin metathesis catalysts) having linked ligands include those having linkages between a neutral NHC ligand and an anionic ligand, a neutral NHC ligand and an alkylidine ligand, a neutral NHC ligand and an $L^2$ ligand, a neutral NHC ligand and an $L^3$ ligand, an anionic ligand and an alkylidine ligand, and any combination thereof. While the possible structures are too numerous to list herein, some suitable structures based on formula (III) include

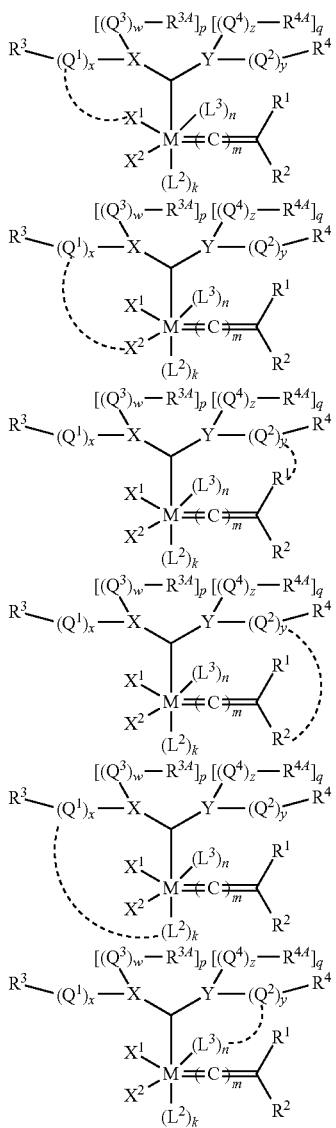

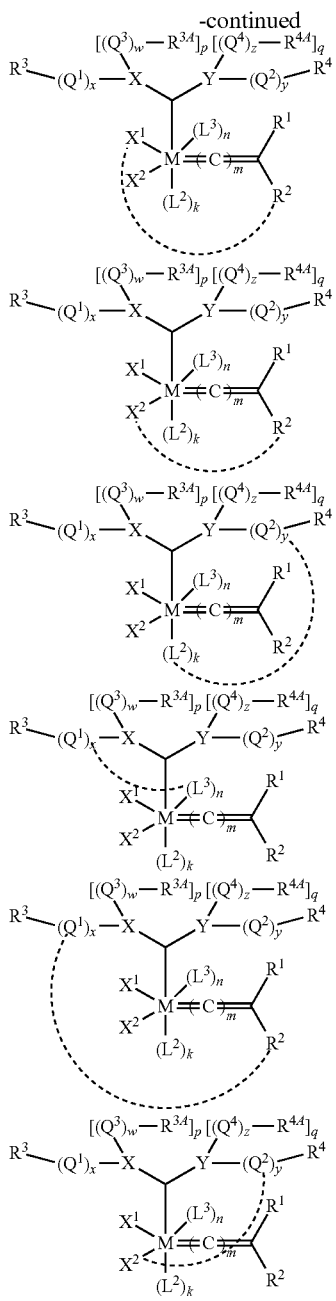

In addition to the metal carbene olefin metathesis catalysts that have the structure of formula (I), as described above, other transition metal carbene complexes (metal carbene olefin metathesis catalysts) include, but are not limited to:

neutral ruthenium or osmium metal carbene complexes containing metal centers that are formally in the +2 oxidation state, have an electron count of 16, are penta-coordinated, and are of the general formula (IX);

neutral ruthenium or osmium metal carbene complexes containing metal centers that are formally in the +2 oxidation state, have an electron count of 18, are hexa-coordinated, and are of the general formula (X);

cationic ruthenium or osmium metal carbene complexes containing metal centers that are formally in the +2 oxidation state, have an electron count of 14, are tetra-coordinated, and are of the general formula (XI); and cationic ruthenium or osmium metal carbene complexes containing metal centers that are formally in the +2 oxidation state, have an electron count of 14 or 16, are tetra-coordinated or penta-coordinated, respectively, and are of the general formula (XII)

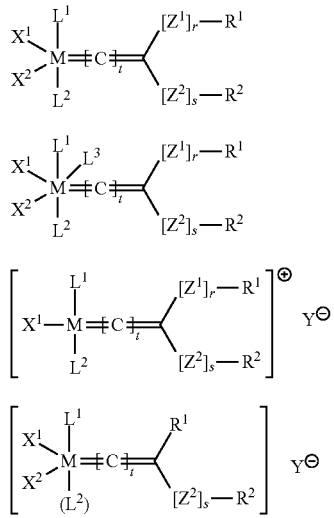

wherein:

M, $X^1$, $X^2$, $L^1$, $L^2$, $L^3$, $R^1$, and $R^2$ are as defined for any of the previously defined four groups of metal carbene olefin metathesis catalysts;

r and s are independently zero or 1;

t is an integer in the range of zero to 5;

k is an integer in the range of zero to 1;

Y is any non-coordinating anion (e.g., a halide ion, $BF_4^-$, etc.);

$Z^1$ and $Z^2$ are independently selected from —O—, —S—, —$NR^2$—, —$PR^2$—, —P(=O)$R^2$—, —P(O$R^2$), —P(=O)(O$R^2$)—, —C(=O)—, —C(=O)O—, —OC(=O)—, —OC(=O)O—, —S(=O)—, —S(=O)$_2$—, and an optionally substituted and/or optionally heteroatom-containing $C_1$-$C_{20}$ hydrocarbylene linkage;

$Z^3$ is any cationic moiety such as —P($R^2$)$_3^+$ or —N($R^2$)$_3^+$; and any two or more of $X^1$, $X^2$, $L^1$, $L^2$, $L^3$, $Z^1$, $Z^2$, $Z^3$, $R^1$, and $R^2$ may be taken together to form a cyclic group, e.g., a multidentate ligand, and wherein any one or more of $X^1$, $X^2$, $L^1$, $L^2$, $L^3$, $Z^1$, $Z^2$, $Z^3$, $R^1$, and $R^2$ may be attached to a support.

Additionally, another group of metal carbene olefin metathesis catalysts that may be used in the invention disclosed herein, is a Group 8 transition metal complex having the structure of formula (XIII):

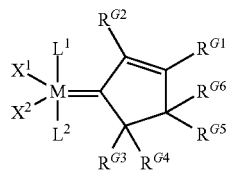

wherein M is a Group 8 transition metal, particularly ruthenium or osmium, or more particularly, ruthenium;

$X^1$, $X^2$, $L^1$, and $L^2$ are as defined for the first and second groups of metal carbene olefin metathesis catalysts defined above; and $R^{G1}$, $R^{G2}$, $R^{G3}$, $R^{G4}$, $R^{G5}$, and $R^{G6}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{G1}$, $R^{G2}$, $R^{G3}$, $R^{G4}$, $R^{G5}$, and $R^6$ may be linked together to form a cyclic group, or any one or more of the $R^{G1}$, $R^{G2}$, $R^{G3}$, $R^{G4}$, $R^{G5}$, and $R^{G6}$ may be attached to a support.

Additionally, one preferred embodiment of the Group 8 transition metal complex of formula (XIII) is a Group 8 transition metal complex of formula (XIV):

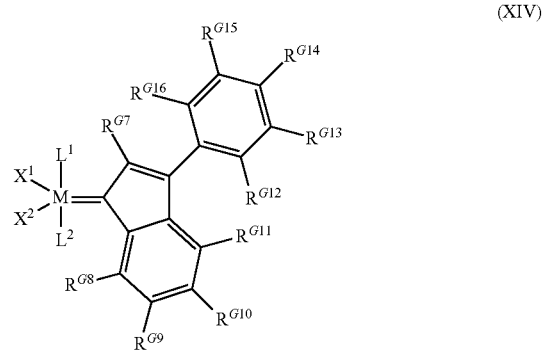

wherein M, $X^1$, $X^2$, $L^1$, and $L^2$ are as defined above for Group 8 transition metal complex of formula (XIII); and $R^{G7}$, $R^{G8}$, $R^{G9}$, $R^{G10}$, $R^{G11}$, $R^{G12}$, $R^{G13}$, $R^{G14}$, $R^{G15}$ and $R^{G16}$ are as defined above for $R^{G1}$, $R^{G2}$, $R^{G3}$, $R^{G4}$, $R^{G5}$, and $R^{G6}$ for Group 8 transition metal complex of formula (XIII) or any one or more of the $R^{G7}$, $R^{G8}$, $R^{G9}$, $R^{G10}$, $R^{G11}$, $R^{G12}$, $R^{G13}$, $R^{G14}$, $R^{G15}$, and $R^{G16}$ may be linked together to form a cyclic group, or any one or more of the $R^{G7}$, $R^{G8}$, $R^{G9}$, $R^{G10}$, $R^{G11}$, $R^{G12}$, $R^{G13}$, $R^{G14}$, $R^{G15}$, and $R^{G16}$ may be attached to a support.

Additionally, another preferred embodiment of the Group 8 transition metal complex of formula (XIII) is a Group 8 transition metal complex of formula (XV):

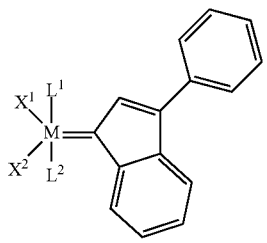

(XV)

wherein M, $X^1$, $X^2$, $L^1$, and $L^2$ are as defined above for Group 8 transition metal complex of formula (XIII).

Additionally, another group of metal carbene olefin metathesis catalysts that may be used in the invention disclosed herein, is a Group 8 transition metal complex comprising a Schiff base ligand having the structure of formula (XVI):

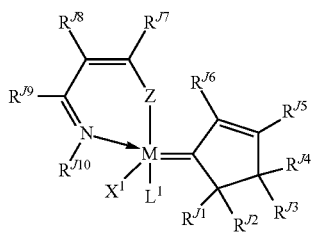

(XVI)

wherein M is a Group 8 transition metal, particularly ruthenium or osmium, or more particularly, ruthenium;

$X^1$ and $L^1$ are as defined for the first and second groups of metal carbene olefin metathesis catalysts defined above;

Z is selected from the group consisting of oxygen, sulfur, selenium, $NR^{J11}$, $PR^{J11}$, $AsR^{J11}$, and $SbR^{J11}$; and $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be linked together to form a cyclic group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be attached to a support.

Additionally, one preferred embodiment of the Group 8 transition metal complex of formula (XVI) is a Group 8 transition metal complex comprising a Schiff base ligand having the structure of formula (XVII):

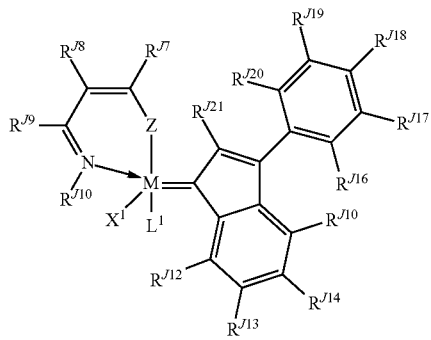

(XVII)

wherein M, $X^1$, $L^1$, Z, $R^{J7}$, $R^{J8}$, $R^{J9}$, $R^{J10}$, and $R^{J11}$ are as defined above for Group 8 transition metal complex of formula (XVI); and $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ are as defined above for $R^{J1}$, $R^{J2}$, $R^{J3}$, $R^{J4}$, $R^{J5}$, and $R^{J6}$ for Group 8 transition metal complex of formula (XVI), or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be linked together to form a cyclic group, or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be attached to a support.

Additionally, another preferred embodiment of the Group 8 transition metal complex of formula (XVI) is a Group 8 transition metal complex comprising a Schiff base ligand having the structure of formula (XVIII):

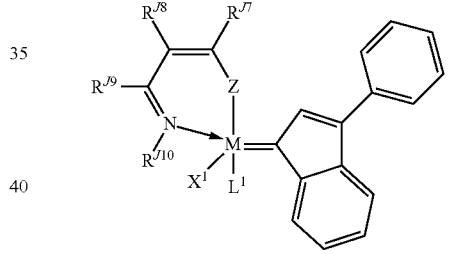

(XVIII)

wherein M, $X^1$, $L^1$, Z, $R^{J7}$, $R^{J8}$, $R^{J9}$, $R^{J10}$, and $R^{J11}$, are as defined above for Group 8 transition metal complex of formula (XVI).

Additionally, another group of metal carbene olefin metathesis catalysts that may be used in the invention disclosed herein, is a Group 8 transition metal complex comprising a Schiff base ligand having the structure of formula (XIX):

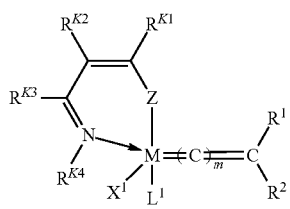

(XIX)

wherein M is a Group 8 transition metal, particularly ruthenium or osmium, or more particularly, ruthenium;

$X^1$, $L^1$, $R^1$, and $R^2$ are as defined for the first and second groups of metal carbene olefin metathesis catalysts defined above;

Z is selected from the group consisting of oxygen, sulfur, selenium, $NR^{K5}$, $PR^{K5}$, $AsR^{K5}$, and $SbR^{K5}$;

m is 0, 1, or 2; and $R^{K1}$, $R^{K2}$, $R^{K3}$, $R^{K4}$, and $R^{K5}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{K1}$, $R^{K2}$, $R^{K3}$, $R^{K4}$, and $R^{K5}$ may be linked together to form a cyclic group, or any one or more of the $R^{K1}$, $R^{K2}$, $R^{K3}$, $R^{K4}$, and $R^{K5}$ may be attached to a support.

In addition, metal carbene olefin metathesis catalysts of formulas (XVI) to (XIX) may be optionally contacted with an activating compound, where at least partial cleavage of a bond between the Group 8 transition metal and at least one Schiff base ligand occurs, wherein the activating compound is either a metal or silicon compound selected from the group consisting of copper (I) halides; zinc compounds of the formula $Zn(R^{Y1})_2$, wherein $R^{Y1}$ is halogen, $C_1$-$C_7$ alkyl or aryl; tin compounds represented by the formula $SnR^{Y2}R^{Y3}R^{Y4}R^{Y5}$ wherein each of $R^{Y2}$, $R^{Y3}$, $R^{Y4}$ and $R^{Y5}$ is independently selected from the group consisting of halogen, $C_1$-$C_{20}$ alkyl, $C_3$-$C_{10}$ cycloalkyl, aryl, benzyl, and $C_2$-$C_7$ alkenyl; and silicon compounds represented by the formula $SiR^{Y6}R^{Y7}R^{Y8}R^{Y9}$ wherein each of $R^{Y6}$, $R^{Y7}$, $R^{Y8}$, and $R^{Y9}$ is independently selected from the group consisting of hydrogen, halogen, $C_1$-$C_{20}$ alkyl, halo, $C_1$-$C_7$ alkyl, aryl, heteroaryl, and vinyl. In addition, metal carbene olefin metathesis catalysts of formulas (XVI) to (XIX) may be optionally contacted with an activating compound where at least partial cleavage of a bond between the Group 8 transition metal and at least one Schiff base ligand occurs, wherein the activating compound is an inorganic acid such as hydrogen iodide, hydrogen bromide, hydrogen chloride, hydrogen fluoride, sulfuric acid, nitric acid, iodic acid, periodic acid, perchloric acid, $HOClO$, $HOClO_2$, and $HOIO_3$. In addition, metal carbene olefin metathesis catalysts of formulas (XVI) to (XIX) may be optionally contacted with an activating compound where at least partial cleavage of a bond between the Group 8 transition metal and at least one Schiff base ligand occurs, wherein the activating compound is an organic acid such as sulfonic acids including but not limited to methanesulfonic acid, aminobenzenesulfonic acid, benzenesulfonic acid, napthalenesulfonic acid, sulfanilic acid and trifluoromethanesulfonic acid; monocarboxylic acids including but not limited to acetoacetic acid, barbituric acid, bromoacetic acid, bromobenzoic acid, chloroacetic acid, chlorobenzoic acid, chlorophenoxyacetic acid, chloropropionic acid, cis-cinnamic acid, cyanoacetic acid, cyanobutyric acid, cyanophenoxyacetic acid, cyanopropionic acid, dichloroacetic acid, dichloroacetylacetic acid, dihydroxybenzoic acid, dihydroxymalic acid, dihydroxytartaric acid, dinicotinic acid, diphenylacetic acid, fluorobenzoic acid, formic acid, furancarboxylic acid, furoic acid, glycolic acid, hippuric acid, iodoacetic acid, iodobenzoic acid, lactic acid, lutidinic acid, mandelic acid, α-naphtoic acid, nitrobenzoic acid, nitrophenylacetic acid, o-phenylbenzoic acid, thioacetic acid, thiophene-carboxylic acid, trichloroacetic acid, and trihydroxybenzoic acid; and other acidic substances such as but not limited to picric acid and uric acid.

In addition, other examples of metal carbene olefin metathesis catalysts that may be used with the present invention are located in the following disclosures, each of which is incorporated herein by reference, U.S. Pat. Nos. 7,687,635; 7,671,224; 6,284,852; 6,486,279; and 5,977,393; International Publication Number WO 2010/037550; and U.S. patent application Ser. Nos. 12/303,615; 10/590,380; 11/465,651 (U.S. Pat. App. Pub. No. 2007/0043188); and Ser. No. 11/465,651 (U.S. Pat. App. Pub. No. 2008/0293905 Corrected Publication); and European Pat. Nos. EP 1757613B1 and EP 1577282B1.

Non-limiting examples of metal carbene olefin metathesis catalysts that may be used to prepare supported complexes and in the reactions disclosed herein include the following, some of which for convenience are identified throughout this disclosure by reference to their molecular weight:

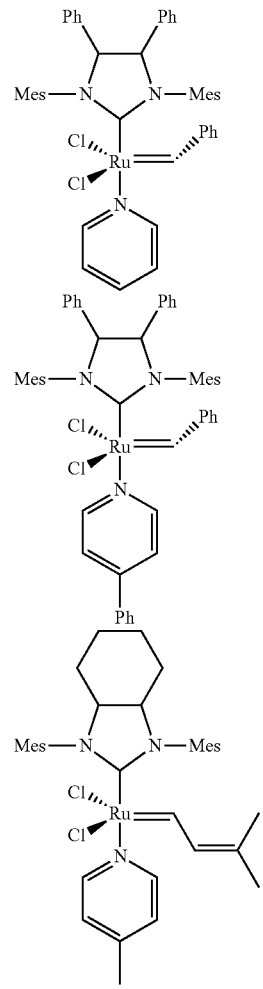

123
-continued
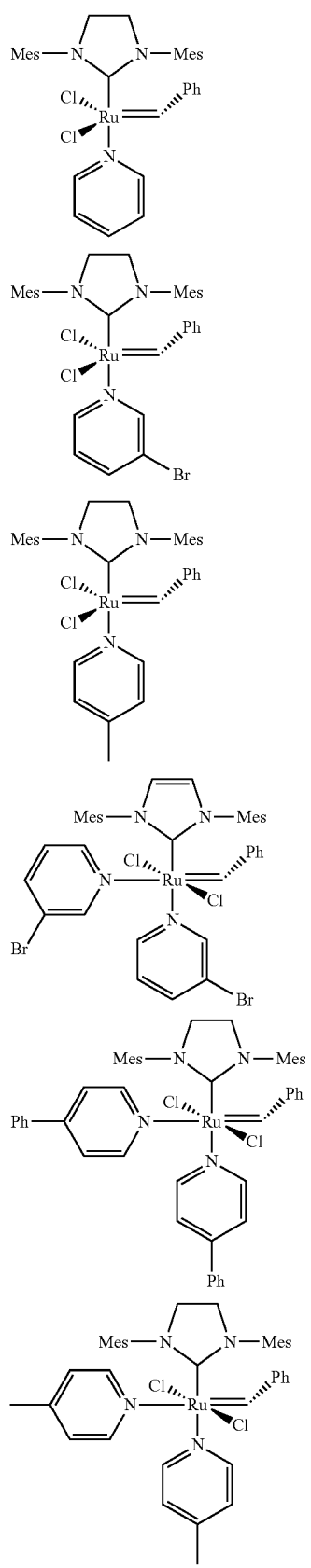
124
-continued
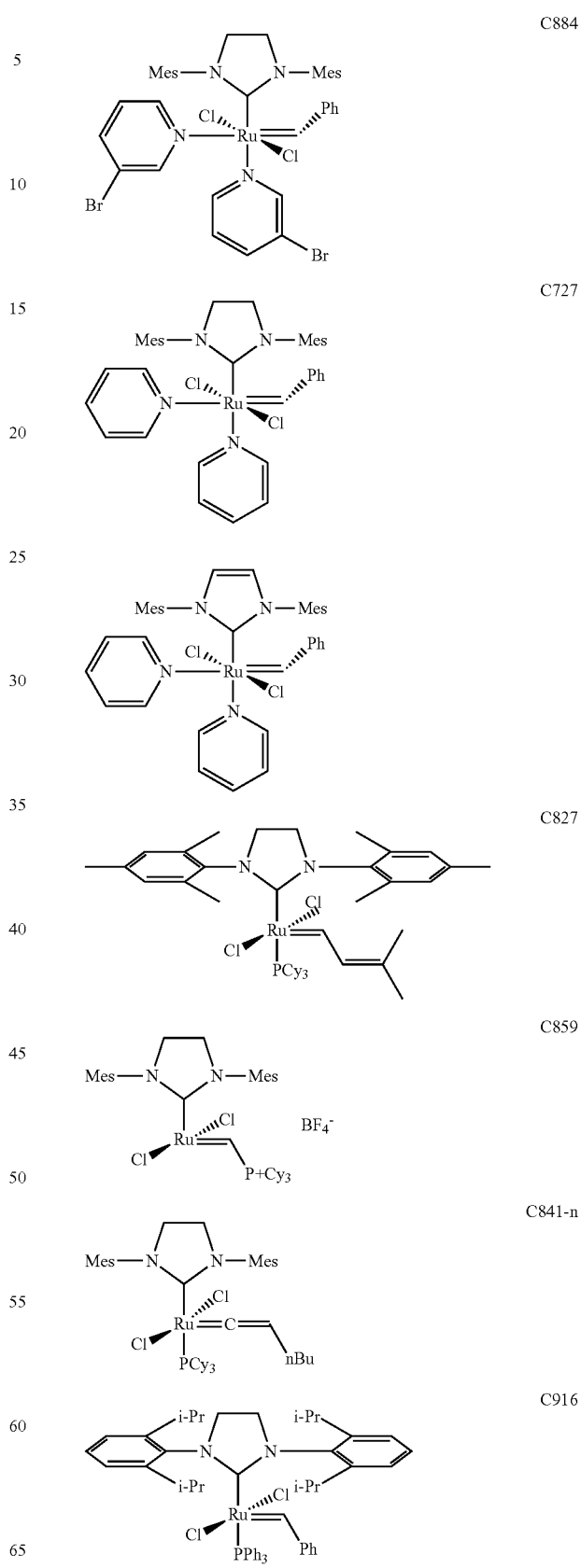

-continued
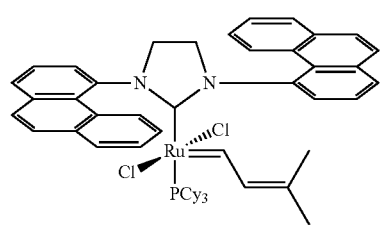
C965-p
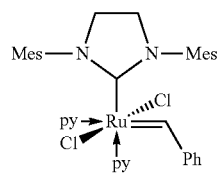
C727
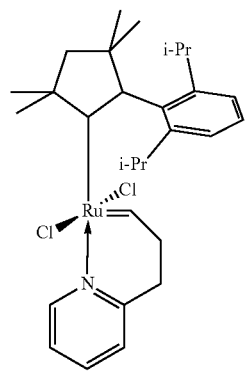
C577
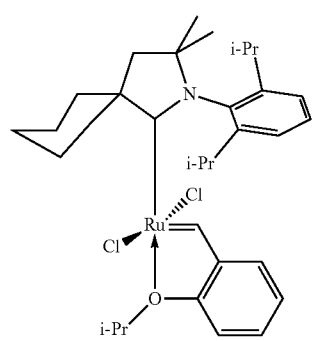
C646
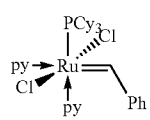
C701
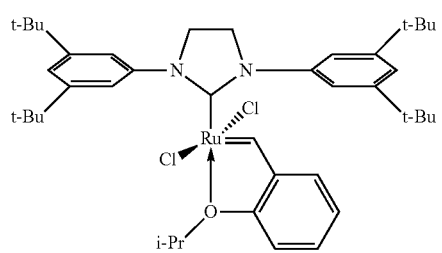
C767-m
-continued
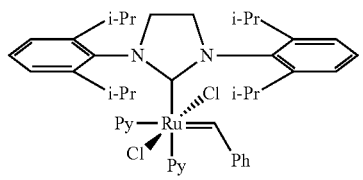
C811
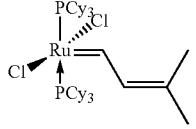
C801
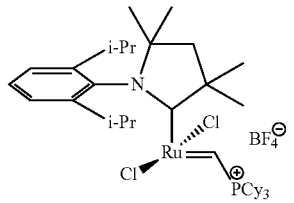
C838
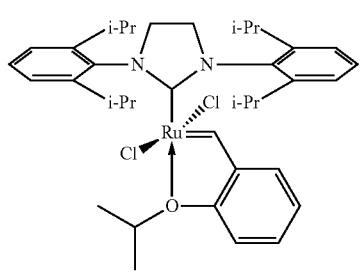
C712
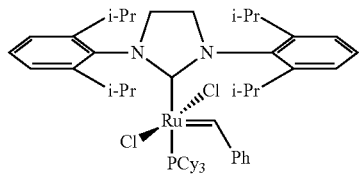
C933
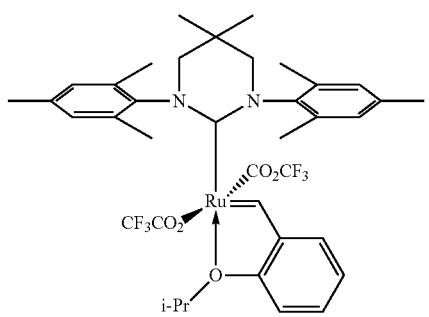
C824
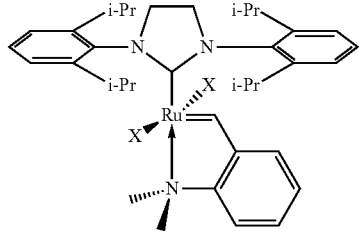
C697 (X = Cl)
C785 (X = Br)
C879 (X = I)

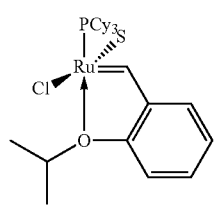
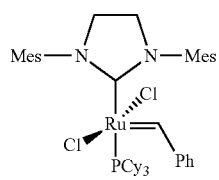
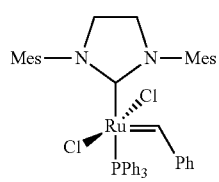
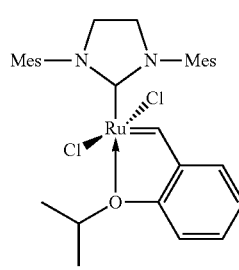
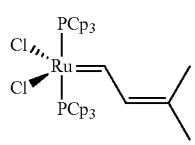
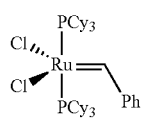
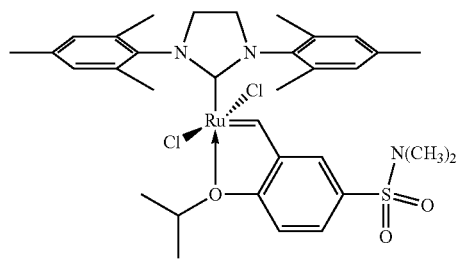
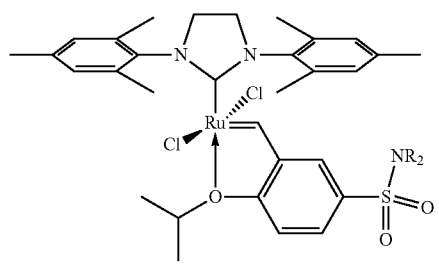
C601
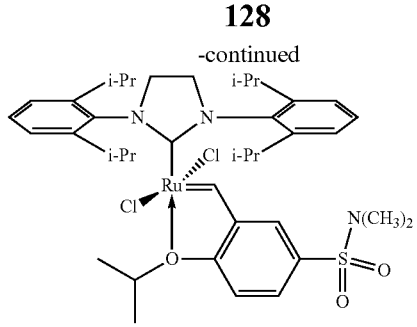
C848
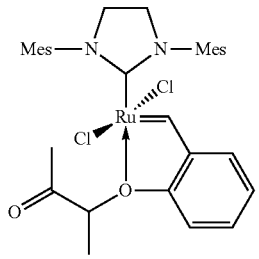
C831
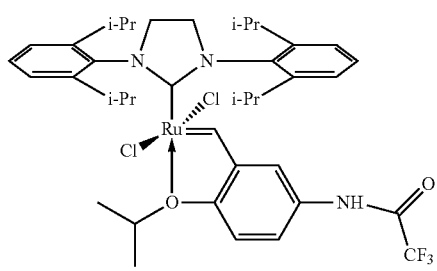
C627
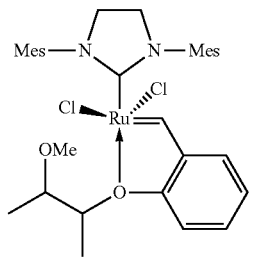
C716
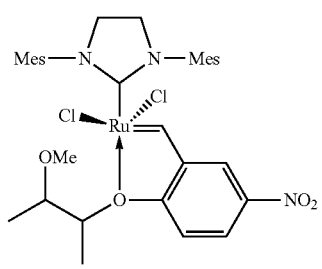
C823
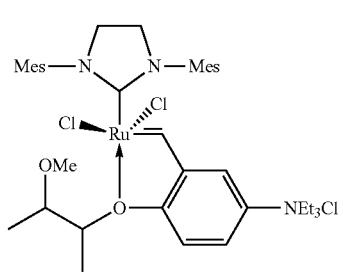

-continued

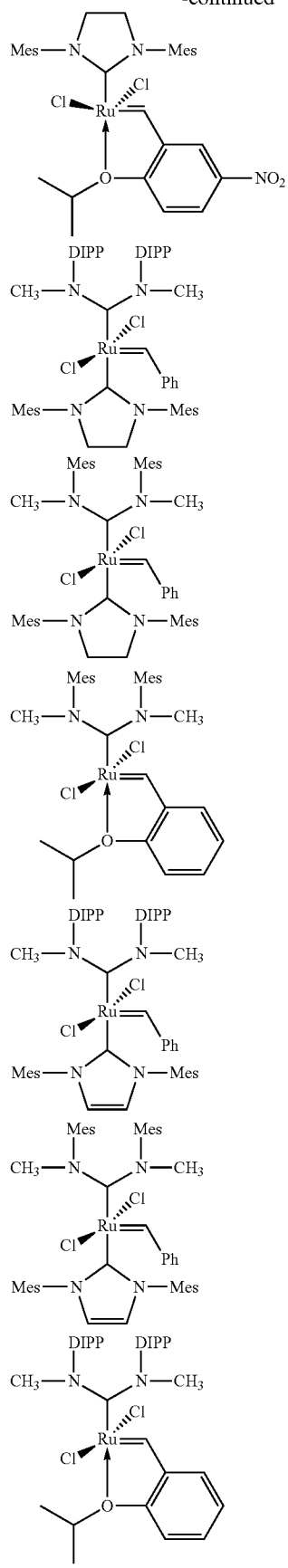

-continued

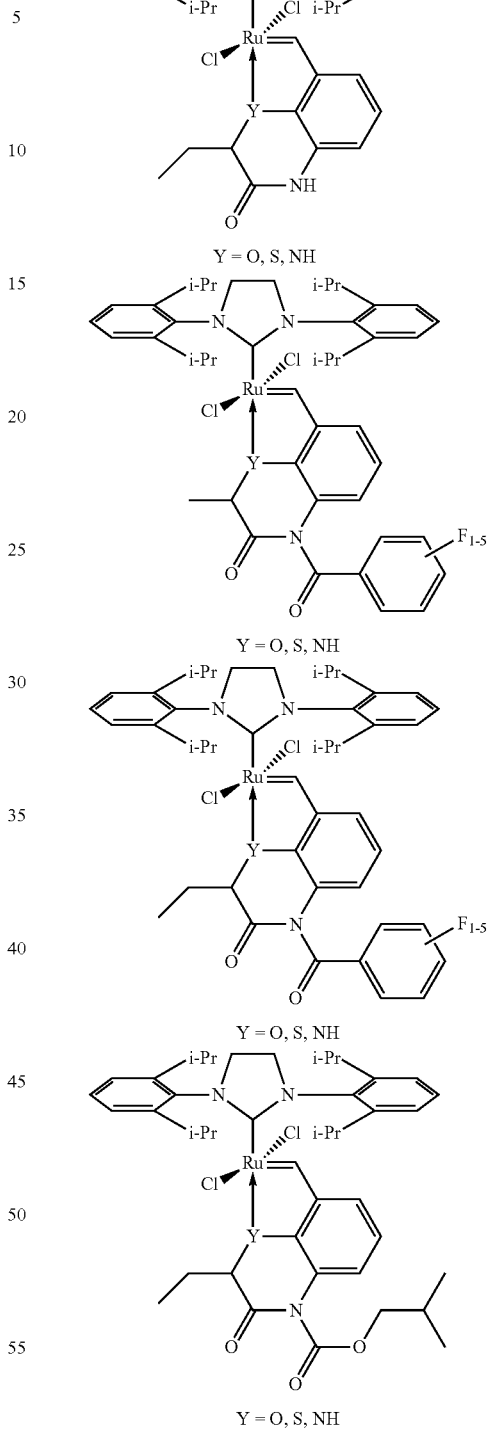

In the foregoing molecular structures and formulae, Ph represents phenyl, Cy represents cyclohexyl, Cp represents cyclopentyl, Me represents methyl, Bu represents n-butyl, t-Bu represents tert-butyl, i-Pr represents isopropyl, py represents pyridine (coordinated through the N atom), Mes represents mesityl (i.e., 2,4,6-trimethylphenyl), DiPP and DIPP represents 2,6-diisopropylphenyl, and MiPP represents 2-isopropylphenyl.

Further examples of metal carbene olefin metathesis catalysts useful to prepare supported complexes and in the reactions disclosed herein include the following: ruthenium (II) dichloro (3-methyl-2-butenylidene) bis(tricyclopentylphosphine) (C716); ruthenium (II) dichloro (3-methyl-2-butenylidene) bis(tricyclohexylphosphine) (C801); ruthenium (II) dichloro(phenylmethylene) bis(tricyclohexylphosphine) (C823); ruthenium (II) (1,3-bis-(2,4,6-trimethylphenyl)-2-imidazolidinylidene) dichloro (phenylmethylene) (triphenylphosphine) (C830); ruthenium (II) dichloro (phenylvinylidene) bis(tricyclohexylphosphine) (C835a); ruthenium (II) dichloro (tricyclohexylphosphine) (o-isopropoxyphenylmethylene) (C601); ruthenium (II) (1,3-bis-(2,4,6-trimethylphenyl)-2-imidazolidinylidene) dichloro (phenylmethylene) bis(3-bromopyridine) (C884); [1,3-bis-(2,4,6-trimethylphenyl)-2-imidazolidinylidene]dichloro(o-isopropoxyphenylmethylene)ruthenium(II) (C627); [1,3-bis-(2,4,6-trimethylphenyl)-2-imidazolidinylidene]dichloro (benzylidene) (triphenylphosphine) ruthenium(II) (C831); [1,3-bis-(2,4,6-trimethylphenyl)-2-imidazolidinylidene]dichloro (benzylidene)(methyldiphenylphosphine)ruthenium(II) (C769); [1,3-bis-(2,4,6-trimethylphenyl)-2-imidazolidinylidene]dichloro(benzylidene) (tricyclohexylphosphine)ruthenium(II) (C848); [1,3-bis-(2,4,6-trimethylphenyl)-2-imidazolidinylidene]dichloro (benzylidene) (diethylphenylphosphine) ruthenium(II) (C735); [1,3-bis-(2,4,6-trimethylphenyl)-2-imidazolidinylidene]dichloro(benzylidene)(tri-n-butylphosphine)ruthenium(II) (C771); [1,3-bis-(2,4,6-trimethylphenyl)-2-imidazolidinylidene]dichloro(3-methyl-2-butenylidene) (triphenylphosphine)ruthenium(II) (C809); [1,3-bis-(2,4,6-trimethylphenyl)-2-imidazolidinylidene]dichloro(3-methyl-2-butenylidene)(methyldiphenylphosphine)ruthenium(II) (C747); [1,3-bis-(2,4,6-trimethylphenyl)-2-imidazolidinylidene]dichloro(3-methyl-2-butenylidene) (tricyclohexylphosphine) ruthenium(II) (C827); [1,3-bis-(2,4,6-trimethylphenyl)-2-imidazolidinylidene]dichloro(3-methyl-2-butenylidene)(diethylphenylphosphine)ruthenium(II) (C713); [1,3-bis-(2,4,6-trimethylphenyl)-2-imidazolidinylidene]dichloro (3-methyl-2-butenylidene) (tri-n-butylphosphine)ruthenium(II) (C749); [1,3-bis-(2,4,6-trimethylphenyl)-2-imidazolidinylidene]dichloro (phenylindenylidene)(triphenylphosphine)ruthenium(II) (C931); [1,3-bis-(2,4,6-trimethylphenyl)-2-imidazolidinylidene]dichloro (phenylindenylidene) (methyldiphenylphosphine) ruthenium(II) (C869); [1,3-bis-(2,4,6-trimethylphenyl)-2-imidazolidinylidene]dichloro (phenylindenylidene) (tricyclohexylphosphine) ruthenium (II) (C949); [1,3-bis-(2,4,6-trimethylphenyl)-2-imidazolidinylidene]dichloro(phenylindenylidene)(diethylphenylphosphine)ruthenium(II) (C835); and [1,3-bis-(2,4,6-trimethylphenyl)-2-imidazolidinylidene]dichloro (phenylindenylidene)(tri-n-butylphosphine)ruthenium(II) (C871).

Still further metal carbene olefin metathesis catalysts useful in ROMP reactions, and/or in other metathesis reactions, such as ring-closing metathesis, cross metathesis, ring-opening cross metathesis, self-metathesis, ethenolysis, alkenolysis, acyclic diene metathesis polymerization, and combinations thereof, include the following structures:

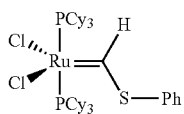

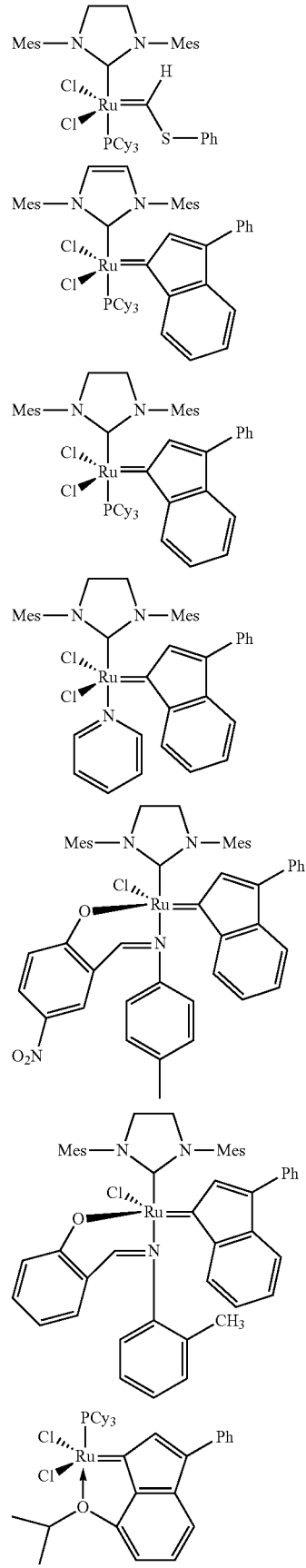

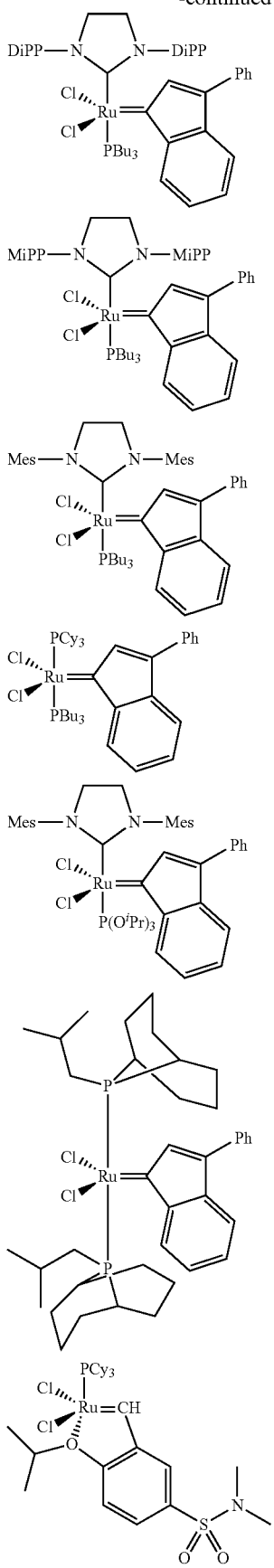

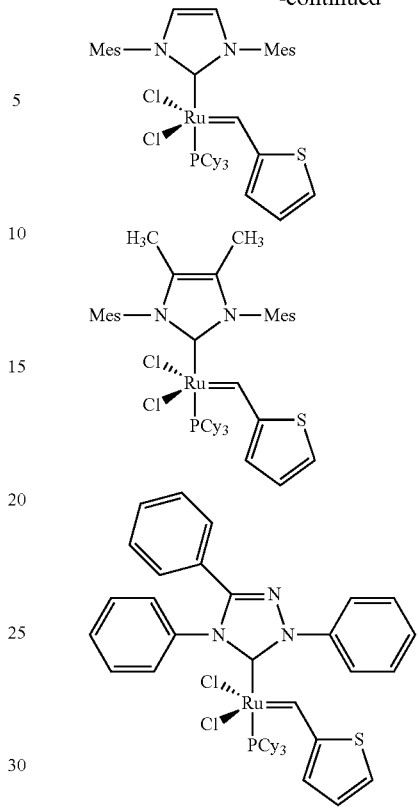

In general, the transition metal complexes used as catalysts herein can be prepared by several different methods, such as those described by Schwab et al. (1996) *J. Am. Chem. Soc.* 118:100-110, Scholl et al. (1999) *Org. Lett.* 6:953-956, Sanford et al. (2001) *J. Am. Chem. Soc.* 123: 749-750, U.S. Pat. No. 5,312,940, and U.S. Pat. No. 5,342,909, the disclosures of each of which are incorporated herein by reference. Also see U.S. Pat. App. Pub. No. 2003/0055262 to Grubbs et al., WO 02/079208, and U.S. Pat. No. 6,613,910 to Grubbs et al., the disclosures of each of which are incorporated herein by reference. Preferred synthetic methods are described in WO 03/11455A1 to Grubbs et al., the disclosure of which is incorporated herein by reference.

Preferred metal carbene olefin metathesis catalysts are Group 8 transition metal complexes having the structure of formula (I) commonly called "First Generation Grubbs" catalysts, formula (III) commonly called "Second Generation Grubbs" catalysts, or formula (VII) commonly called "Grubbs-Hoveyda" catalysts.

More preferred metal carbene olefin metathesis catalysts have the structure of formula (I):

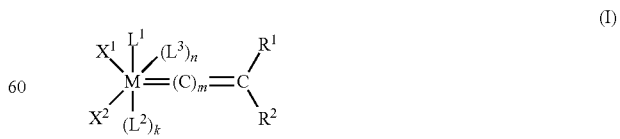

(I)

in which:

M is a Group 8 transition metal;
$L^1$, $L^2$, and $L^3$ are neutral electron donor ligands;
n is 0 or 1;

m is 0, 1, or 2;
k is 0 or 1;
$X^1$ and $X^2$ are anionic ligands;
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support;
and formula (VII):

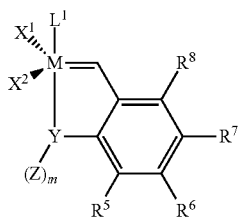

(VII)

wherein,
M is a Group 8 transition metal;
$L^1$ is a neutral electron donor ligand;
$X^1$ and $X^2$ are anionic ligands;
Y is a heteroatom selected from O or N;
$R^5$, $R^6$, $R^7$, and $R^8$ are independently selected from hydrogen, hydrocarbyl, substituted hydrocarbyl, heteroatom-containing hydrocarbyl, substituted heteroatom-containing hydrocarbyl, and functional groups;
n is 0, 1, or 2; and
Z is selected from hydrogen, hydrocarbyl, substituted hydrocarbyl, heteroatom-containing hydrocarbyl, substituted heteroatom-containing hydrocarbyl, and functional groups,
wherein any combination of Y, Z, $R^5$, $R^6$, $R^7$, and $R^8$ can be linked to form one or more cyclic groups, and further wherein any combination of $X^1$, $X^2$, $L^1$, Y, Z, $R^5$, $R^6$, $R^7$, and $R^8$ may be attached to a support.

Most preferred metal carbene olefin metathesis catalysts have the structure of formula (I):

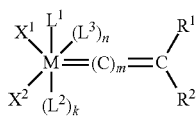

(I)

in which:
M is ruthenium;
n is 0;
m is 0;
k is 1;
$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride;
$R^1$ is hydrogen and $R^2$ is phenyl or —CH=C(CH$_3$)$_2$ or thienyl; or $R^1$ and $R^2$ are taken together to form phenylindenylidene;
and formula (VII):

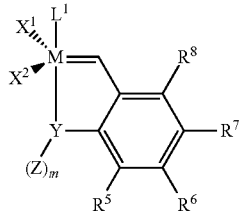

(VII)

wherein,
M is ruthenium;
$L^1$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene;
$X^1$ and $X^2$ are chloride;
Y is oxygen;
$R^5$, $R^6$, $R^7$, and $R^8$ are each hydrogen;
n is 1; and
Z is isopropyl.

In one embodiment the invention is directed to a composition comprising a first metal carbene olefin metathesis catalyst and a second metal carbene olefin metathesis catalyst, wherein the first metal carbene olefin metathesis catalyst is represented by the structure of formula (V),

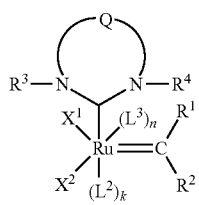

(V)

wherein,
$L^2$ and $L^3$ are neutral electron donor ligands;
n is 0 or 1;
k is 0 or 1;
$X^1$ and $X^2$ are anionic ligands;

$R^1$ is H;

$R^2$ is phenyl;

$R^3$ and $R^4$ are independently selected from hydrogen, hydrocarbyl, substituted hydrocarbyl, heteroatom-containing hydrocarbyl, and substituted heteroatom-containing hydrocarbyl; and Q is a two-atom linkage having the structure —$CR^{11}R^{12}$—$CR^{13}R^{14}$— or —$CR^{11}$=$CR^{13}$—, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups; and the second metal carbene olefin metathesis catalyst is represented by the structure of formula (V),

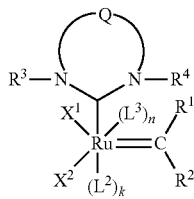

(V)

wherein, $L^2$ and $L^3$ are neutral electron donor ligands;

n is 0 or 1;

k is 0 or 1;

$X^1$ and $X^2$ are anionic ligands;

$R^1$ is H;

$R^2$ is —CH=C(CH$_3$)$_2$;

$R^3$ and $R^4$ are independently selected from hydrogen, hydrocarbyl, substituted hydrocarbyl, heteroatom-containing hydrocarbyl, and substituted heteroatom-containing hydrocarbyl; and Q is a two-atom linkage having the structure —$CR^{11}R^{12}$—$CR^{13}R^{14}$— or —$CR^{11}$=$CR^{13}$—, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups.

In one embodiment the invention is directed to a composition comprising a first metal carbene olefin metathesis catalyst and a second metal carbene olefin metathesis catalyst, wherein the first metal carbene olefin metathesis catalyst is represented by the structure of formula (V),

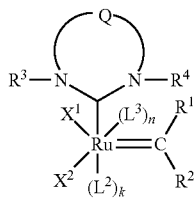

(V)

wherein, $L^2$ and $L^3$ are neutral electron donor ligands;

n is 0 or 1;

k is 0 or 1;

$X^1$ and $X^2$ are anionic ligands;

$R^1$ is H;

$R^2$ is phenyl;

$R^3$ and $R^4$ are independently selected from hydrogen, hydrocarbyl, substituted hydrocarbyl, heteroatom-containing hydrocarbyl, and substituted heteroatom-containing hydrocarbyl; and Q is a two-atom linkage having the structure —$CR^{11}R^{12}$—$CR^{13}R^{14}$— or —$CR^{11}$=$CR^{13}$—, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups; and the second metal carbene olefin metathesis catalyst is represented by the structure of formula (V),

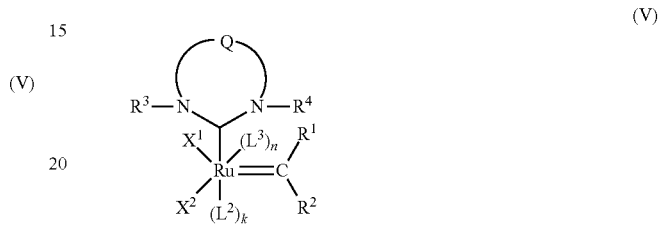

(V)

wherein, $L^2$ and $L^3$ are neutral electron donor ligands;

n is 0 or 1;

k is 0 or 1;

$X^1$ and $X^2$ are anionic ligands;

$R^1$ and $R^2$ are taken together to form phenylindenylidene;

$R^3$ and $R^4$ are independently selected from hydrogen, hydrocarbyl, substituted hydrocarbyl, heteroatom-containing hydrocarbyl, and substituted heteroatom-containing hydrocarbyl; and Q is a two-atom linkage having the structure —$CR^{11}R^{12}$—$CR^{13}R^{14}$— or —$CR^{11}$=$CR^{13}$—, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups.

In one embodiment the invention is directed to a composition comprising a first metal carbene olefin metathesis catalyst and a second metal carbene olefin metathesis catalyst, wherein the first metal carbene olefin metathesis catalyst is represented by the structure of formula (V),

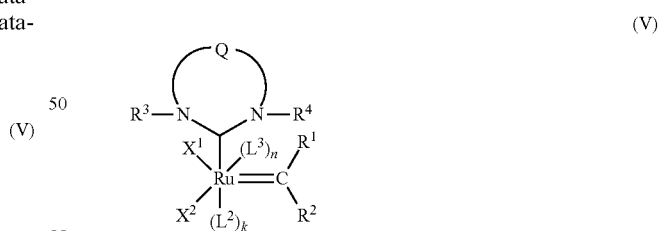

(V)

wherein, $L^2$ and $L^3$ are neutral electron donor ligands;

n is 0 or 1;

k is 0 or 1;

$X^1$ and $X^2$ are anionic ligands;

$R^1$ is H;

$R^2$ is —CH=C(CH$_3$)$_2$;

$R^3$ and $R^4$ are independently selected from hydrogen, hydrocarbyl, substituted hydrocarbyl, heteroatom-containing hydrocarbyl, and substituted heteroatom-containing hydrocarbyl; and Q is a two-atom linkage having the structure —CR$^{11}$R$^{12}$—CR$^{13}$R$^{14}$— or —CR$^{11}$=CR$^{13}$—, wherein R$^{11}$, R$^{12}$, R$^{13}$, and R$^{14}$ are independently selected from hydrogen, hydrocarbyl, substituted hydrocarbyl, heteroatom-containing hydrocarbyl, substituted heteroatom-containing hydrocarbyl, and functional groups; and the second metal carbene olefin metathesis catalyst is represented by the structure of formula (V),

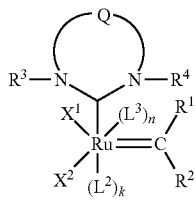

(V)

wherein,

L$^2$ and L$^3$ are neutral electron donor ligands;

n is 0 or 1;

k is 0 or 1;

X$^1$ and X$^2$ are anionic ligands;

R$^1$ and R$^2$ are taken together to form phenylindenylidene;

R$^3$ and R$^4$ are independently selected from hydrogen, hydrocarbyl, substituted hydrocarbyl, heteroatom-containing hydrocarbyl, and substituted heteroatom-containing hydrocarbyl; and Q is a two-atom linkage having the structure —CR$^{11}$R$^{12}$—CR$^{13}$R$^{14}$— or —CR$^{11}$=CR$^{13}$—, wherein R$^{11}$, R$^{12}$, R$^{13}$, and R$^{14}$ are independently selected from hydrogen, hydrocarbyl, substituted hydrocarbyl, heteroatom-containing hydrocarbyl, substituted heteroatom-containing hydrocarbyl, and functional groups.

Suitable supports for any of the metal carbene olefin metathesis catalysts described herein may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect. Indirect covalent linkages are typically, though not necessarily, through a functional group on a support surface. Ionic attachments are also suitable, including combinations of one or more anionic groups on the metal complexes coupled with supports containing cationic groups, or combinations of one or more cationic groups on the metal complexes coupled with supports containing anionic groups.

When utilized, suitable supports may be selected from silicas, silicates, aluminas, aluminum oxides, silica-aluminas, aluminosilicates, zeolites, titanias, titanium dioxide, magnetite, magnesium oxides, boron oxides, clays, zirconias, zirconium dioxide, carbon, polymers, cellulose, cellulosic polymers amylose, amylosic polymers, or a combination thereof. The support preferably comprises silica, a silicate, or a combination thereof.

In certain embodiments, it is also possible to use a support that has been treated to include functional groups, inert moieties, and/or excess ligands. Any of the functional groups described herein are suitable for incorporation on the support, and may be generally accomplished through techniques known in the art. Inert moieties may also be incorporated on the support to generally reduce the available attachment sites on the support, e.g., in order to control the placement, or amount, of a complex linked to the support.

The single metal carbene olefin metathesis catalysts and the olefin metathesis catalyst compositions comprising at least two metal carbene olefin metathesis catalysts, as described herein, may be utilized in olefin metathesis reactions according to techniques known in the art. The single metal carbene olefin metathesis catalysts or the olefin metathesis catalyst compositions comprising at least two metal carbene olefin metathesis catalysts are typically added to the resin composition as a solid, a solution, or as a suspension. When the single metal carbene olefin metathesis catalyst or the olefin metathesis catalyst composition comprising at least two metal carbene olefin metathesis catalysts is added to the resin composition as a suspension, the single metal carbene olefin metathesis catalyst or mixture of at least two metal carbene olefin metathesis catalysts is suspended in a dispersing carrier such as mineral oil, paraffin oil, soybean oil, tri-isopropylbenzene, or any hydrophobic liquid which has a sufficiently high viscosity so as to permit effective dispersion of the catalyst(s), and which is sufficiently inert and which has a sufficiently high boiling point so that is does not act as a low-boiling impurity in the olefin metathesis reaction. It will be appreciated that the amount of catalyst that is used (i.e., the "catalyst loading" or "total monomer to catalyst ratio") in the reaction is dependent upon a variety of factors such as the identity of the reactants and the reaction conditions that are employed. It is therefore understood that catalyst loading or "total monomer to catalyst ratio" may be optimally and independently chosen for each reaction.

Adhesion Promoter

Adhesion promoters that may be used in the present invention disclosed herein are generally compounds containing at least two isocyanate groups (such as, for example, methylene diphenyl diisocyanate and hexamethylene diisocyanate). The adhesion promoter may be a diisocyanate, triisocyanate, or polyisocyanate (i.e., containing four or more isocyanate groups). The adhesion promoter may be a mixture of at least one diisocyanate, triisocyanate, or polyisocyanate. In a more particular aspect of the invention, the adhesion promoter comprises, or is limited to, a diisocyanate compound, or mixtures of diisocyanate compounds.

In general, adhesion promoters that may be used in the present invention may be any compound having at least two isocyanate groups. Suitable adhesion promoters include, without limitation, isocyanate compounds comprising at least two isocyanate groups, and wherein the compounds are selected from hydrocarbyl, substituted hydrocarbyl, heteroatom-containing hydrocarbyl, substituted heteroatom-containing hydrocarbyl, and functionalized hydrocarbyl compounds. As described above, suitable hydrocarbyl adhesion promoter compounds generally include alkyl, cycloalkyl, alkylene, alkenyl, alkynyl, aryl, cycloalkyl, alkaryl, and aralkyl compounds. Substituted heteroatom-containing, and functionalized hydrocarbyl adhesion promoter compounds include the afore-mentioned hydrocarbyl compounds, as well as the variations thereof noted hereinabove.

Adhesion promoters that may be used in the present invention may be an alkyl diisocyanate. An alkyl diisocyanate refers to a linear, branched, or cyclic saturated or unsaturated hydrocarbon group typically although not necessarily containing 1 to about 24 carbon atoms, preferably a diisocyanate containing 2 to about 12 carbon atoms, and more preferably a diisocyanate containing 6 to 12 carbon atoms such as hexamethylene diisocyanate (HDI), octamethylene diisocyanate, decamethylene diisocyanate, and the like. Cycloalkyl diisocyanates contain cyclic alkyl group, typically having 4 to 16 carbon atoms. A preferred cycloalkyl diisocyanate containing 6 to about 12 carbon atoms are cyclohexyl, cyclooctyl, cyclodecyl, and the like. A more preferred cycloalkyl diisocyanate originates as a condensation product of acetone called 5-isocyanato-1-(isocyanatomethyl)-1,3,3-trimethyl-cyclohexane, commonly known as Isophorone diisocyanate (IPDI) and the isomers of isocyanato-[(isocyanatocyclohexyl)methyl]cyclohexane ($H_{12}MDI$). $H_{12}MDI$ is derived from the hydrogenated form of the aryl diisocyanate methylene diphenyl diisocyanate (MDI).

Adhesion promoters that may be used in the present invention may be an aryl diisocyanate. Aryl diisocyanates refers to aromatic diisocyanates containing a single aromatic ring or multiple aromatic rings that are fused together, directly linked, or indirectly linked (such that the different aromatic rings are bound to a common group such as a methylene or ethylene moiety). Preferred aryl diisocyanates contain 5 to 24 carbon atoms, and particularly preferred aryl diisocyanates contain 5 to 14 carbon atoms. Exemplary aryl diisocyanates contain one aromatic ring or two fused or linked aromatic rings, e.g., phenyl, tolyl, xylyl, naphthyl, biphenyl, diphenylether, benzophenone, and the like. Preferred aromatic diisocyanates include toluene diisocyanates, tetramethylxylene diisocyanate (TMXDI), and methylene diphenyl diisocyanate (MDI), which may comprise any mixture of its three isomers, 2,2'-MDI, 2,4'-MDI, and 4,4'-MDI.

Adhesion promoters that may be used in the present invention may be a polymer-containing isocyanate, such as, for example, diisocyanates. Polymer-containing isocyanates refers to a polymer-containing two or more terminal and/or pendant alkyl or aryl isocyanate groups. The polymer-containing isocyanates generally have to have a minimal solubility in the resin to provide improved mechanical properties. Preferred polymer-containing isocyanates include, but are not limited to, PM200 (poly MDI), Lupranate® (poly MDI from BASF), Krasol® isocyanate terminated polybutadiene prepolymers, such as, for example, Krasol® LBD2000 (TDI based), Krasol® LBD3000 (TDI based), Krasol® NN-22 (MDI based), Krasol® NN-23 (MDI based), Krasol® NN-25 (MDI based), and the like. Krasol® isocyanate terminated polybutadiene prepolymers are available from Cray Valley.

Adhesion promoters that may be used in the present invention may be a trimer of alkyl diisocyanates and aryl diisocyanates. In its simplest form, any combination of polyisocyanate compounds may be trimerized to form an isocyanurate ring containing isocyanate functional groups. Trimers of alkyl diisocyanate and aryl diisocyanates may also be referred to as isocyanurates of alkyl diisocyanate or aryl diisocyanate. Preferred alkyl diisocyanate and aryl diisocyanate trimers include, but are not limited to, hexamethylene diisocyanate trimer (HDIt), isophorone diisocyanate trimer, toluene diisocyanate trimer, tetramethylxylene diisocyanate trimer, methylene diphenyl diisocyanate trimers, and the like. More preferred adhesion promoters are toluene diisocyanates, tetramethylxylene diisocyanate (TMXDI), and methylene diphenyl diisocyanate (MDI) including any mixture of its three isomers 2,2'-MDI, 2,4'-MDI and 4,4'-MDI; liquid MDI; solid MDI; hexamethylenediisocyanatetrimer (HDIt); hexamethylenediisocyanate (HDI); isophorone diisocyanate (IPDI); 4,4'-methylene bis (cyclohexyl isocyanate) (H12MDI); polymeric MDI (PM200); MDI prepolymer (Lupranate® 5080); liquid carbodiimide modified 4,4'-MDI (Lupranate® MM103); liquid MDI (Lupranate® MI); liquid MDI (Mondur® ML); and liquid MDI (Mondur® MLQ). Even more preferred adhesion promoters are methylene diphenyl diisocyanate (MDI) including any mixture of its three isomers 2,2'-MDI, 2,4'-MDI and 4,4'-MDI; liquid MDI; solid MDI; hexamethylenediisocyanatetrimer (HDIt); hexamethylene diisocyanate (HDI); isophorone diisocyanate (IPDI); 4,4'-methylene bis (cyclohexyl isocyanate) (H12MDI); polymeric MDI (PM200); MDI prepolymer (Lupranate® 5080); liquid carbodiimide modified 4,4'-MDI (Lupranate® MM103); liquid MDI) (Lupranate® MI); liquid MDI (Mondur® ML); liquid MDI (Mondur® MLQ).

Any concentration of adhesion promoter which improves the mechanical properties of the olefin composite is sufficient for the invention. In general, suitable amounts of adhesion promoter range from 0.001-50 phr, particularly 0.05-10 phr, more particularly 0.1-10 phr, or even more particularly 0.5-4.0 phr.

The adhesion promoters are generally suitable for use with any substrate material in which the addition of the adhesion promoter provides beneficial improvements in the adhesion of the resin (e.g., ROMP) composition to the substrate material as compared to a resin composition that is the same with the exception that the adhesion promoter is not included. In one embodiment the invention is directed to the use of any substrate material in which the surfaces of such materials are capable of reacting with the adhesion promoters having at least two isocyanate groups. Particularly suitable substrate materials for use with the adhesion promoters are glass and carbon material surfaces suitable for use with epoxy and methacrylate resins, including those containing finishes or sizings, in which case the finishes or sizings do not need to be removed (e.g., by washing or heat cleaning) for the adhesion promoters to be effective. Other suitable substrate materials include wood and aluminum materials. Additional suitable substrate materials may also be selected form fibrous, woven, microparticulate, ceramic, metal, polymer, and semiconductor materials. A polymer-matrix composite (e.g., ROMP polymer matrix composite) may be comprised of one substrate material or a mixture of different substrate materials. One or more adhesion promoters may be used in the present invention.

Additional adhesion promoters suitable for use in the present invention comprise functionalized silanes of the formula $Fn-(A)_n-Si(Y^*)_3$, wherein $Y^*$ is selected from halide (preferably chloride) or OR; Fn is a functional group selected from acrylate, methacrylate, allyl, vinyl, alkene, cycloalkene, or norbornene; A is a divalent linking group selected from hydrocarbylene, substituted hydrocarbylene, heteroatom-containing hydrocarbylene, or substituted heteroatom-containing hydrocarbylene; n is 0 or 1; and R is selected from hydrocarbyl, substituted hydrocarbyl, heteroatom-containing hydrocarbyl, or substituted heteroatom-containing hydrocarbyl, preferably lower alkyl, more preferably methyl, ethyl, or isopropyl; and a peroxide selected from dialkyl and diaryl peroxides.

Additional adhesion promoters for use in the present invention and methods for their use include those disclosed in International Pat. App. No. PCT/US00/03002, the contents of which are incorporated herein by reference.

Compounds Comprising a Heteroatom-Containing Functional Group and a Metathesis Active Olefin The compound comprising a heteroatom-containing functional group and a metathesis active olefin typically contains between 2 and 20 carbons with hydroxyl, amine, thiol, phosphorus, or silane functional groups. Compounds comprising a heteroatom-containing functional group and a metathesis active olefin that may be used in the present invention disclosed herein are generally compounds containing at least one heteroatom containing functional group and at least one metathesis active olefin and are of the following general structure:

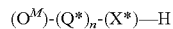

$(O^M)\text{-}(Q^*)_n\text{-}(X^*)\text{—H}$ wherein $O^M$, $Q^*$, and $X^*$ are as follows:

$O^M$ is a metathesis active olefin fragment selected from cyclic olefins and acyclic olefins, where the carbon-carbon double bond typically is not tetra-substituted (e.g., at least one substituent is a hydrogen);

$Q^*$ is an optional linker group (e.g., n=0 or 1) such as, for example, a hydrocarbylene (including, for example, substituted hydrocarbylene, heteroatom-containing hydrocarbylene, and substituted heteroatom-containing hydrocarbylene, such as substituted and/or heteroatom-containing alkylene) or —(CO)— group; and $X^*$ is oxygen, sulfur, or a heteroatom-containing fragment such as $N(R^X)$, $P(R^X)$, $OP(R^X)$, $OP(R^X)O$, $OP(OR^X)O$, $P(=O)(R^X)$, $OP(=O)(R^X)$, $OP(=O)(R^X)O$, $OP(=O)(OR^X)O$, $Si(R^X)_2$, $Si(R^X)_2O$, $Si(OR^X)_2O$, or $Si(R^X)(OR^X)O$, wherein each $R^X$ is, independent of one another, a hydrogen or a hydrocarbyl group optionally comprising further functional groups. Each $R^X$ is, independent of one another, most commonly a hydrogen, aryl, or lower alkyl group.

Metathesis active olefins include cyclic olefins as described herein, where such cyclic olefins may be optionally substituted, optionally heteroatom-containing, mono-unsaturated, di-unsaturated, or poly-unsaturated $C_5$ to $C_{24}$ hydrocarbons that may be mono-, di-, or poly-cyclic. The cyclic olefin may generally be any strained or unstrained cyclic olefin, provided the cyclic olefin is able to participate in a ROMP reaction either individually or as part of a ROMP cyclic olefin composition. Metathesis active olefins also include acyclic olefins, where such acyclic olefins may be optionally substituted, optionally heteroatom-containing, mono-unsaturated, di-unsaturated, or poly-unsaturated $C_2$ to $C_{30}$ hydrocarbons, typically $C_2$ to $C_{20}$ hydrocarbons, or more typically $C_2$ to $C_{12}$ hydrocarbons. Acyclic olefins may contain one or more terminal olefins and/or one or more internal olefins, and/or any combination of terminal olefins and/or internal olefins.

In the heteroatom-containing functional group, $X^*$ is commonly oxygen, sulfur, or $NR^X$ and is most commonly oxygen, i.e., a hydroxy-substituted olefin. Preferred compounds comprising a heteroatom-containing functional group and a metathesis active olefin include, but are not limited to, 5-norbornene-2-methanol (NB-MeOH); 2-hydroxyethyl bicycle[2.2.1]hept-2-ene-carboxylate (HENB); 2-hydroxyethyl acrylate (HEA); allyl alcohol; oleyl alcohol; 9-decen-1-ol; vinyl alcohol, allyl alcohol, cis-13-dodecenol, and trans-9-octadecenol, and other unsaturated alcohols, norbornyl alcohol, 2-cycloocten-1-ol, 2-cyclooctadiene-1-ol, and p-vinyl phenol, and other alcohols which have an alicyclic structure; 2-hydroxyethyl methacrylate; 2-hydroxy-3-acryloxypropyl methacrylate, ethoxylated hydroxyethyl acrylate, ethoxylated hydroxyethyl methacrylate, polypropyleneglycol monomethacrylate, polypropylene glycol monoacrylate, phenol acrylate, phenol methacrylate, bisphenol A type epoxy acrylate, novolac type epoxy acrylate, and brominated bisphenol A type epoxy acrylate, and other methacrylics or acrylics which have one or more methacryl or acryl groups and hydroxyl groups, etc.

Furthermore, compounds comprising a heteroatom-containing functional group and a metathesis active olefin may be added to a cyclic olefin resin composition. Any concentration of compounds comprising a heteroatom-containing functional group and a metathesis active olefin which improves the mechanical properties of the olefin composite is sufficient for the invention. In general, suitable amounts of compounds comprising a heteroatom-containing functional group and a metathesis active olefin range from 0.001-50 phr, particularly 0.05-10 phr, more particularly 0.1-10 phr, or even more particularly 0.5-4.0 phr. One or more compounds comprising a heteroatom-containing functional group and a metathesis active olefin may be used in the present invention.

Adhesion Promoter Compositions

A compound containing at least two isocyanate groups is combined with a compound comprising a heteroatom-containing functional group and a metathesis active olefin and pre-reacted providing an adhesion promoter composition having in-resin storage stability and providing an olefin metathesis composite with improved mechanical properties. Any concentration of a compound containing at least two isocyanate groups is sufficient for use in preparing adhesion promoter compositions for use in the invention, where the mol % or mol equivalents of a compound containing at least two isocyanate groups used to form the pre-reacted mixture is greater than the mol % or mol equivalents of a compound comprising a heteroatom-containing functional group and a metathesis active olefin used to form the pre-reacted mixture. Mol ratios of a compound comprising a heteroatom-containing functional group and a metathesis active olefin relative to a compound containing at least two isocyanate groups range from 0.001:1 to 0.90:1. Preferred mol ratios of a compound comprising a heteroatom-containing functional group and a metathesis active olefin relative to a compound containing at least two isocyanate groups range from 0.01:1 to 0.75:1, particularly 0.01:1 to 0.5:1, more particularly 0.02:1 to 0.25:1. One skilled in the art will recognize that the optimal ratio of a compound comprising a heteroatom-containing functional group and a metathesis active olefin to a compound containing at least two isocyanate groups may need to be adjusted as a function of the amount of adhesion promoter composition added to the cyclic olefin resin composition.

Adhesion promoter compositions that may be used in the present invention disclosed herein are generally compositions comprising at least one adhesion promoter, discussed supra (i.e., at least one compound containing at least two isocyanate groups (e.g., methylene diphenyl diisocyanate, hexamethylene diisocyanate)) and at least one compound comprising a heteroatom-containing functional group and a metathesis active olefin, discussed supra (e.g., 2-hydroxyethyl bicyclo[2.2.1]hept-2-ene-5-carboxylate (HENB), 2-hydroxyethyl acrylate (HEA), oleyl alcohol, 9-decen-1-ol), where the compounds may be combined in various ratios to form a pre-reacted mixture, wherein the pre-reacted mixture is then subsequently added to a cyclic olefin resin composition, and where the adhesion promoter composition possesses in-resin storage stability.

Compounds containing at least two isocyanate groups and compounds comprising a heteroatom-containing functional group and a metathesis active olefin useful for preparing adhesion promoter compositions for use in the invention are disclosed herein.

Preferred adhesion promoter compositions include, but are not limited to, pre-reacted mixtures of liquid MDI (Mondur® MLQ) and 2-hydroxyethyl bicycle[2.2.1]hept-2-ene-carboxylate (HENB); pre-reacted mixtures of liquid MDI (Mondur® MLQ) and 2-hydroxyethyl acrylate (HEA); pre-reacted mixtures of liquid MDI (Mondur® MLQ) and oleyl alcohol; and pre-reacted mixtures of liquid MDI (Mondur® MLQ) and 9-decen-1-ol.

Any concentration of adhesion promoter composition which improves the mechanical properties of the olefin composite is sufficient for the invention. In general, suitable amounts of adhesion promoter composition range from 0.001-50 phr, particularly 0.05-10 phr, more particularly 0.1-10 phr, or even more particularly, 0.5-4.0 phr.

The adhesion promoter compositions are generally suitable for use with any substrate material in which the addition of the adhesion promoter composition provides beneficial improvements in the adhesion of the resin (e.g., ROMP) composition to the substrate material as compared to a resin composition that is the same with the exception that the adhesion promoter composition is not included. In one embodiment the invention is directed to the use of any substrate material in which the surfaces of such materials are capable of reacting with the adhesion promoter compositions. Particularly suitable substrate materials for use with the adhesion promoter compositions are glass and carbon material surfaces suitable for use with epoxy and methacrylate resins, including those containing finishes or sizings, in which case the finishes or sizings do not need to be removed (e.g., by washing or heat cleaning) for the adhesion promoter compositions to be effective. Other suitable substrate materials include wood and aluminum materials. Additional suitable substrate materials may also be selected form fibrous, woven, microparticulate, ceramic, metal, polymer, and semiconductor materials. A polymer-matrix composite (e.g., ROMP polymer matrix composite) may be comprised of one substrate material or a mixture of different substrate materials.

Resin Compositions and Articles

Resin compositions that may be used in the present invention disclosed herein generally comprise at least one cyclic olefin. The cyclic olefins described hereinabove are suitable for use and may be functionalized or unfunctionalized, and may be substituted or unsubstituted. Additionally, resin compositions according to the invention may comprise at least one cyclic olefin and an olefin metathesis catalyst composition comprising at least two metal carbene olefin metathesis catalysts. Additionally, resin compositions according to the invention may also comprise at least one cyclic olefin, where the resin composition is combined with an olefin metathesis catalyst composition comprising at least two metal carbene olefin metathesis catalysts. In another embodiment, resin compositions according to the invention may comprise at least one cyclic olefin and an exogenous inhibitor (e.g., trialkylphosphines, triarylphosphines, hydroperoxides). Here, exogenous (meaning external additive or other reactives that can be added to the resin composition, or mixed or combined with the catalyst composition comprising at least two metal carbene olefin metathesis catalysts) is distinguished from indigenous (meaning native or established by the components attached to the transition metal of the carbene catalysts). Exogenous inhibitors or "gel modification additives," for use in the present invention and methods for their use are disclosed in U.S. Pat. No. 5,939,504, the contents of which are incorporated herein by reference. U.S. Pat. No. 5,939,504 discloses the use of exogenous "gel modification additives" or exogenous inhibitors, such as a neutral electron donor or a neutral Lewis base, preferably trialkylphosphines and triarylphosphines. Trialkylphosphines and triarylphosphines for use as exogenous inhibitors include without limitation trimethylphosphine (PMe$_3$), triethylphosphine (PEt$_3$), tri-n-butylphosphine (PBu$_3$), tri(ortho-tolyl)phosphine (P-o-tolyl$_3$), tri-tert-butylphosphine (P-tert-Bu$_3$), tricyclopentylphosphine (PCyclopentyl$_3$), tricyclohexylphosphine (PCy$_3$), triisopropylphosphine (P-i-Pr$_3$), trioctylphosphine (POct$_3$), triisobutylphosphine, (P-i-Bu$_3$), triphenylphosphine (PPh$_3$), tri(pentafluorophenyl)phosphine (P(C$_6$F$_5$)$_3$), methyldiphenylphosphine (PMePh$_2$), dimethylphenylphosphine (PMe$_2$Ph), and diethylphenylphosphine (PEt$_2$Ph). Preferred trialkyl phosphines and triarylphosphines for use as exogenous inhibitors are tricyclohexylphosphine and triphenylphosphine. A single trialkylphosphine and/or triarylphosphine may be used or a combination of two or more different trialkylphosphines and/or triarylphosphines may be used. In another embodiment, resin compositions according to the invention may comprise at least one cyclic olefin and an adhesion promotor. Adhesion promotors for use in the present invention and methods for their use include those mentioned above and those further disclosed in International Pat. App. No. PCT/US2012/042850, the contents of which are incorporated herein by reference. In another embodiment, resin compositions according to the invention may comprise at least one cyclic olefin and a hydroperoxide gel modifier (exogenous inhibitor). Hydroperoxide gel modifiers for use in the present invention and methods for their use are disclosed in International Pat. App. No. PCT/US2012/042850, the contents of which are incorporated herein by reference. International Pat. App. No. PCT/US2012/042850 discloses the use of exogenous hydroperoxide gel modifiers or exogenous inhibitors, such as cumene hydroperoxide. Although, in general, the hydroperoxide may be any organic hydroperoxide that is effective to delay the onset of the gel state, the hydroperoxide is typically an alkyl, for example, $C_2$-$C_{24}$ alkyl, aryl, for example, $C_5$-$C_{24}$ aryl, aralkyl, or alkaryl, for example, $C_6$-$C_{24}$ alkaryl, hydroperoxide, especially secondary or tertiary aliphatic or aromatic hydroperoxides. More specific hydroperoxides suitable for use include tert-butyl hydroperoxide, tert-amyl hydroperoxide, cumene hydroperoxide, diisopropyl benzene hydroperoxide, (2,5-dihydroperoxy)-2,5-dimethylhexane, cyclohexyl hydroperoxide, triphenylmethyl hydroperoxide, pinane hydroperoxide (e.g., Glidox® 500; LyondellBasell), and paramenthane hydroperoxide (e.g., Glidox® 300; Lyondell-Basell). More preferably, the hydroperoxides suitable for use include tert-butyl hydroperoxide and cumene hydroperoxide. Gel-modification additives may be added to the reaction mixture in the absence of solvent, or as organic or aqueous solutions. A single hydroperoxide compound may be used as the gel-modification additive, or a combination of two or more different hydroperoxide compounds may be used.

In another embodiment the present invention provides a composition comprising at least one cyclic olefin and at least two metal carbene olefin metathesis catalysts.

In another embodiment the present invention provides a composition comprising an olefin metathesis catalyst composition comprising at least two metal carbene olefin metathesis catalysts and a resin composition comprising at least one cyclic olefin and an optional exogenous inhibitor.

In another embodiment the present invention provides a ROMP composition comprising an olefin metathesis catalyst composition comprising at least two metal carbene olefin metathesis catalysts and a resin composition comprising at least one cyclic olefin.

In another embodiment the present invention provides a ROMP composition comprising an olefin metathesis catalyst composition comprising at least two metal carbene olefin metathesis catalysts and a resin composition comprising at least one cyclic olefin and an optional exogenous inhibitor.

In another embodiment the present invention provides a method for polymerizing a resin composition comprising at least one cyclic olefin and an optional exogenous inhibitor, by combining an olefin metathesis catalyst composition comprising at least two metal carbene olefin metathesis catalysts with the resin composition, and subjecting the combined composition to conditions effective to polymerize the combined composition.

In another embodiment, resin compositions according to the invention may comprise at least one cyclic olefin, at least one adhesion promoter, and at least one substrate material, such as for example, a glass or carbon substrate material. In another embodiment, resin compositions according to the invention may comprise at least one cyclic olefin, at least one adhesion promoter, at least one substrate material, and an olefin metathesis catalyst composition comprising at least two metal carbene olefin metathesis catalysts.

Resin compositions of the invention may be optionally formulated with additives. Suitable additives include, but are not limited to, gel modifiers, hardness modulators, antioxidants, antiozonants, stabilizers, fillers, binders, coupling agents, thixotropes, impact modifiers, elastomers, wetting agents, wetting agents, biocides, plasticizers, pigments, flame retardants, dyes, fibers and reinforcement materials, including sized reinforcements and substrates, such as those treated with finishes, coatings, coupling agents, film formers and/or lubricants. Furthermore, the amount of additives present in the resin compositions may vary depending on the particular type of additive used. The concentration of the additives in the resin compositions typically ranges from, for example, 0.001-85 percent by weight, particularly, from 0.1-75 percent by weight, or even more particularly, from 2-60 percent by weight.

Suitable impact modifiers or elastomers include without limitation natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers. Preferred impact modifiers or elastomers are polybutadiene Diene 55AC10 (Firestone), polybutadiene Diene 55AM5 (Firestone), EPDM Royalene 301T, EPDM Buna T9650 (Bayer), styrene-ethylene/butylene-styrene copolymer Kraton G1651H, Polysar Butyl 301 (Bayer), polybutadiene Taktene 710 (Bayer), styrene-ethylene/butylene-styrene Kraton G1726M, Ethylene-Octene Engage 8150 (DuPont-Dow), styrene-butadiene Kraton D1184, EPDM Nordel 1070 (DuPont-Dow), and polyisobutylene Vistanex MML-140 (Exxon). Such materials are normally employed in the resin composition at levels of about 0.10 phr to 10 phr, but more preferably at levels of about 0.1 phr to 5 phr. Various polar impact modifiers or elastomers can also be used.

Resin compositions of the invention may be optionally formulated with or without a crosslinker, for example, a crosslinker selected from dialkyl peroxides, diacyl peroxides, and peroxyacids.

Antioxidants and antiozonants include any antioxidant or antiozonant used in the rubber or plastics industry. An "Index of Commercial Antioxidants and Antiozonants, Fourth Edition" is available from Goodyear Chemicals, The Goodyear Tire and Rubber Company, Akron, Ohio 44316. Suitable stabilizers (i.e., antioxidants or antiozonants) include without limitation: 2,6-di-tert-butyl-4-methylphenol (BHT); styrenated phenol, such as Wingstay S (Goodyear); 2- and 3-tert-butyl-4-methoxyphenol; alkylated hindered phenols, such as Wingstay C (Goodyear); 4-hydroxymethyl-2,6-di-tert-butylphenol; 2,6-di-tert-butyl-4-sec-butylphenol; 2,2'-methylenebis(4-methyl-6-tert-butylphenol); 2,2'-methylenebis(4-ethyl-6-tert-butylphenol); 4,4'-methylenebis(2,6-di-tert-butylphenol); miscellaneous bisphenols, such as Cyanox® 53 and Permanax WSO; 2,2'-ethylidenebis(4,6-di-tert-butylphenol); 2,2'-methylenebis(4-methyl-6-(1-methylcyclohexyl)phenol); 4,4'-butylidenebis(6-tert-butyl-3-methylphenol); polybutylated Bisphenol A; 4,4'-thiobis(6-tert-butyl-3-methylphenol); 4,4'-methylenebis(2,6-dimethylphenol); 1,1'-thiobis(2-naphthol); methylene bridged polyaklylphenol, such as Ethyl antioxidant 738; 2,2'-thiobis(4-methyl-6-tert-butylphenol); 2,2'-isobutylidenebis(4,6-dimethylphenol); 2,2'-methylenebis(4-methyl-6-cyclohexylphenol); butylated reaction product of p-cresol and dicyclopentadiene, such as Wingstay L; tetrakis(methylene-3,5-di-tert-butyl-4-hydroxyhydrocinnamate)methane, i.e., Irganox 1010; 1,3,5-trimethyl-2,4,6-tris(3,5-di-tert-butyl-4-hydroxybenzyl)benzene, e.g., Ethanox 330; 4,4'-methylenebis (2,6-di-tertiary-butylphenol), e.g., Ethanox 4702 or Ethanox 4710; 1,3,5-tris(3,5-di-tert-butyl-4-hydroxybenzyl) isocyanurate, i.e., Good-rite 3114, 2,5-di-tert-amylhydroquinone, tert-butylhydroquinone, tris(nonylphenylphosphite), bis(2,4-di-tert-butyl)pentaerythritol)diphosphite, distearyl pentaerythritol diphosphite, phosphited phenols and bisphenols, such as Naugard 492, phosphite/phenolic antioxidant blends, such as Irganox B215; di-n-octadecyl(3,5-di-tert-butyl-4-hydroxybenzyl)phosphonate, such as Irganox 1093; 1,6-hexamethylene bis(3-(3,5-di-tert-butyl-4-hydroxyphenylpropionate), such as Irganox 259, and octadecyl-3,5-di-tert-butyl-4-hydroxyhydrocinnamate, i.e., Irganox 1076, tetrakis(2,4-di-tert-butylphenyl)4,4'-biphenylylenediphosphonite, diphenylamine, and 4,4'-diemthoxydiphenylamine. Such materials are normally employed in the resin composition at levels of about 0.10 phr to 10 phr, but more preferably at levels of about 0.1 phr to 5 phr.

Suitable reinforcing materials include those that add to the strength or stiffness of a polymer composite when incorporated with the polymer. Reinforcing materials can be in the form of filaments, fibers, rovings, mats, weaves, fabrics, knitted material, cloth, or other known structures. Suitable reinforcement materials include glass fibers and fabrics, carbon fibers and fabrics, aramid fibers and fabrics, polyolefin fibers or fabrics (including ultrahigh molecular weight polyethylene fabrics such as those produced by Honeywell under the Spectra trade name), and polyoxazole fibers or fabrics (such as those produced by the Toyobo Corporation under the Zylon trade name). Reinforcing materials containing surface finishes, sizings, or coatings are particularly suitable for the described invention including Ahlstrom glass roving (R338-2400), Johns Manville glass roving (Star ROV®-086), Owens Corning rovings (OCV 366-AG-207, R25H-X14-2400, SE1200-207, SE1500-2400, SE2350-250), PPG glass rovings (Hybon® 2002, Hybon® 2026), Toho Tenax® carbon fiber tow (HTR-40), and Zoltek carbon fiber tow (Panex® 35). Furthermore, any fabrics prepared using reinforcing materials containing surface finishes, sizings or coatings are suitable for the invention. Advantageously, the invention does not require the expensive process of removing of surface finishes, sizings, or coatings from the reinforcing materials. Additionally, glass fibers or fabrics may include without limitation A-glass, E-glass or S-glass, S-2 glass, C-glass, R-glass, ECR-glass, M-glass, D-glass, and quartz, and silica/quartz. Preferred glass fiber reinforcements are those with finishes formulated for use with epoxy, vinyl ester, and/or polyurethane resins. When formulated for use with a combination of these resin types, the reinforcements are sometimes described as "multi-compatible." Such reinforcements are generally treated during their manufacture with organosilane coupling agents comprising vinyl, amino, glycidoxy, or methacryloxy functional groups (or various combinations thereof) and are coated with a finish to protect the fiber surface and facilitate handling and processing (e.g., spooling and weaving). Finishes typically comprise a mixture of chemical and polymeric compounds such as film formers, surfactants, and lubricants. Especially preferred glass reinforcements are those containing some amount of amino-functionalized silane coupling agent. Especially preferred finishes are those comprising and epoxy-based and/or polyurethane-based film formers. Examples of preferred glass-fiber reinforcements are those based on Hybon® 2026, 2002, and 2001 (PPG) multi-compatible rovings; Ahlstrom R338 epoxysilane-sized rovings; StarRov® 086 (Johns Manville) soft silane sized multi-compatible rovings; OCV™ 366, SE 1200, and R25H (Owens Corning) multi-compatible rovings; OCV™ SE 1500 and 2350 (Owens Corning) epoxy-compatible rovings; and Jushi Group multi-compatible glass rovings (752 type, 396 type, 312 type, 386 type). Additional suitable polymer fibers and fabrics may include without limitation one or more of polyester, polyamide (for example, NYLON polamide available from E.I. DuPont, aromatic polyamide (such as KEVLAR aromatic polyamide available from E.I. DuPont, or P84 aromatic polyamide available from Lenzing Aktiengesellschaft), polyimide (for example KAPTON polyimide available from E.I. DuPont, polyethylene (for example, DYNEEMA polyethylene from Toyobo Co., Ltd.). Additional suitable carbon fibers may include without limitation AS2C, AS4, AS4C, AS4D, AS7, IM6, IM7, IM9, and PV42/850 from Hexcel Corporation; TORAYCA T300, T300J, T400H, T600S, T700S, T700G, T800H, T800S, T1000G, M35J, M40J, M46J, M50J, M55J, M60J, M30S, M30G, and M40 from Toray Industries, Inc.; HTS12K/24K, G30-500 3k/6K/12K, G30-500 12K, G30-700 12K, G30-7000 24K F402, G40-800 24K, STS 24K, HTR 40 F22 24K 1550tex from Toho Tenax, Inc.; 34-700, 34-700WD, 34-600, 34-600WD, and 34-600 unsized from Grafil Inc.; T-300, T-650/35, T-300C, and T-650/35C from Cytec Industries. Additionally suitable carbon fibers may include without limitation AKSACA (A42/D011), AKSACA (A42/D012), Blue Star Starafil (10253512-90), Blue Star Starafil (10254061-130), SGL Carbon (C30 T050 1.80), SGL Carbon (C50 T024 1.82), Grafil (347R1200U), Grafil (THR 6014A), Grafil (THR 6014K), Hexcel Carbon (AS4C/EXP 12K), Mitsubishi (Pyrofil TR 50S 12L AF), Mitsubishi (Pyrofil TR 50S 12L AF), Toho Tenax (T700SC 12000-50C), Toray (T700SC 12000-90C), Zoltek (Panex 35 50K, sizing 11), Zoltek (Panex 35 50K, sizing 13). Additional suitable carbon fabrics may include without limitation Carbon fabrics by Vectorply (C-L 1800) and Zoltek (Panex 35 D Fabic-PX35UD0500-1220). Additionally suitable glass fabrics may include without limitation glass fabrics as supplied by Vectorply (E-LT 3500-10) based on PPG Hybon® 2026; Saertex (U14EU970-01190-T2525-125000) based on PPG Hybon® 2002; Chongqing Polycomp Internation Corp. (CPIC® Fiberglass) (EKU 1150(0)/50-600); and Owens Corning (L1020/07A06 Xweft 200tex), and SGL Kumpers (HPT970) based on PPG Hybon® 2002.

Other suitable fillers include, for example, metallic density modulators, microparticulate density modulators, such as, for example, microspheres, and macroparticulate density modulators, such as, for example, glass or ceramic beads. Metallic density modulators include, but are not limited to, powdered, sintered, shaved, flaked, filed, particulated, or granulated metals, metal oxides, metal nitrides, and/or metal carbides, and the like. Preferred metallic density modulators include, among others, tungsten, tungsten carbide, aluminum, titanium, iron, lead, silicon oxide, aluminum oxide, boron carbide, and silicon carbide. Microparticulate density modulators include, but are not limited to, glass, metal, thermoplastic (either expandable or pre-expanded) or thermoset, and/or ceramic/silicate microspheres. Macroparticulate density modulators include, but are not limited to, glass, plastic, or ceramic beads; metal rods, chunks, pieces, or shot; hollow glass, ceramic, plastic, or metallic spheres, balls, or tubes; and the like.

The invention is also directed to articles manufactured from a resin composition comprising at least one cyclic olefin and olefin metathesis catalyst composition comprising at least two metal carbene olefin metathesis catalysts.

In another embodiment the present invention provides a method for making an article comprising combining an olefin metathesis catalyst composition comprising at least two metal carbene olefin metathesis catalysts with a resin composition comprising at least one cyclic olefin and an optional exogenous inhibitor to form a ROMP composition and subjecting the ROMP composition to conditions effective to polymerize the ROMP composition.

In another embodiment the present invention provides a method of making an article comprising, combining an olefin metathesis catalyst composition comprising at least two metal carbene olefin metathesis catalysts and a resin composition comprising at least one cyclic olefin and an optional exogenous inhibitor to form a ROMP composition, and subjecting the ROMP composition to conditions effective to polymerize the ROMP composition.

In another embodiment the present invention provides an article of manufacture comprising an olefin metathesis catalyst composition comprising at least two metal carbene olefin metathesis catalysts, and a resin composition comprising at least one cyclic olefin and an optional exogenous inhibitor.

In another embodiment the present invention provides an article of manufacture comprising an olefin metathesis catalyst composition comprising at least two metal carbene olefin metathesis catalysts, a resin composition comprising at least one cyclic olefin, at least one substrate material, and an optional exogenous inhibitor.

In another embodiment the present invention provides an article of manufacture comprising an olefin metathesis catalyst composition comprising at least two metal carbene olefin metathesis catalysts, a resin composition comprising at least one cyclic olefin, at least one adhesion promoter, at least one substrate material, and an optional exogenous inhibitor.

In another embodiment the present invention provides a method of making an article comprising, combining a resin composition comprising at least one cyclic olefin and an olefin metathesis catalyst composition comprising at least two metal carbene olefin metathesis catalysts to form a ROMP composition, contacting the ROMP composition with a substrate material, and subjecting the ROMP composition to conditions effective to polymerize the ROMP composition.

In another embodiment the present invention provides a method of making an article comprising, combining an olefin metathesis catalyst composition comprising at least two metal carbene olefin metathesis catalysts and a resin composition comprising at least one cyclic olefin, at least one adhesion promoter, and an optional exogenous inhibitor to form a ROMP composition, contacting the ROMP composition with a substrate material, and subjecting the ROMP composition to conditions effective to polymerize the ROMP composition.

In another embodiment the present invention provides a method of making an article comprising, combining an olefin metathesis catalyst composition comprising at least two metal carbene olefin metathesis catalysts and a resin composition comprising at least one cyclic olefin and an optional exogenous inhibitor to form a ROMP composition, contacting the ROMP composition with a substrate material, and subjecting the ROMP composition to conditions effective to polymerize the ROMP composition.

Articles may include, but are not limited to, those formed by standard manufacturing techniques including casting, centrifugal casting, pultrusion, molding, rotational molding, open molding, reaction injection molding (RIM), resin transfer molding (RTM), pouring, vacuum impregnation, surface coating, filament winding and other methods known to be useful for production of polymer articles. Molded parts include but are not limited to reaction injection molding, resin transfer molding, and vacuum assisted resin transfer molding. Furthermore, the compositions and articles of manufacture of the invention are not limited to a single polymer-surface interface but include also multilayers and laminates containing multiple polymer-surface interfaces. The invention is also suitable for manufacture of articles by the infusion of the resin into a porous material. Such porous materials include but are not limited to wood, cement, concrete, open-cell and reticulated foams and sponges, papers, cardboards, felts, ropes or braids of natural or synthetic fibers, and various sintered materials. Additionally, other manufacturing techniques include without limitation cell casting, dip casting, continuous casting, embedding, potting, encapsulation, film casting or solvent casting, gated casting, mold casting, slush casting, extrusion, mechanical foaming, chemical foaming, physical foaming, compression molding or matched die molding, spray up, Vacuum Assisted Resin Transfer Molding (VAR™), Seeman's Composite Resin Infusion Molding Process (SCRIMP), blow molding, in mold coating, in-mold painting or injection, vacuum forming, Reinforced Reaction Injection Molding (RRIM), Structural Reaction Injection Molding (SRIM), thermal expansion transfer molding (TERM), resin injection recirculation molding (RICM), controlled atmospheric pressure resin infusion (CAPRI), hand-layup. For manufacturing techniques requiring the use of a RIM or impingement style mixhead, including without limitation RIM, SRIM, and RRIM, articles of manufacture may be molded using a single mixhead or a plurality of mixheads as well as a plurality of material injection streams (e.g., two resin streams and one catalyst stream).

The present invention is also directed to articles manufactured from a resin composition comprising at least one cyclic olefin, where the resin composition is combined with an olefin metathesis catalyst composition comprising at least two metal carbene olefin metathesis catalysts, and the resulting resin composition is optionally applied to a substrate, which may be, for example, a functionalized substrate.

Furthermore, the present invention also allows for the making of articles of manufacture of any configuration, weight, size, thickness, or geometric shape. Examples of articles of manufacture include without limitation any molded or shaped article for use as an aerospace component, a marine component, an automotive component, a sporting goods component, an electrical component, and industrial component, medical component, dental component, oil and gas component, or military component. In one embodiment an article may be a turbine component used on aircraft or general power generation. In one embodiment, turbine components may include without limitation one or more of an inlet, pylon, pylon fairing, an acoustic panel, a thrust reverser panel, a fan blade, a fan containment case, a bypass duct, an aerodynamic cowl, or an airfoil component. In one embodiment, an article may be a turbine blade component or may be a turbine blade. In one embodiment, an article may be a wind rotor blade, tower, spar cap, or nacelle for wind turbines. In one embodiment, an article may be an airframe component. Examples of aerospace components may include without limitation one or more of fuselage skin, wing, fairing, doors, access panel, aerodynamic control surface, or stiffener. In one embodiment an article may be an automotive component. Examples of automotive components may include without limitation one or more of body panel, fender, spoiler, truck bad, protective plate, hood, longitudinal rail, pillar, or door. Examples of industrial components may include without limitation one or more of risers platforms, impact protection structures for oil and gas; bridges, pipes, pressure vessels, power poles, coils, containers, tanks, liners, electrolytic cell covers, containment vessels, articles for application in corrosive environments (e.g., chlor-alkali, caustic, acidic, brine, etc), reinforcement structures for concrete architectures and roads, or radiators. Examples of electrical components may include without limitation one or more wound articles, such as coils or electric motors, or insulating devices. In one embodiment, an article may be an eddy-current shielding component of a magnetic resonance imaging system or shielding component for any electromagnetic radiation. In one embodiment, an article may be a military component including without limitation ballistics resistant armor for personnel or vehicles, or ballistics resistant structures for protecting personnel or equipment. In one embodiment, an article may be a sporting goods component including without limitation an arrow shaft, a tennis racket frame, a hockey stick, compound bow limbs, or a golf club shaft. Examples of oil and gas components include casing centralizers and drill string centralizers.

Resin compositions according to the invention may further comprise a sizing composition, or be used to provide improved adhesion to substrate materials that are sized with certain commercial silanes commonly used in the industry. As is known in the art, glass fibers are typically treated with a chemical solution (e.g., a sizing composition) soon after their formation to reinforce the glass fibers and protect the strands' mechanical integrity during processing and composite manufacture. Sizing treatments compatible with olefin metathesis catalysts and polydicyclopentadiene composites have been described in U.S. Pat. Nos. 6,890,650 and 6,436,476, the disclosures of both of which are incorporated herein by reference. However, these disclosures are based on the use of specialty silane treatments that are not commonly used in industrial glass manufacture. By comparison, the current invention may provide improved mechanical properties for polymer-glass composites that are sized with silanes commonly used in the industry.

Glass sizing formulations typically comprise at least one film former (typically a film forming polymer), at least one silane, and at least one lubricant. Any components of a sizing formulation that do not interfere with or substantially decrease the effectiveness of the metathesis catalyst or olefin polymerization reaction are considered to be compatible with the current invention and may generally be used herein.

Film formers that are compatible with ROMP catalysts include epoxies, polyesters, polyurethanes, polyolefins, and/or polyvinyl acetates. Other common film formers that do not adversely affect the performance of the olefin metathesis catalyst may also be used. Film formers are typically used as nonionic, aqueous emulsions. More than one film former may be used in a given sizing formulation, to achieve a desired balance of glass processability and composite mechanical properties.

More particularly, the film former may comprise a low molecular weight epoxy emulsion, defined as an epoxy monomer or oligomer with an average molecular weight per epoxide group (EEW) of less than 500, and/or a high molecular weight epoxy emulsion, defined as an epoxy monomer or oligomer with an average molecular weight per epoxide group (EEW) of greater than 500. Examples of suitable low molecular weight products include aqueous epoxy emulsions produced by Franklin International, including Franklin K8-0203 (EEW 190) and Franklin E-102 (EEW 225-275). Other examples of low molecular weight epoxy emulsions are available from Hexion, including EPI-REZ™ 3510-W-60 (EEW 185-215), and EPI-REZ™ 3515-W-60 (EEW 225-275). Further examples of low molecular weight epoxy emulsions are available from COIM, including Filco 309 (EEW 270) and Filco 306 (EEW 330). Further examples of low molecular weight epoxy emulsions are available from DSM, including Neoxil® 965 (EEW 220-280) and Neoxil® 4555 (EEW 220-260). Examples of suitable high molecular weight epoxy emulsion products include epoxy emulsions produced by Hexion, including EPI-REZ™ 3522-W-60 (EEW 615-715).

Aqueous emulsions of modified epoxies, polyesters, and polyurethanes may also be used in the film former. Examples of suitable modified epoxy products include emulsions produced by DSM, including Neoxil® 2626 (a plasticized epoxy with an EEW of 500-620), Neoxil® 962/D (an epoxy-ester with an EEW of 470-550), Neoxil® 3613 (an epoxy-ester with an EEW of 500-800), Neoxil® 5716 (an epoxy-novolac with an EEW of 210-290), Neoxil® 0035 (a plasticized epoxy-ester with an EEW of 2500), and Neoxil® 729 (a lubricated epoxy with an EEW of 200-800). Further examples of modified epoxy emulsions are available from COIM, including Filco 339 (an unsaturated polyester-epoxy with an EEW of 2000) and Filco 362 (an epoxy-ester with an EEW of 530). Examples of suitable polyester products include emulsions produced by DSM, including Neoxil® 954/D, Neoxil® 2635, and Neoxil® 4759 (unsaturated bisphenolic polyesters). Additional suitable products from DSM include Neoxil® 9166 and Neoxil® 968/60 (adipate polyesters). Further examples of suitable products include emulsions produced by COIM, including Filco 354/N (unsaturated bisphenolic polyester), Filco 350 (unsaturated polyester), and Filco 368 (saturated polyester). Examples of suitable polyurethane products include emulsions produced by Bayer Material Science, including Baybond® 330 and Baybond® 401.

The film former may also comprise polyolefins or polyolefin-acrylic copolymers, polyvinylacetates, modified polyvinylacetates, or polyolefin-acetate copolymers. Suitable polyolefins include, but are not limited to, polyethylenes, polypropylenes, polybutylenes, and copolymers thereof, and the polyolefins may be oxidized, maleated, or otherwise treated for effective film former use. Examples of suitable products include emulsions produced by Michelman, including Michem® Emulsion 91735, Michem® Emulsion 35160, Michem® Emulsion 42540, Michem® Emulsion 69230, Michem® Emulsion 34040M1, Michem® Prime 4983R, and Michem® Prime 4982SC. Examples of suitable products include emulsions produced by HB Fuller, including PD 708H, PD 707, and PD 0166. Additional suitable products include emulsions produced by Franklin International, including Duracet® 637. Additional suitable products include emulsions produced by Celanese, including Vinamul® 8823 (plasticized polyvinylacetate), Dur-O-Set® E-200 (ethylene-vinyl acetate copolymer), Dur-O-Set® TX840 (ethylenevinyl acetate copolymer), and Resyn® 1971 (epoxy-modified polyvinylacetate).

While not limited thereto, preferred film formers include low- and high-molecular weight epoxies, saturated and unsaturated polyesters, and polyolefins, such as Franklin K80-203, Franklin E-102, Hexion 3510-W-60, Hexion 3515-W-60, and Michelman 35160.

Nonionic lubricants may also be added to the sizing composition. Suitable nonionic lubricants that are compatible with ROMP compositions include esters of polyethylene glycols and block copolymers of ethylene oxide and propylene oxide. More than one nonionic lubricant may be used in a given sizing formulation if desired, e.g., to achieve a desired balance of glass processability and composite mechanical properties.

Suitable lubricants may contain polyethylene glycol (PEG) units with an average molecular weight between 200 and 2000, preferably between 200-600. These PEG units can be esterified with one or more fatty acids, including oleate, tallate, laurate, stearate, and others. Particularly preferred lubricants include PEG 400 dilaurate, PEG 600 dilaurate, PEG 400 distearate, PEG 600 distearate, PEG 400 dioleate, and PEG 600 dioleate. Examples of suitable products include compounds produced by BASF, including MAPEG® 400 DO, MAPEG® 400 DOT, MAPEG® 600 DO, MAPEG® 600 DOT, and MAPEG® 600 DS. Additional suitable products include compounds produced by Zschimmer & Schwarz, including Mulsifan 200 DO, Mulsifan 400 DO, Mulsifan 600 DO, Mulsifan 200 DL, Mulsifan 400 DL, Mulsifan 600 DL, Mulsifan 200 DS, Mulsifan 400 DS, and Mulsifan 600 DS. Additional suitable products include compounds produced by Cognis, including Agnique® PEG 300 DO, Agnique® PEG 400 DO, and Agnique® PEG 600 DO.

Suitable nonionic lubricants also include block copolymers of ethylene oxide and propylene oxide. Examples of suitable products include compounds produced by BASF, including Pluronic® L62, Pluronic® L101, Pluronic® P103, and Pluronic® P105.

Cationic lubricants may also be added to the sizing composition. Cationic lubricants that are compatible with ROMP include modified polyethyleneimines, such as Emery 6760L produced by Pulcra Chemicals.

Silane coupling agent may optionally be added to the sizing composition, non-limiting examples including, methacrylate, acrylate, amino, or epoxy functionalized silanes along with alkyl, alkenyl, and norbornenyl silanes.

Optionally, the sizing composition may contain one or more additives for modifying the pH of the sizing resin. One preferred pH modifier is acetic acid.

The sizing composition may optionally contain other additives useful in glass sizing compositions. Such additives may include emulsifiers, defoamers, cosolvents, biocides, antioxidants, and additives designed to improve the effectiveness of the sizing composition. The sizing composition can be prepared by any method and applied to substrate materials for use herein, such as glass fibers or fabric, by any technique or method.

In a preferred embodiment, the metathesis reactions disclosed herein are carried out under a dry, inert atmosphere. Such an atmosphere may be created using any inert gas, including such gases as nitrogen and argon. The use of an inert atmosphere is optimal in terms of promoting catalyst activity, and reactions performed under an inert atmosphere typically are performed with relatively low catalyst loading. The reactions disclosed herein may also be carried out in an oxygen-containing and/or a water-containing atmosphere, and in one embodiment, the reactions are carried out under ambient conditions. The presence of oxygen or water in the reaction may, however, necessitate the use of higher catalyst loadings as compared with reactions performed under an inert atmosphere. Where the vapor pressure of the reactants allows, the reactions disclosed herein may also be carried out under reduced pressure.

The reactions disclosed herein may be carried out in a solvent, and any solvent that is inert towards cross-metathesis may be employed. Generally, solvents that may be used in the metathesis reactions include organic, protic, or aqueous solvents, such as aromatic hydrocarbons, chlorinated hydrocarbons, ethers, aliphatic hydrocarbons, alcohols, water, or mixtures thereof. Example solvents include benzene, toluene, p-xylene, methylene chloride, 1,2-dichloroethane, dichlorobenzene, chlorobenzene, tetrahydrofuran, diethylether, pentane, methanol, ethanol, water, or mixtures thereof. In a preferred embodiment, the reactions disclosed herein are carried out neat, i.e., without the use of a solvent.

It will be appreciated that the temperature at which a metathesis reaction according to methods disclosed herein is conducted can be adjusted as needed, and may be at least about −78° C., −40° C., −10° C., 0° C., 10° C., 20° C., 25° C., 35° C., 50° C., 70° C., 100° C., or 150° C., or the temperature may be in a range that has any of these values as the upper or lower bounds. In a preferred embodiment, the reactions are carried out at a temperature of at least about 35° C., and in another preferred embodiment, the reactions are carried out at a temperature of at least about 50° C.

It is to be understood that while the invention has been described in conjunction with specific embodiments thereof, the description above as well as the examples that follow are intended to illustrate and not limit the scope of the invention. Other aspects, advantages, and modifications within the scope of the invention will be apparent to those skilled in the art to which the invention pertains.

EXPERIMENTAL

In the following examples, efforts have been made to ensure accuracy with respect to numbers used (e.g., amounts, temperature, etc.) but some experimental error and deviation should be accounted for. Unless indicated otherwise, temperature is in degrees C., pressure is at or near atmospheric, viscosity is in centipoise (cP).

The following examples are to be considered as not being limiting of the invention as described herein, and are instead provided as representative examples of the olefin metathesis catalyst compositions comprising at least two metal carbene olefin metathesis catalysts of the invention and the methods for their use.

Examples

Materials and Methods

All glassware was oven dried and reactions were performed under ambient conditions unless otherwise noted. All solvents and reagents were purchased from commercial suppliers and used as received unless otherwise noted.

Ultrene® 99 dicyclopentadiene (DCPD) was obtained from Cymetech Corporation. A modified DCPD base resin containing 20-25% tricyclopentadiene (and small amounts of higher cyclopentadiene homologs) was prepared by heat treatment of Ultrene® 99 DCPD generally as described in U.S. Pat. No. 4,899,005.

Liquid MDI (50/50 mixture of 4,4'-MDI and 2,4'-MDI) was used as received from Bayer Material Science (Mondur® MLQ) and was used where indicated. Ethanox® 4702 antioxidant (4,4'-methylenebis(2,6-di-tertiary-butylphenol), Albemarle Corporation, was used where indicated. Crystal Plus 70FG mineral oil (STE Oil Company, Inc.), containing 2 phr Cab-o-sil® TS610 fumed silica (Cabot Corporation), was used to prepare the catalyst suspensions. Triphenylphosphine (TPP) was used as received from Arkema. A hydroperoxide gel modifier, cumene hydroperoxide (CHP) was used as received from Sigma Aldrich (88% purity, unless otherwise specified) or Syrgis Performance Initiators (Norox® CHP, 85%). CHP was added to resin formulations as a 1,000 ppm concentration stock solution in DCPD.

Metal carbene olefin metathesis catalysts were prepared by standard methods and include: [1,3-bis-(2,4,6-trimethylphenyl)-2-imidazolidinylidene]dichloro(o-isopropoxyphenylmethylene)ruthenium(II) (C627); [1,3-bis-(2,4,6-trimethylphenyl)-2-imidazolidinylidene]dichloro (benzylidene) (triphenylphosphine) ruthenium(II) (C831); 1,3-bis-(2,4,6-trimethylphenyl)-2-imidazolidinylidene] dichloro(benzylidene) (tricyclohexylphosphine)ruthenium(II) (C848); [1,3-bis-(2,4,6-trimethylphenyl)-2-imidazolidinylidene]dichloro(benzylidene)(tri-n-butylphosphine)ruthenium(II) (C771); [1,3-bis-(2,4,6-trimethylphenyl)-2-imidazolidinylidene]dichloro(3-methyl-2-butenylidene)(methyldiphenylphosphine)ruthenium(II) (C747); [1,3-bis-(2,4,6-trimethylphenyl)-2-imidazolidinylidene]dichloro(3-methyl-2-butenylidene) (tricyclohexylphosphine) ruthenium(II) (C827); [1,3-bis-(2,4,6-trimethylphenyl)-2-imidazolidinylidene]dichloro(3-methyl-2-butenylidene)(diethylphenylphosphine)ruthenium(II) (C713); [1,3-bis-(2,4,6-trimethylphenyl)-2-imidazolidinylidene]dichloro (phenylindenylidene) (methyldiphenylphosphine) ruthenium(II) (C869); [1,3-bis-(2,4,6-trimethylphenyl)-2-imidazolidinylidene]dichloro (phenylindenylidene)(diethylphenylphosphine)ruthenium(II) (C835); and [1,3-bis-(2,4,6-trimethylphenyl)-2-imidazolidinylidene]dichloro (phenylindenylidene)(tri-n-butylphosphine)ruthenium(II) (C871).

Resin Composition (A):

A resin composition was prepared by dissolving antioxidant Ethanox® 4702 (2 phr) in the modified DCPD base resin containing 20-25% tricyclopentadiene. The resin composition had an initial viscosity of 14.6-15.6 centipoise (cP) at 30° C.+/−0.5° C. as measured using a Brookfield Viscometer (Model DV-II+Pro), spindle (Model Code S62) at a speed of 150 RPM.

Resin Composition (B):

A low viscosity (10-15 centipoise at 25° C.) resin composition (8,368 grams) was prepared by mixing the modified DCPD base resin (8,000 grams), 2 phr Ethanox® 4702 (160 grams), 2 phr Mondur MLQ (160 grams), and 0.6 phr triphenylphosphine (48 grams).

Resin Composition (C):

A stock resin composition (948.9 grams) was prepared by mixing the modified DCPD base resin (926.2 grams), 2 phr Ethanox® 4702 (18.5 grams), 0.25 phr Cab-o-sil TS610 (2.3 grams), and 20 ppm cumene hydroperoxide (1.9 grams of 1000 ppm stock solution in DCPD).

Catalyst Suspensions:

Various olefin metathesis catalyst compositions were prepared as mineral oil suspensions comprising one, two, or three ruthenium carbene olefin metathesis catalysts as shown below in Table 2, Table 3, and Table 4. Crystal Plus 70FG mineral oil, containing 2 phr Cab-o-sil TS610, was used to prepare the catalyst suspensions. Each catalyst suspension composition in Table 2, catalyst suspensions (1S)-(22S), was prepared so as to have a total monomer to catalyst ratio of 45,000:1 at 2 grams of catalyst suspension per 100 grams of DCPD monomer. Each catalyst suspension composition in Table 3, catalyst suspensions (23S-34S), was prepared so as to have a total monomer to catalyst ratio of 15,000:1 at 2 grams of catalyst suspension per 100 grams of DCPD monomer. Each catalyst suspension composition in Table 4, catalyst suspensions (35S-50S), was prepared so as to have a total monomer to catalyst ratio of 90,000:1 at 2 grams of catalyst suspension per 100 grams of DCPD monomer.

TABLE 2

| Catalyst Suspension | Catalyst Type | Individual Monomer:Catalyst Ratio | Total Monomer:Catalyst Ratio |
|---|---|---|---|
| Catalyst Suspension (1S) | C627 | 45,000:1 | 45,000:1 |
| Catalyst Suspension (2S) | C831 | 45,000:1 | 45,000:1 |
| Catalyst Suspension (3S) | C848 | 45,000:1 | 45,000:1 |
| Catalyst Suspension (4S) | C747 | 45,000:1 | 45,000:1 |
| Catalyst Suspension (5S) | C827 | 45,000:1 | 45,000:1 |
| Catalyst Suspension (6S) | C713 | 45,000:1 | 45,000:1 |
| Catalyst Suspension (7S) | C869 | 45,000:1 | 45,000:1 |
| Catalyst Suspension (8S) | C771 | 45,000:1 | 45,000:1 |
| Catalyst Suspension (9S) | C835 | 45,000:1 | 45,000:1 |
| Catalyst Suspension (10S) | C871 | 45,000:1 | 45,000:1 |
| Catalyst Suspension (11S) | C771 | 90,000:1 | 45,000:1 |
|  | C747 | 90,000:1 |  |
| Catalyst Suspension (12S) | C771 | 45,685:1 | 45,000:1 |
|  | C747 | 3,000,000:1 |  |
| Catalyst Suspension (13S) | C771 | 90,000:1 | 45,000:1 |
|  | C713 | 90,000:1 |  |
| Catalyst Suspension (14S) | C771 | 45,685:1 | 45,000:1 |
|  | C713 | 3,000,000:1 |  |
| Catalyst Suspension (15S) | C835 | 90,000:1 | 45,000:1 |
|  | C848 | 90,000:1 |  |
| Catalyst Suspension (16S) | C835 | 47,120:1 | 45,000:1 |
|  | C848 | 1,000,000:1 |  |
| Catalyst Suspension (17S) | C835 | 45,685:1 | 45,000:1 |
|  | C848 | 3,000,000 |  |
| Catalyst Suspension (18S) | C871 | 46,036:1 | 45,000:1 |
|  | C627 | 2,000,000 |  |
| Catalyst Suspension (19S) | C771 | 135,000:1 | 45,000:1 |
|  | C713 | 135,000:1 |  |
|  | C747 | 135,000:1 |  |
| Catalyst Suspension (20S) | C771 | 47,872:1 | 45,000:1 |
|  | C713 | 1,000,000:1 |  |
|  | C747 | 3,000,000:1 |  |
| Catalyst Suspension (21S) | C835 | 135,000:1 | 45,000:1 |
|  | C713 | 135,000:1 |  |
|  | C848 | 135,000:1 |  |
| Catalyst Suspension (22S) | C835 | 47,872:1 | 45,000:1 |
|  | C713 | 1,000,000:1 |  |
|  | C848 | 3,000,000:1 |  |

TABLE 3

| Catalyst Suspension | Catalyst Type | Individual Monomer:Catalyst Ratio | Total Monomer:Catalyst Ratio |
|---|---|---|---|
| Catalyst Suspension (23S) | C747 | 15,000:1 | 15,000:1 |
| Catalyst Suspension (24S) | C848 | 15,000:1 | 15,000:1 |
| Catalyst Suspension (25S) | C827 | 15,000:1 | 15,000:1 |
| Catalyst Suspension (26S) | C713 | 15,000:1 | 15,000:1 |
| Catalyst Suspension (27S) | C771 | 15,000:1 | 15,000:1 |
| Catalyst Suspension (28S) | C835 | 15,000:1 | 15,000:1 |
| Catalyst Suspension (29S) | C871 | 15,000:1 | 15,000:1 |
| Catalyst Suspension (30S) | C835 | 30,000:1 | 15,000:1 |
|  | C747 | 30,000:1 |  |
| Catalyst Suspension (31S) | C835 | 30,000:1 | 15,000:1 |
|  | C713 | 30,000:1 |  |

TABLE 3-continued

| Catalyst Suspension | Catalyst Type | Individual Monomer:Catalyst Ratio | Total Monomer:Catalyst Ratio |
|---|---|---|---|
| Catalyst Suspension (32S) | C871 | 15,306:1 | 15,000:1 |
|  | C848 | 750,000:1 |  |
| Catalyst Suspension (33S) | C835 | 45,000:1 | 15,000:1 |
|  | C713 | 45,000:1 |  |
|  | C747 | 45,000:1 |  |
| Catalyst Suspension (34S) | C835 | 15,504:1 | 15,000:1 |
|  | C713 | 500,000:1 |  |
|  | C747 | 6,000,000:1 |  |

TABLE 4

| Catalyst Suspension | Catalyst Type | Individual Monomer:Catalyst Ratio | Total Monomer:Catalyst Ratio |
|---|---|---|---|
| Catalyst Suspension (35S) | C747 | 90,000:1 | 90,000:1 |
| Catalyst Suspension (36S) | C848 | 90,000:1 | 90,000:1 |
| Catalyst Suspension (37S) | C827 | 90,000:1 | 90,000:1 |
| Catalyst Suspension (38S) | C713 | 90,000:1 | 90,000:1 |
| Catalyst Suspension (39S) | C771 | 90,000:1 | 90,000:1 |
| Catalyst Suspension (40S) | C835 | 90,000:1 | 90,000:1 |
| Catalyst Suspension (41S) | C871 | 90,000:1 | 90,000:1 |
| Catalyst Suspension (42S) | C771 | 180,000:1 | 90,000:1 |
|  | C747 | 180,000:1 |  |
| Catalyst Suspension (43S) | C771 | 180,000:1 | 90,000:1 |
|  | C713 | 180,000:1 |  |
| Catalyst Suspension (44S) | C835 | 180,000:1 | 90,000:1 |
|  | C827 | 180,000:1 |  |
| Catalyst Suspension (45S) | C835 | 98,901:1 | 90,000:1 |
|  | C747 | 1,000,000:1 |  |
| Catalyst Suspension (46S) | C713 | 91,650:1 | 90,000:1 |
|  | C747 | 5,000,000:1 |  |
| Catalyst Suspension (47S) | C771 | 98,901:1 | 90,000:1 |
|  | C848 | 1,000,000:1 |  |
| Catalyst Suspension (48S) | C713 | 92,784:1 | 90,000:1 |
|  | C747 | 3,000,000:1 |  |
| Catalyst Suspension (49S) | C771 | 270,000:1 | 90,000:1 |
|  | C827 | 270,000:1 |  |
|  | C747 | 270,000:1 |  |
| Catalyst Suspension (50S) | C771 | 104,956:1 | 90,000:1 |
|  | C827 | 750,000:1 |  |
|  | C747 | 4,000,000:1 |  |

Examples 1-24

Viscosity Measurements

For each Example 1-24, Resin composition (A) (204.0 grams) was added to a 250 mL plastic bottle. The resin composition was allowed to equilibrate to 30° C.+/−0.5° C. in a heating bath. The appropriate catalyst suspension (1S-10S; 23S-29S; 35S-41S) (4.0 grams) was combined with the resin composition to form a ROMP composition. Viscosity measurements of the ROMP compositions were obtained at 30° C. using a Brookfield Viscometer (Model DV-II+Pro), spindle (Model Code S62) at a speed of 150 RPM. Time to viscosity of 30 cP is defined as the time required for the ROMP composition to reach a viscosity of 30 cP following catalyzation of the resin composition. The time to viscosity of 30 cP is shown in Table 5.

Gel Hardness Measurements:

For each Example 1-23, Resin Composition (A) (20.4 grams) was allowed to equilibrate to 30° C.+/−0.5° C. in a standard laboratory oven. The appropriate catalyst suspension (1S-10S; 23S-29S; 35S-40S) (0.4 grams) was combined with the resin composition to form a ROMP composition. The ROMP composition was added to an aluminum pan (6 cm diameter×1.5 cm depth). Immediately following catalyzation the following oven temperature profile was started ((a) Initial Temperature=30° C.; (b) Hold at 30° C. for 3 hours; (c) After 3 hours ramp to 120° C. at 0.5° C./minute; (d) Hold at 120° C. for 2 hours; and (e) Cool to ambient temperature). The hardness of the polymer gel was periodically measured using a durometer (Model HP-10F-M) from Albuquerque Industrial Inc. Time to gel hardness of 10-29 durometer is defined as the time required for the ROMP composition to reach a gel hardness of 10-29 durometer following catalyzation of the resin composition. Time to gel hardness of 30-39 durometer is defined as the time required for the ROMP composition to reach a gel hardness of 30-39 durometer following catalyzation of the resin composition. Time to gel hardness of 40-70 durometer is defined as the time required for the ROMP composition to reach a gel hardness of 40-70 durometer following catalyzation of the resin composition. Time to gel hardness of 10-29 durometer, time to gel hardness of 30-39 durometer, time to gel hardness of 40-70 durometer is shown in Table 5.

Time to Peak Exotherm Temperature Measurements:

For each Example 1-23, time to peak exotherm temperature of the ROMP compositions was measured from the samples prepared to measure the gel hardness measurements as described above. The peak exotherm temperature was measured using an Omega Data Logger Thermometer (Model HH309A) affixed with a Type K thermocouple, where the thermocouple was attached to the bottom of the aluminum pan. Time to peak exotherm temperature is defined as the time required for the ROMP composition to reach a peak exotherm temperature following catalyzation of the resin composition. Time to peak exotherm temperature is shown in Table 5.

TABLE 5

| Example | Catalyst Suspension (monomer:catalyst ratio) | Viscosity Time to 30 cP (min) | Gel Hardness Time to 10-29 Durometer (min) | Gel Hardness Time to 30-39 Durometer (min) | Gel Hardness Time to 40-70 Durometer (min) | Peak Exotherm Time to Peak Exotherm Temp. (min) |
|---|---|---|---|---|---|---|
| 1 | Catalyst Suspension (1S) C627 (45,000:1) | <1.0 | Not measured | Not measured | Not measured | <1.0 |
| 2 | Catalyst Suspension (2S) C831 (45,000:1) | <1.0 | Not measured | Not measured | Not measured | <1.0 |
| 3 | Catalyst Suspension (3S) C848 (45,000:1) | <1.0 | 15 durometer @ 5.0 min | Not measured | Not measured | 5.8 |
| 4 | Catalyst Suspension (4S) C747 (45,000:1) | <1.0 | 10 durometer @ 5.5 min 23 durometer @ 6.5 min | Not measured | Not measured | 7.3 |
| 5 | Catalyst Suspension (5S) C827 (45,000:1) | 1.6 | 23 durometer @ 14.5 min | 31 durometer @ 15.5 min | 42 durometer @ 18 min 50 durometer @ 21.5 min | 23.3 |
| 6 | Catalyst Suspension (6S) C713 (45,000:1) | 2.8 | 11 durometer @ 34 min | 30 durometer @ 56.0 min 37 durometer @ 58.0 min | Not measured | 60.5 |
| 7 | Catalyst Suspension (7S) C869 (45,000:1) | 7.0 | 21 durometer @ 70.0 min | 31 durometer @ 78.0 min | 44 durometer @ 90.0 min 52 durometer @ 100 min | 101.2 |
| 8 | Catalyst Suspension (8S) C771 (45,000:1) | 13.1 | 10 durometer @ 160.0 min | 31 durometer @ 210.0 min 34 durometer @ 220.0 min | 48 durometer @ 230.0 min | 235.8 |
| 9 | Catalyst Suspension (9S) C835 (45,000:1) | 56.9 | 15 durometer @ 250.0 min | 30 durometer @ 255.0 min | Not measured | 258.1 |
| 10 | Catalyst Suspension (10S) C871 (45,000:1) | 262.1 | 16 durometer @ 310.0 min | 33 durometer @ 321 min | Not measured | 325.8 |
| 11 | Catalyst Suspension (23S) C747 (15,000:1) | <1.0 | 34 durometer @ 1.8 min | Not measured | Not measured | 2.4 |
| 12 | Catalyst Suspension (24S) C848 (15,000:1) | <1.0 | Gel too soft to measure at 1.0 min | Not measured | Not measured | 3.2 |
| 13 | Catalyst Suspension (25S) C827 (15,000:1) | <1.0 | 20 durometer @ 6.5 min | Not measured | Not measured | 7.5 |
| 14 | Catalyst Suspension (26S) C713 (15,000:1) | 1.7 | 14 durometer @ 19.0 min | 30 durometer @ 29.0 min | 45 durometer @ 34.0 min | 36.6 |
| 15 | Catalyst Suspension (27S) C771 (15,000:1) | 7.5 | 15 durometer @ 80.0 min | 31 durometer @ 110.0 min | 42 durometer @ 200.0 min | 226.7 |
| 16 | Catalyst Suspension (28S) C835 (15,000:1) | 32.3 | 20 durometer @ 220.0 min | 32 durometer @ 256.0 min | Not measured | 240.0 |
| 17 | Catalyst Suspension (29S) C871 (15,000:1) | 102.0 | 17 durometer @ 270.0 min 20 durometer @ 280.0 min | Not measured | Not measured | 289.7 |
| 18 | Catalyst Suspension (35S) C747 (90,000:1) | <1.0 | 15 durometer @ 7.0 min | 30 durometer @ 10.0 min | Not measured | 11.8 |
| 19 | Catalyst Suspension (36S) C848 (90,000:1) | 1.4 | Not measured | 30 durometer @ 11.0 min | Not measured | 11.9 |
| 20 | Catalyst Suspension (37S) C827 (90,000:1) | 4.9 | 22 durometer @ 35.0 min | 30 durometer @ 40.0 min | 43 durometer @ 55.0 min | 55.0 |
| 21 | Catalyst Suspension (38S) C713 (90,000:1) | 5.8 | 15 durometer @ 55.0 min | 30 durometer @ 110.0 min | 43 durometer @ 210.0 min | 230.1 |

TABLE 5-continued

| Example | Catalyst Suspension (monomer:catalyst ratio) | Viscosity Time to 30 cP (min) | Gel Hardness Time to 10-29 Durometer (min) | Gel Hardness Time to 30-39 Durometer (min) | Gel Hardness Time to 40-70 Durometer (min) | Peak Exotherm Time to Peak Exotherm Temp. (min) |
|---|---|---|---|---|---|---|
| 22 | Catalyst Suspension (39S) C771 (90,000:1) | 16.6 | 15 durometer @ 230.0 min | 30 durometer @ 240.0 min | Not measured | 240.1 |
| 23 | Catalyst Suspension (40S) C835 (90,000:1) | 124.8 | Not measured | Not measured | 40 durometer @ 280.0 min | 281.1 |
| 24 | Catalyst Suspension (41S) C871 (90,000:1) | 1058.8 | Not measured | Not measured | Not measured | Not measured |

Examples 25-42

Viscosity Measurements

For each Example 25-42, Resin composition (A) (204.0 grams) was added to a 250 mL plastic bottle. The resin composition was allowed to equilibrate to 30° C.+/−0.5° C. in a heating bath. The appropriate catalyst suspension (11S-18S; 30S-32S; 42S-48S) (4.0 grams) was combined with the resin composition to form a ROMP composition. Viscosity measurements of the ROMP compositions were obtained at 30° C. using a Brookfield Viscometer (Model DV-II+Pro), spindle (Model Code S62) at a speed of 150 RPM. Time to viscosity of 30 cP is defined as the time required for the ROMP composition to reach a viscosity of 30 cP following catalyzation of the resin composition. The time to viscosity of 30 cP is shown in Table 6.

Gel Hardness Measurements:

For each Example 25-42, Resin Composition (A) (20.4 grams) was allowed to equilibrate to 30° C.+/−0.5° C. in a standard laboratory oven. The appropriate catalyst suspension (11S-18S; 30S-32S; 42S-48S) (0.4 grams) was combined with the resin composition to form a ROMP composition. The ROMP composition was added to an aluminum pan (6 cm diameter×1.5 cm depth). Immediately following catalyzation the following oven temperature profile was started ((a) Initial Temperature=30° C.; (b) Hold at 30° C. for 3 hours; (c) After 3 hours ramp to 120° C. at 0.5° C./minute; (d) Hold at 120° C. for 2 hours; and (e) Cool to ambient temperature). The hardness of the polymer gel was periodically measured using a durometer (Model HP-10F-M) from Albuquerque Industrial Inc. Time to gel hardness of 10-29 durometer is defined as the time required for the ROMP composition to reach a gel hardness of 10-29 durometer following catalyzation of the resin composition. Time to gel hardness of 30-39 durometer is defined as the time required for the ROMP composition to reach a gel hardness of 30-39 durometer following catalyzation of the resin composition. Time to gel hardness of 40-70 durometer is defined as the time required for the ROMP composition to reach a gel hardness of 40-70 durometer following catalyzation of the resin composition. Time to gel hardness of 10-29 durometer, time to gel hardness of 30-39 durometer, time to gel hardness of 40-70 durometer is shown in Table 6.

Time to Peak Exotherm Temperature Measurements:

For each Example 25-42, time to peak exotherm temperature of the ROMP compositions was measured from the samples prepared to measure the gel hardness measurements as described above. The peak exotherm temperature was measured using a Omega Data Logger Thermometer (Model HH309A) affixed with a Type K thermocouple, where the thermocouple was attached to the bottom of the aluminum pan. Time to peak exotherm temperature is defined as the time required for the ROMP composition to reach a peak exotherm temperature following catalyzation of the resin composition. Time to peak exotherm temperature is shown in Table 6.

TABLE 6

| Example | Catalyst Suspension (monomer:catalyst ratio) | Viscosity Time to 30 cP (min) | Gel Hardness Time to 10-29 Durometer (min) | Gel Hardness Time to 30-39 Durometer (min) | Gel Hardness Time to 40-70 Durometer (min) | Peak Exotherm Time to Peak Exotherm Temp. (min) |
|---|---|---|---|---|---|---|
| 25 | Catalyst Suspension (11S) C771 (90,000:1) C747 (90,000:1) | <1.0 | Gel too soft to measure at 6 min. | Not measured | Not measured | 7.5 |
| 26 | Catalyst Suspension (12S) C771 (45,685:1) C747 (3,000,000:1) | 7.6 | 12 durometer @ 90.0 min | 30 durometer @ 110.0 min 38 durometer @ 130.0 min | 40 durometer @ 135.0 min 55 durometer @ 190.0 min 57 durometer @ 235.0 min | 240.0 |
| 27 | Catalyst Suspension (13S) C771 (90,000:1) C713 (90,000:1) | 3.8 | 12 durometer @ 58.0 min | 32 durometer @ 86.0 min | 40 durometer @ 90.0 min 51 durometer @ 115.0 min 60 durometer @ 180.0 min | 231.3 |

TABLE 6-continued

| Example | Catalyst Suspension (monomer:catalyst ratio) | Viscosity Time to 30 cP (min) | Gel Hardness Time to 10-29 Durometer (min) | Gel Hardness Time to 30-39 Durometer (min) | Gel Hardness Time to 40-70 Durometer (min) | Peak Exotherm Time to Peak Exotherm Temp. (min) |
|---|---|---|---|---|---|---|
| 28 | Catalyst Suspension (14S) C771 (45,685:1) C713 (3,000,000:1) | 10.1 | 10 durometer @ 134.0 min 25 durometer @ 220.0 min | 30 durometer @ 225.0 min 39 durometer @ 230.0 min | Not measured | 235.2 |
| 29 | Catalyst Suspension (15S) C835 (90,000:1) C848 (90,000:1) | 1.3 | Gel too soft to measure at 6 min 25 durometer @ 8.0 min | Not measured | Not measured | 10.2 |
| 30 | Catalyst Suspension (16S) C835 (47,120:1) C848 (1,000,000:1) | 8.1 | 20 durometer @ 90.0 min | 30 durometer @ 97.0 min 38 durometer @ 140.0 min | 41 durometer @ 150.0 min 50 durometer @ 180.0 min 68 durometer @ 230.0 min | 242.6 |
| 31 | Catalyst Suspension (17S) C835 (45,685:1) C848 (3,000,000:1) | 16.6 | 12 durometer @ 210.0 minutes | 30 durometer @ 230.0 minutes | Not measured | 240.5 |
| 32 | Catalyst Suspension (18S) C871 @ 46,036:1 C627 @ 2,000,000:1 | <1.0 | 11 durometer @ 100.0 min | 30 durometer @ 230.0 min 32 durometer @ 270.0 min | Not measured | 319.4 |
| 33 | Catalyst Suspension (30S) C835 (30,000:1) C747 (30,000:1) | <1.0 | 19 durometer @ 3.0 min | Not measured | Not measured | 4.9 |
| 34 | Catalyst Suspension (31S) C835 (30,000:1) C713 (30,000:1) | 2.8 | 17 durometer @ 30.0 min | 30 durometer @ 55.0 min | 40 durometer @ 80 min | 220.0 |
| 35 | Catalyst Suspension (32S) C871 (15,306:1) C848 (750,000:1) | 8.7 | 20 durometer @ 50.0 min | 33 durometer @ 65.0 min | 40 durometer @ 90.0 min 52 durometer @ 112.0 min | 234.0 |
| 36 | Catalyst Suspension (42S) C771 (180,000:1) C747 (180,000:1) | <1.0 | Not measured | 30 durometer @ 15.0 min | 42 durometer @ 17.0 min | 20.4 |
| 37 | Catalyst Suspension (43S) C771 (180,000:1) C713 (180,000:1) | 4.1 | Not measured | 32 durometer @ 140.0 min | 40 durometer @ 200.0 min | 238.3 |
| 38 | Catalyst Suspension (44S) C835 (180,000:1) C827 (180,000:1) | 9.2 | 28 durometer @ 80.0 min | 30 durometer @ 85.0 min | 40 durometer @ 130.0 min 48 durometer @ 170.0 min 54 durometer @ 205.0 min | 228.8 |
| 39 | Catalyst Suspension (45S) C835 (98,901:1) C747 (1,000,000:1) | 14.6 | 19 durometer @ 170.0 min | 33 durometer @ 205.0 min | Not measured | 253.2 |
| 40 | Catalyst Suspension (46S) C713 (91,650:1) C747 (5,000,000:1) | 5.5 | 21 durometer @ 60.0 min | 30 durometer @ 90.0 min 37 durometer @ 170.0 min | 45 durometer @ 205.0 min | 230.0 |
| 41 | Catalyst Suspension (47S) C771 (98,901:1) C848 (1,000,000:1) | 9.0 | 25 durometer @ 60.0 min | 31 durometer @ 80.0 min | 45 durometer @ 110.0 min | 239.4 |
| 42 | Catalyst Suspension (48S) C713 (92,784:1) C747 (3,000,000:1) | 7.7 | 20 durometer @ 90.0 min | 30 durometer @ 120.0 min | 40 durometer @ 200.0 min | 225.8 |

Examples 43-50

Viscosity Measurements

For each Example 43-50, Resin composition (A) (204.0 grams) was added to a 250 mL plastic bottle. The resin composition was allowed to equilibrate to 30° C.+/−0.5° C. in a heating bath. The appropriate catalyst suspension (19S-22S; 33S-34S; 49S-50S) (4.0 grams) was combined with the resin composition to form a ROMP composition. Viscosity measurements of the ROMP compositions were obtained at 30° C. using a Brookfield Viscometer (Model DV-II+Pro), spindle (Model Code S62) at a speed of 150 RPM. Time to viscosity of 30 cP is defined as the time required for the ROMP composition to reach a viscosity of 30 cP following catalyzation of the resin composition. The time to viscosity of 30 cP is shown in Table 7.

Gel Hardness Measurements:

For each Example 43-50, Resin Composition (A) (20.4 grams) was allowed to equilibrate to 30° C.+/−0.5° C. in a standard laboratory oven. The appropriate catalyst suspension (19S-22S; 33S-34S; 49S-50S) (0.4 grams) was combined with the resin composition to form a ROMP composition. The ROMP composition was added to an aluminum pan (6 cm diameter×1.5 cm depth). Immediately following catalyzation the following oven temperature profile was started ((a) Initial Temperature=30° C.; (b) Hold at 30° C. for 3 hours; (c) After 3 hours ramp to 120° C. at 0.5° C./minute; (d) Hold at 120° C. for 2 hours; and (e) Cool to ambient temperature). The hardness of the polymer gel was periodically measured using a durometer (Model HP-10F-M) from Albuquerque Industrial Inc. Time to gel hardness of reach a gel hardness of 40-70 durometer following catalyzation of the resin composition. Time to gel hardness of 10-29 durometer, time to gel hardness of 30-39 durometer, time to gel hardness of 40-70 durometer is shown in Table 7.

Time to Peak Exotherm Temperature Measurements:

For each Example 43-50, time to peak exotherm temperature of the ROMP compositions was measured from the samples prepared to measure the gel hardness measurements as described above. The peak exotherm temperature was measured using a Omega Data Logger Thermometer (Model HH309A) affixed with a Type K thermocouple, where the thermocouple was attached to the bottom of the aluminum pan. Time to peak exotherm temperature is defined as the time required for the ROMP composition to reach a peak exotherm temperature following catalyzation of the resin composition. Time to peak exotherm temperature is shown in Table 7.

TABLE 7

| Example | Catalyst Suspension (monomer:catalyst ratio) | Viscosity Time to 30 cP (min) | Gel Hardness Time to 10-29 Durometer (min) | Gel Hardness Time to 30-39 Durometer (min) | Gel Hardness Time to 40-70 Durometer (min) | Peak Exotherm Time to Peak Exotherm Temp. (min) |
|---|---|---|---|---|---|---|
| 43 | Catalyst Suspension (19S) C771 (135,000:1) C713 (135,000:1) C747 (135,000:1) | <1 | Gel too soft to measure at 6.0 min. | Not measured | Not measured | 10.2 |
| 44 | Catalyst Suspension (20S) C771 (47,872:1) C713 (1,000,000:1) C747 (3,000,000:1) | 5.3 | 11 durometer at 75.0 min | 30 durometer at 115.0 min 38 durometer @ 170.0 min | 43 durometer @ 180.0 min 50 durometer @ 220.0 min | 235.7 |
| 45 | Catalyst Suspension (21S) C835 @ 135,000:1 C713 @ 135,000:1 C848 @ 135,000:1 | 3.9 | 10 durometer @ 10.0 min 25 durometer @ 11.0 min | Not measured | Not measured | 11.2 |
| 46 | Catalyst Suspension (22S) C835 @ 47,872:1 C713 @ 1,000,000:1 C848 @ 3,000,000:1 | 37.0 | 10 durometer @ 130.0 min 29 durometer @ 180.0 min | 32 durometer @ 190.0 min 38 durometer @ 220.0 min | 48 durometer @ 230.0 min | 235.5 |
| 47 | Catalyst Suspension (33S) C835 @ 45,000:1 C713 @ 45,000:1 C747 @ 45,000:1 | <1.0 | 15 durometer @ 4.8 min | 32 durometer @ 5.5 min | Not measured | 6.8 |
| 48 | Catalyst Suspension (34S) C835 @ 15,504:1 C713 @ 500,000:1 C747 @ 6,000,000:1 | 12.4 | 15 durometer @ 160.0 min | 30 durometer @ 210.0 min | Not measured | 236.7 |
| 49 | Catalyst Suspension (49S) C771 @ 270,000:1 C827 @ 270,000:1 C747 @ 270,000:1 | 2.5 | 14 durometer @ 19.0 min | 30 durometer @ 27.0 min | 40 durometer @ 30.5 min | 33.7 |
| 50 | Catalyst Suspension (50S) C771 @ 104,956:1 C827 @ 750,000:1 C747 @ 4,000,000:1 | 15.4 | 19 durometer @ 90.0 min | 30 durometer @ 110.0 min | 40 durometer @ 180.0 min | 238.8 |

10-29 durometer is defined as the time required for the ROMP composition to reach a gel hardness of 10-29 durometer following catalyzation of the resin composition. Time to gel hardness of 30-39 durometer is defined as the time required for the ROMP composition to reach a gel hardness of 30-39 durometer following catalyzation of the resin composition. Time to gel hardness of 40-70 durometer is defined as the time required for the ROMP composition to Evaluation of Examples From a comparison of the data in Tables 5, 6, and 7 it is learned that olefin metathesis catalyst compositions comprising at least two metal carbene olefin metathesis catalysts enable greater control over the polymerization of cyclic olefins (e.g., dicyclopentadiene) than a single metal carbene olefin metathesis catalyst. For example, the data in Table 8 below is a compilation of some of the data presented in Tables 5, 6, and 7 wherein individual metal carbene olefin metathesis catalysts (e.g., C747, C713, and C771) were used to prepare olefin metathesis catalyst compositions comprising (i) two metal carbene olefin metathesis catalysts (e.g., C747/C771; C713/C771); and (ii) three metal carbene olefin metathesis catalysts (e.g., C747/C713/C771). The individual metal carbene olefin metathesis catalysts (e.g., C747, C713, and C771) each had a total monomer to catalyst ratio of 45,000:1. The olefin metathesis catalyst compositions comprising two metal carbene olefin metathesis catalysts (e.g., C747/C771; C713/C771) each had a total monomer to catalyst ratio of 45,000:1. The olefin metathesis catalyst compositions comprising three metal carbene olefin metathesis catalysts (e.g., C747/C713/C771) each had a total monomer to catalyst ratio of 45,000:1.

catalysts enables independent control over the time required for the ROMP composition to reach a hard polymer gel relative to the exotherm time.

From Table 8, examination of the time to reach a hard polymer gel and the time to reach the peak exotherm temperature for Example 26 (30 durometer @110.0 minutes; peak exotherm temperature @240.0 minutes) compared to the time to reach a hard polymer gel and the time to reach the peak exotherm temperature for Example 8 (31 durometer @210.0 minutes; peak exotherm temperature @235.8 minutes) further demonstrates that an olefin metathesis catalyst composition comprising two metal carbene olefin metathesis catalysts enables independent control over the time required for the ROMP composition to reach a hard polymer gel relative to the exotherm time.

TABLE 8

| Example | Catalyst Suspension (monomer:catalyst ratio) | Viscosity Time to 30 cP (min) | Gel Hardness Time to 10-29 Durometer (min) | Gel Hardness Time to 30-39 Durometer (min) | Gel Hardness Time to 40-70 Durometer (min) | Peak Exotherm Time to Peak Exotherm Temp. (min) |
|---|---|---|---|---|---|---|
| 4 | Catalyst Suspension (4S) C747 (45,000:1) | <1.0 | 10 durometer @ 5.5 min 23 durometer @ 6.5 min | Not measured | Not measured | 7.3 |
| 25 | Catalyst Suspension (11S) C771 (90,000:1) C747 (90,000:1) | <1.0 | Gel too soft to measure at 6.0 min. | Not measured | Not measured | 7.5 |
| 43 | Catalyst Suspension (19S) C771 (135,000:1) C713 (135,000:1) C747 (135,000:1) | <1.0 | Gel too soft to measure at 6.0 min. | Not measured | Not measured | 10.2 |
| 6 | Catalyst Suspension (6S) C713 (45,000:1) | 2.8 | 11 durometer @ 34 min | 30 durometer @ 56.0 min 37 durometer @ 58.0 min | Not measured | 60.5 |
| 27 | Catalyst Suspension (13S) C771 (90,000:1) C713 (90,000:1) | 3.8 | 12 durometer @ 58.0 min | 32 durometer @ 86.0 min | 40 durometer @ 90.0 min 51 durometer @ 115.0 min 60 durometer @ 180.0 min | 231.3 |
| 44 | Catalyst Suspension (20S) C771 (47,872:1) C713 (1,000,000:1) C747 (3,000,000:1) | 5.3 | 11 durometer at 75.0 min | 30 durometer at 115.0 min 38 durometer @ 170.0 min | 43 durometer @ 180.0 min 50 durometer @ 220.0 min | 235.7 |
| 26 | Catalyst Suspension (12S) C771 (45,685:1) C747 (3,000,000:1) | 7.6 | 12 durometer @ 90.0 min | 30 durometer @ 110.0 min 38 durometer @ 130.0 min | 40 durometer @ 135.0 min 55 durometer @ 190.0 min 57 durometer @ 235.0 min | 240.0 |
| 28 | Catalyst Suspension (14S) C771 (45,685:1) C713 (3,000,000:1) | 10.1 | 10 durometer @ 134.0 min 25 durometer @ 220.0 min | 30 durometer @ 225.0 min 39 durometer @ 230.0 min | Not measured | 235.2 |
| 8 | Catalyst Suspension (8S) C771 (45,000:1) | 13.1 | 10 durometer @ 160.0 min | 31 durometer @ 210.0 min 34 durometer @ 220.0 min | 48 durometer @ 230.0 min | 235.8 |

From Table 8, examination of the time to reach a hard polymer gel and the time to reach the peak exotherm temperature for Example 27 (32 durometer @86.0 minutes; peak exotherm temperature @231.3 minutes) compared to the time to reach a hard polymer gel and the time to reach the peak exotherm temperature for Example 8 (31 durometer @210.0 minutes; peak exotherm temperature @235.8 minutes) demonstrates that an olefin metathesis catalyst composition comprising two metal carbene olefin metathesis From Table 8, examination of the time to reach a hard polymer gel and the time to reach the peak exotherm temperature for Example 44 (30 durometer @115.0 minutes; peak exotherm temperature @235.7 minutes) compared to the time to reach a hard polymer gel and the time to reach the peak exotherm temperature for Example 8 (31 durometer @210.0 minutes; peak exotherm temperature @235.8 minutes) demonstrates that an olefin metathesis catalyst composition comprising two metal carbene olefin metathesis catalysts enables independent control over the time required for the ROMP composition to reach a hard polymer gel relative to the exotherm time.

For example, the data in Table 9 below is a compilation of some of the data presented in Tables 5, 6, and 7 wherein individual metal carbene olefin metathesis catalysts (e.g., C848, C713, and C835) were used to prepare olefin metathesis catalyst compositions comprising (i) two metal carbene olefin metathesis catalysts (e.g., C848/C835); and (ii) three metal carbene olefin metathesis catalysts (e.g., C848/C713/C835). The individual metal carbene olefin metathesis catalysts (e.g., C848, C713, and C835) each had a total monomer to catalyst ratio of 45,000:1. The olefin metathesis catalyst compositions comprising two metal carbene olefin metathesis catalysts (e.g., C848/C835) each had a total monomer to catalyst ratio of 45,000:1. The olefin metathesis catalyst compositions comprising three metal carbene olefin metathesis catalysts (e.g., C848/C713/C835) each had a total monomer to catalyst ratio of 45,000:1.

From Table 9, examination of the time to reach a hard polymer gel and the time to reach the peak exotherm temperature for Example 31 (30 durometer @230.0 minutes; peak exotherm temperature @240.5 minutes) compared to the time to reach a hard polymer gel and the time to reach the peak exotherm temperature for Example 9 (30 durometer @255.0 minutes; peak exotherm temperature @258.1 minutes) demonstrates that an olefin metathesis catalyst composition comprising two metal carbene olefin metathesis catalysts enables independent control over the time required for the ROMP composition to reach a hard polymer gel relative to the exotherm time.

From Table 9, examination of the time to reach a hard polymer gel and the time to reach the peak exotherm temperature for Example 46 (32 durometer @190.0 minutes; peak exotherm temperature @235.5 minutes) compared to the time to reach a hard polymer gel and the time to reach

TABLE 9

| Example | Catalyst Suspension (monomer:catalyst ratio) | Viscosity Time to 30 cP (min) | Gel Hardness Time to 10-29 Durometer (min) | Gel Hardness Time to 30-39 Durometer (min) | Gel Hardness Time to 40-70 Durometer (min) | Peak Exotherm Time to Peak Exotherm Temp. (min) |
|---|---|---|---|---|---|---|
| 3 | Catalyst Suspension (3S) C848 (45,000:1) | <1.0 | 15 durometer @ 5.0 min | Not measured | Not measured | 5.8 |
| 29 | Catalyst Suspension (15S) C835 (90,000:1) C848 (90,000:1) | 1.3 | Gel too soft to measure at 6.0 min 25 durometer @ 8.0 min | Not measured | Not measured | 10.2 |
| 6 | Catalyst Suspension (6S) C713 (45,000:1) | 2.8 | 11 durometer @ 34.0 min | 30 durometer @ 56.0 min 37 durometer @ 58.0 min | Not measured | 60.5 |
| 45 | Catalyst Suspension (21S) C835 @ 135,000:1 C713 @ 135,000:1 C848 @ 135,000:1 | 3.9 | 10 durometer @ 10.0 min 25 durometer @ 11.0 min | Not measured | Not measured | 11.2 |
| 30 | Catalyst Suspension (16S) C835 (47,120:1) C848 (1,000,000:1) | 8.1 | 20 durometer @ 90.0 min | 30 durometer @ 97.0 min 38 durometer @ 140.0 min | 41 durometer @ 150.0 min 50 durometer @ 180.0 min 68 durometer @ 230.0 min | 242.6 |
| 31 | Catalyst Suspension (17S) C835 (45,685:1) C848 (3,000,000:1) | 16.6 | 12 durometer @ 210.0 min | 30 durometer @ 230.0 min | Not measured | 240.5 |
| 46 | Catalyst Suspension (22S) C835 @ 47,872:1 C713 @ 1,000,000:1 C848 @ 3,000,000:1 | 37.0 | 10 durometer @ 130.0 min 29 durometer @ 180.0 min | 32 durometer @ 190.0 min 38 durometer @ 220.0 min | 48 durometer @ 230.0 min | 235.5 |
| 9 | Catalyst Suspension (9S) C835 (45,000:1) | 56.9 | 15 durometer @ 250.0 min | 30 durometer @ 255.0 min | Not measured | 258.1 |

From Table 9, examination of the time to reach a hard polymer gel and the time to reach the peak exotherm temperature for Example 30 (30 durometer @97 minutes; peak exotherm temperature @242.6 minutes) compared to the time to reach a hard polymer gel and the time to reach the peak exotherm temperature for Example 9 (30 durometer @255.0 minutes; peak exotherm temperature @258.1 minutes) demonstrates that an olefin metathesis catalyst composition comprising two metal carbene olefin metathesis catalysts enables independent control over the time required for the ROMP composition to reach a hard polymer gel relative to the exotherm time.

the peak exotherm temperature for Example 9 (30 durometer @255.0 minutes; peak exotherm temperature @258.1 minutes) demonstrates that an olefin metathesis catalyst composition comprising two metal carbene olefin metathesis catalysts enables independent control over the time required for the ROMP composition to reach a hard polymer gel relative to the exotherm time.

For example, the data in Table 10 below is a compilation of some of the data presented in Tables 5, 6, and 7 wherein individual metal carbene olefin metathesis catalysts (e.g., C627 and C871) were used to prepare olefin metathesis catalyst compositions comprising two metal carbene olefin metathesis catalysts (e.g., C627/C871). The individual metal carbene olefin metathesis catalysts (e.g., C627 and C871) each had a total monomer to catalyst ratio of 45,000:1. The olefin metathesis catalyst composition comprising two metal carbene olefin metathesis catalysts (e.g., C627/C871) had a total monomer to catalyst ratio of 45,000:1.

brate to 40° C.+/−0.5° C. in a heating bath. Catalyst Suspension 5S (4.0 grams) was combined with the resin composition to form a ROMP composition. Viscosity measurements of the ROMP composition were obtained at 40° C. using a Brookfield Viscometer (Model DV-II+Pro), spindle (Model Code S62) at a speed of 150 RPM. Time to viscosity of 30 cP is defined as the time required for the

TABLE 10

| Example | Catalyst Suspension (monomer:catalyst ratio) | Viscosity Time to 30 cP (min) | Gel Hardness Time to 10-29 Durometer (min) | Gel Hardness Time to 30-39 Durometer (min) | Gel Hardness Time to 40-70 Durometer (min) | Peak Exotherm Time to Peak Exotherm Temp. (min) |
|---|---|---|---|---|---|---|
| 1 | Catalyst Suspension (1S) C627 (45,000:1) | <1.0 | Not measured | Not measured | Not measured | <1.0 |
| 32 | Catalyst Suspension (18S) C871 @ 46,036:1 C627 @ 2,000,000:1 | <1.0 | 11 durometer @ 100.0 min | 30 durometer @ 230.0 min 32 durometer @ 270.0 min | Not measured | 319.4 |
| 10 | Catalyst Suspension (10S) C871 (45,000:1) | 262.1 | 16 durometer @ 310.0 min | 33 durometer @ 321.0 min | Not measured | 325.8 |

From Table 10, examination of the time to reach a hard polymer gel and the time to reach the peak exotherm temperature for Example 32 (30 durometer @230.0 minutes; peak exotherm temperature @319.4 minutes) compared to the time to reach a hard polymer gel and the time to reach the peak exotherm temperature for Example 10 (33 durometer @321.0 minutes; peak exotherm temperature @325.8 minutes) demonstrates that an olefin metathesis catalyst composition comprising two metal carbene olefin metathesis catalysts enables independent control over the time required for the ROMP composition to reach a hard polymer gel relative to the exotherm time.

Examples 51-53

Viscosity Measurements (Example 51—Resin composition (A) (204.0 grams) was added to a 250 mL plastic bottle. The resin composition was allowed to equilibrate to 30° C.+/−0.5° C. in a heating bath. Catalyst Suspension 5S (4.0 grams) was combined with the resin composition to form a ROMP composition. Viscosity measurements of the ROMP composition were obtained at 30° C. using a Brookfield Viscometer (Model DV-II+Pro), spindle (Model Code S62) at a speed of 150 RPM. Time to viscosity of 30 cP is defined as the time required for the ROMP composition to reach a viscosity of 30 cP following catalyzation of the resin composition. The time to viscosity of 30 cP is shown in Table 11.) (Example 52—Resin composition (A) (204.0 grams) was added to a 250 mL plastic bottle. The resin composition was allowed to equilibrate to 35° C.+/−0.5° C. in a heating bath. Catalyst Suspension 5S (4.0 grams) was combined with the resin composition to form a ROMP composition. Viscosity measurements of the ROMP composition were obtained at 35° C. using a Brookfield Viscometer (Model DV-II+Pro), spindle (Model Code S62) at a speed of 150 RPM. Time to viscosity of 30 cP is defined as the time required for the ROMP composition to reach a viscosity of 30 cP following catalyzation of the resin composition. The time to viscosity of 30 cP is shown in Table 11.) (Example 53—Resin composition (A) (204.0 grams) was added to a 250 mL plastic bottle. The resin composition was allowed to equilibrate to 40° C.+/−0.5° C. in a heating bath. Catalyst Suspension 5S (4.0 grams) was combined with the resin composition to form a ROMP composition. Viscosity measurements of the ROMP composition were obtained at 40° C. using a Brookfield Viscometer (Model DV-II+Pro), spindle (Model Code S62) at a speed of 150 RPM. Time to viscosity of 30 cP is defined as the time required for the ROMP composition to reach a viscosity of 30 cP following catalyzation of the resin composition. The time to viscosity of 30 cP is shown in Table 11).

Gel Hardness Measurements:

(Example 51—Resin Composition (A) (20.4 grams) was allowed to equilibrate to 30° C.+/−0.5° C. in a standard laboratory oven. Catalyst Suspension 5S (0.4 grams) was combined with the resin composition to form a ROMP composition. The ROMP composition was added to an aluminum pan (6 cm diameter×1.5 cm depth). Immediately following catalyzation the following oven temperature profile was started ((a) Initial Temperature=30° C.; (b) Hold at 30° C. for 3 hours; (c) After 3 hours ramp to 120° C. at 0.5° C./minute; (d) Hold at 120° C. for 2 hours; and (e) Cool to ambient temperature). The hardness of the polymer gel was periodically measured using a durometer (Model HP-10F-M) from Albuquerque Industrial Inc. Time to gel hardness of 10-29 durometer is defined as the time required for the ROMP composition to reach a gel hardness of 10-29 durometer following catalyzation of the resin composition. Time to gel hardness of 30-39 durometer is defined as the time required for the ROMP composition to reach a gel hardness of 30-39 durometer following catalyzation of the resin composition. Time to gel hardness of 40-70 durometer is defined as the time required for the ROMP composition to reach a gel hardness of 40-70 durometer following catalyzation of the resin composition. Time to gel hardness of 10-29 durometer, time to gel hardness of 30-39 durometer, time to gel hardness of 40-70 durometer is shown in Table 11.) (Example 52—Resin Composition (A) (20.4 grams) was allowed to equilibrate to 35° C.+/−0.5° C. in a standard laboratory oven. Catalyst Suspension 5S (0.4 grams) was combined with the resin composition to form a ROMP composition. The ROMP composition was added to an aluminum pan (6 cm diameter×1.5 cm depth). Immediately following catalyzation the following oven temperature profile was started ((a) Initial Temperature=35° C.; (b) Hold at 35° C. for 3 hours; (c) After 3 hours ramp to 120° C. at 0.5° C./minute; (d) Hold at 120° C. for 2 hours; and (e) Cool to ambient temperature). The hardness of the polymer gel was periodically measured using a durometer (Model HP-10F-M) from Albuquerque Industrial Inc. Time to gel hardness of 10-29 durometer is defined as the time required for the ROMP composition to reach a gel hardness of 10-29 durometer following catalyzation of the resin composition. Time to gel hardness of 30-39 durometer is defined as the time required for the ROMP composition to reach a gel hardness of 30-39 durometer following catalyzation of the resin composition. Time to gel hardness of 40-70 durometer is defined as the time required for the ROMP composition to reach a gel hardness of 40-70 durometer following catalyzation of the resin composition. Time to gel hardness of 10-29 durometer, time to gel hardness of 30-39 durometer, time to gel hardness of 40-70 durometer is shown in Table 11.) (Example 53—Resin Composition (A) (20.4 grams) was allowed to equilibrate to 40° C.+/−0.5° C. in a standard laboratory oven. Catalyst Suspension 5S (0.4 grams) was combined with the resin composition to form a ROMP composition. The ROMP composition was added to an aluminum pan (6 cm diameter×1.5 cm depth). Immediately following catalyzation the following oven temperature profile was started ((a) Initial Temperature=40° C.; (b) Hold at 40° C. for 3 hours; (c) After 3 hours ramp to 120° C. at 0.5° C./minute; (d) Hold at 120° C. for 2 hours; and (e) Cool to ambient temperature). The hardness of the polymer gel was periodically measured using a durometer (Model HP-10F-M) from Albuquerque Industrial Inc. Time to gel hardness of 10-29 durometer is defined as the time required for the ROMP composition to reach a gel hardness of 10-29 durometer following catalyzation of the resin composition. Time to gel hardness of 30-39 durometer is defined as the time required for the ROMP composition to reach a gel hardness of 30-39 durometer following catalyzation of the resin composition. Time to gel hardness of 40-70 durometer is defined as the time required for the ROMP composition to reach a gel hardness of 40-70 durometer following catalyzation of the resin composition. Time to gel hardness of 10-29 durometer, time to gel hardness of 30-39 durometer, time to gel hardness of 40-70 durometer is shown in Table 11).

Time to Peak Exotherm Temperature Measurements:

For each Example 51-53, time to peak exotherm temperature of the ROMP compositions was measured from the samples prepared to measure the gel hardness measurements as described above. The peak exotherm temperature was measured using an Omega Data Logger Thermometer (Model HH309A) affixed with a Type K thermocouple, where the thermocouple was attached to the bottom of the aluminum pan. Time to peak exotherm temperature is defined as the time required for the ROMP composition to reach a peak exotherm temperature following catalyzation of the resin composition. The time to peak exotherm temperature is shown in Table 11.

As shown in Table 11 and discussed supra adjustment of the temperature of the resin composition and/or mold does not enable independent control over the time required for a prior art ROMP composition to reach a hard polymer gel relative to the exotherm time. In other words, following the catalyzation of a cyclic olefin resin composition with a single metal carbene olefin metathesis catalyst to form a prior art ROMP composition, the time for the prior art ROMP composition to reach a hard polymer gel and the time for the prior art ROMP composition to exotherm both decrease when the composition temperature and/or mold temperature is increased. Conversely, following the catalyzation of a cyclic olefin resin composition with a single metal carbene olefin metathesis catalyst to form a prior art ROMP composition, the time for the prior art ROMP composition to reach a hard polymer gel and the time for the prior art ROMP composition to exotherm both increase when the composition temperature and/or mold temperature is decreased.

TABLE 11

| Example | Resin Temperature (° C.) | Viscosity Time to 30 cP (min) | Gel Hardness Time to 10-29 Durometer (min) | Gel Hardness Time to 30-39 Durometer (min) | Gel Hardness Time to 40-70 Durometer (min) | Peak Exotherm Time to Peak Exotherm Temp. (min) |
|---|---|---|---|---|---|---|
| 51 | 30 | 1.6 | 23 durometer @ 14.5 min | 31 durometer @ 15.5 min | 42 durometer @ 18.0 min 50 durometer @ 21.5 min | 23.3 |
| 52 | 35 | 0.83 | 20 durometer @ 8.5 min 25 durometer @ 8.8 min | Not measured | Not measured | 9.3 |
| 53 | 40 | 0.58 | 20 durometer @ 3.5 min | 32 durometer @ 4.0 min | Not measured | 4.2 |

Examples 54-57

Viscosity Measurements (Example 54—Resin composition (A) (204.0 grams) was added to a 250 mL plastic bottle. The resin composition was allowed to equilibrate to 30° C.+/−0.5° C. in a heating bath. Catalyst Suspension 5S (4.0 grams) was combined with the resin composition to form a ROMP composition. Viscosity measurements of the ROMP composition were obtained at 30° C. using a Brookfield Viscometer (Model DV-II+Pro), spindle (Model Code S62) at a speed of 150 RPM. Time to viscosity of 30 cP is defined as the time required for the ROMP composition to reach a viscosity of 30 cP following catalyzation of the resin composition. The time to viscosity of 30 cP is shown in Table 12.) (Example 55—Resin composition (A) (204.0 grams) containing triphenylphosphine (0.025 phr) was added to a 250 mL plastic bottle. The resin composition was allowed to equilibrate to 30° C.+/− 0.5° C. in a heating bath. Catalyst Suspension 5S (4.0 grams) was combined with the resin composition to form a ROMP composition. Viscosity measurements of the ROMP composition were obtained at 30° C. using a Brookfield Viscometer (Model DV-II+Pro), spindle (Model Code S62) at a speed of 150 RPM. Time to viscosity of 30 cP is defined as the time required for the ROMP composition to reach a viscosity of 30 cP following catalyzation of the resin composition. The time to viscosity of 30 cP is shown in Table 12.) (Example 56—Resin composition (A) (204.0 grams) containing triphenylphosphine (0.05 phr) was added to a 250 mL plastic bottle. The resin composition was allowed to equilibrate to 30° C.+/−0.5° C. in a heating bath. Catalyst Suspension 5S (4.0 grams) was combined with the resin composition to form a ROMP composition. Viscosity measurements of the ROMP composition were obtained at 30° C. using a Brookfield Viscometer (Model DV-II+Pro), spindle (Model Code S62) at a speed of 150 RPM. Time to viscosity of 30 cP is defined as the time required for the ROMP composition to reach a viscosity of 30 cP following catalyzation of the resin composition. The time to viscosity of 30 cP is shown in Table 12). (Example 57—Resin composition (A) (204.0 grams) containing triphenylphosphine (1.0 phr) was added to a 250 mL plastic bottle. The resin composition was allowed to equilibrate to 30° C.+/−0.5° C. in a heating bath. Catalyst Suspension 5S (4.0 grams) was combined with the resin composition to form a ROMP composition. Viscosity measurements of the ROMP composition were obtained at 30° C. using a Brookfield Viscometer (Model DV-II+Pro), spindle (Model Code S62) at a speed of 150 RPM. Time to viscosity of 30 cP is defined as the time required for the ROMP composition to reach a viscosity of 30 cP following catalyzation of the resin composition. The time to viscosity of 30 cP is shown in Table 12).

Gel Hardness Measurements:

(Example 54—Resin Composition (A) (20.4 grams) was allowed to equilibrate to 30° C.+/−0.5° C. in a standard laboratory oven. Catalyst Suspension 5S (0.4 grams) was combined with the resin composition to form a ROMP composition. The ROMP composition was added to an aluminum pan (6 cm diameter×1.5 cm depth). Immediately following catalyzation the following oven temperature profile was started ((a) Initial Temperature=30° C.; (b) Hold at 30° C. for 3 hours; (c) After 3 hours ramp to 120° C. at 0.5° C./minute; (d) Hold at 120° C. for 2 hours; and (e) Cool to ambient temperature). The hardness of the polymer gel was periodically measured using a durometer (Model HP-10F-M) from Albuquerque Industrial Inc. Time to gel hardness of 10-29 durometer is defined as the time required for the ROMP composition to reach a gel hardness of 10-29 durometer following catalyzation of the resin composition. Time to gel hardness of 30-39 durometer is defined as the time required for the ROMP composition to reach a gel hardness of 30-39 durometer following catalyzation of the resin composition. Time to gel hardness of 40-70 durometer is defined as the time required for the ROMP composition to reach a gel hardness of 40-70 durometer following catalyzation of the resin composition. Time to gel hardness of 10-29 durometer, time to gel hardness of 30-39 durometer, time to gel hardness of 40-70 durometer is shown in Table 12.) (Example 55—Resin Composition (A) (20.4 grams) containing triphenylphosphine (0.025 phr) was allowed to equilibrate to 30° C.+/−0.5° C. in a standard laboratory oven. Catalyst Suspension 5S (0.4 grams) was combined with the resin composition to form a ROMP composition. The ROMP composition was added to an aluminum pan (6 cm diameter×1.5 cm depth). Immediately following catalyzation the following oven temperature profile was started ((a) Initial Temperature=30° C.; (b) Hold at 30° C. for 3 hours; (c) After 3 hours ramp to 120° C. at 0.5° C./minute; (d) Hold at 120° C. for 2 hours; and (e) Cool to ambient temperature). The hardness of the polymer gel was periodically measured using a durometer (Model HP-10F-M) from Albuquerque Industrial Inc. Time to gel hardness of 10-29 durometer is defined as the time required for the ROMP composition to reach a gel hardness of 10-29 durometer following catalyzation of the resin composition. Time to gel hardness of 30-39 durometer is defined as the time required for the ROMP composition to reach a gel hardness of 30-39 durometer following catalyzation of the resin composition. Time to gel hardness of 40-70 durometer is defined as the time required for the ROMP composition to reach a gel hardness of 40-70 durometer following catalyzation of the resin composition. Time to gel hardness of 10-29 durometer, time to gel hardness of 30-39 durometer, time to gel hardness of 40-70 durometer is shown in Table 12.) (Example 56—Resin Composition (A) (20.4 grams) containing triphenylphosphine (0.05 phr) was allowed to equilibrate to 30° C.+/−0.5° C. in a standard laboratory oven. Catalyst Suspension 5S (0.4 grams) was combined with the resin composition to form a ROMP composition. The ROMP composition was added to an aluminum pan (6 cm diameter×1.5 cm depth). Immediately following catalyzation the following oven temperature profile was started ((a) Initial Temperature=30° C.; (b) Hold at 30° C. for 3 hours; (c) After 3 hours ramp to 120° C. at 0.5° C./minute; (d) Hold at 120° C. for 2 hours; and (e) Cool to ambient temperature). The hardness of the polymer gel was periodically measured using a durometer (Model HP-10F-M) from Albuquerque Industrial Inc. Time to gel hardness of 10-29 durometer is defined as the time required for the ROMP composition to reach a gel hardness of 10-29 durometer following catalyzation of the resin composition. Time to gel hardness of 30-39 durometer is defined as the time required for the ROMP composition to reach a gel hardness of 30-39 durometer following catalyzation of the resin composition. Time to gel hardness of 40-70 durometer is defined as the time required for the ROMP composition to reach a gel hardness of 40-70 durometer following catalyzation of the resin composition. Time to gel hardness of 10-29 durometer, time to gel hardness of 30-39 durometer, time to gel hardness of 40-70 durometer is shown in Table 12). (Example 57—Resin Composition (A) (20.4 grams) containing triphenylphosphine (1.0 phr) was allowed to equilibrate to 30° C.+/−0.5° C. in a standard laboratory oven. Catalyst Suspension 5S (0.4 grams) was combined with the resin composition to form a ROMP composition. The ROMP composition was added to an aluminum pan (6 cm diameter×1.5 cm depth). Immediately following catalyzation the following oven temperature profile was started ((a) Initial Temperature=30° C.; (b) Hold at 30° C. for 3 hours; (c) After 3 hours ramp to 120° C. at 0.5° C./minute; (d) Hold at 120° C. for 2 hours; and (e) Cool to ambient temperature). The hardness of the polymer gel was periodically measured using a durometer (Model HP-10F-M) from Albuquerque Industrial Inc. Time to gel hardness of 10-29 durometer is defined as the time required for the ROMP composition to reach a gel hardness of 10-29 durometer following catalyzation of the resin composition. Time to gel hardness of 30-39 durometer is defined as the time required for the ROMP composition to reach a gel hardness of 30-39 durometer following catalyzation of the resin composition. Time to gel hardness of 40-70 durometer is defined as the time required for the ROMP composition to reach a gel hardness of 40-70 durometer following catalyzation of the resin composition. Time to gel hardness of 10-29 durometer, time to gel hardness of 30-39 durometer, time to gel hardness of 40-70 durometer is shown in Table 12).

Time to Peak Exotherm Temperature Measurements:

For each Example 54-57, time to peak exotherm temperature of the ROMP compositions was measured from the samples prepared to measure the gel hardness measurements as described above. The peak exotherm temperature was measured using an Omega Data Logger Thermometer (Model HH309A) affixed with a Type K thermocouple, where the thermocouple was attached to the bottom of the aluminum pan. Time to peak exotherm temperature is defined as the time required for the ROMP composition to reach a peak exotherm temperature following catalyzation of the resin composition. The time to peak exotherm temperature is shown in Table 12.

As shown in Table 12 and discussed supra the use of exogenous inhibitor (e.g., triphenylphosphine) in a prior art ROMP composition does not enable independent control over the time required for the prior art ROMP composition to reach a hard polymer gel relative to the exotherm time. In other words, following the formation of a prior art ROMP composition, the time for the prior art ROMP composition to reach a hard polymer gel and the time for the prior art ROMP composition to exotherm both increase when the concentration of exogenous inhibitor is increased. Conversely, following the formation of a prior art ROMP composition, the time for the prior art ROMP composition to reach a hard polymer gel and the time for the prior art ROMP composition to exotherm both decrease when the concentration of exogenous inhibitor is decreased.

plys of unidirectional glass fabric reinforcement material (12a, 12b). A first piece of resin flow control structure (Nidacore Matline 400) (14) having dimensions 6"×12.5" was placed on top of the peel ply (13) so that one end of the resin flow control structure (14) was positioned near one end of the unidirectional glass fabric reinforcement material (12a, 12b). Primary resin distribution media (Colbond Enkafusion 7001) (15) having dimensions 12"×32" was placed on top of the composite laminate. A second piece of resin flow control structure (Nidacore Matline 400) (16), having dimensions 6"×12.5" was placed on top of the primary resin distribution media (15) and aligned such that the second piece of resin flow control structure (16) is stacked on top of the first piece of resin flow control structure (14) and the primary resin distribution media (15) is positioned between the first and second pieces of resin flow control structure (14, 16). Secondary resin distribution media (Colbond Enkachannel) (17a, 17b) having dimensions 2"×12" were positioned on top of the primary resin distribution media (15) at opposite ends of the composite layup corresponding to the position of inlet port (18) and outlet port (19),

TABLE 12

| Example | Triphenylphosphine (phr) | Viscosity Time to 30 cP (min) | Gel Hardness Time to 10-29 Durometer (min) | Gel Hardness Time to 30-39 Durometer (min) | Gel Hardness Time to 40-70 Durometer (min) | Peak Exotherm Time to Peak Exotherm (min) |
|---|---|---|---|---|---|---|
| 54 | 0 | 1.6 | 23 durometer @ 14.5 min | 31 durometer @ 15.5 min | 42 durometer @ 18.0 min 50 durometer @ 21.5 min | 23.3 |
| 55 | 0.025 | 2.9 | 14 durometer @ 18.0 min 25 durometer @ 22.0 min | 32 durometer @ 24.0 min | Not measured | 26.6 |
| 56 | 0.05 | 4.3 | 15 durometer @ 30 min 25 durometer @ 8.8 min | 30 durometer @ 33.0 min 37 durometer @ 39.0 min | Not measured | 41.0 |
| 57 | 1.0 | 21.9 | 15 durometer @ 125.0 min 25 durometer at 160.0 min | 30 durometer @ 190.0 min | Not measured | 227.3 |

Example 58

The composite laminate of this Example 58 was constructed as follows (FIG. 1). The bottom layer of the composite laminate consisted of a sealed and release-treated mold surface (10) made of aluminum having dimensions 36"×36". Three thermocouples (11a, 11b, 11c) were affixed to the mold surface (10). A first layer of unidirectional glass fabric reinforcement material (Vectorply E-LT1800) (12a) consisting of fifty plys, each ply having dimensions 12.5"×20", was positioned on top of the mold surface (10). One thermocouple (11d) was affixed to the top surface of the first layer of unidirectional glass fabric reinforcement material (12a). A second layer of unidirectional glass fabric reinforcement material (Vectorply E-LT1800) (12b) consisting of fifty plys, each ply having dimensions 12.5"×20", were positioned on top of the first layer of unidirectional glass fabric reinforcement material (12a), such that the thermocouple (11d) was positioned between the first and second layers of unidirectional glass fabric reinforcement material (12a, 12b). Two thermocouples (11e, 11f) were affixed to the top surface of the second layer of unidirectional glass fabric reinforcement material (12b). A peel ply (Richmond Aircraft Products A8888 polyamide) (13) was placed over the 100 respectively. A vacuum bag (Richmond Air Craft Products Stretch-Vac-2000) (not shown) was placed over the completed layup. An inlet port (18) and outlet port (19) were installed through the vacuum bag (not shown) and positioned on top of the respective secondary resin distribution media (17a, 17b). The vacuum bag (not shown) was affixed to the mold surface using sealant tape (Airtech AT200-Y tape) and a vacuum was applied to the outlet port (19) to evacuate air from the layup.

The composite laminate (FIG. 1) was placed on a heating table set at 35° C. The composite laminate was covered with flame resistant blankets, and the composite laminate was allowed to equilibrate to 35° C. as measured by thermocouples (11a-11f). Resin Composition (B) (8,368 grams) was combined with an olefin metathesis catalyst composition (160 grams) comprising two metal carbene olefin metathesis catalysts, where the catalyst composition comprised C771 (monomer to catalyst ratio 67,500:1) and C827 (monomer to catalyst ratio 135,000:1) suspended in mineral oil (Crystal Plus 70 FG) containing 2 phr Cab-o-sil TS610, where the catalyst suspension had a total monomer to catalyst ratio of 45,000:1. The resin composition (8,368 grams) and catalyst suspension (160 grams) were at ambient temperature (20-25° C.) immediately prior to mixing. The catalyzed resin composition was introduced into the composite laminate with complete impregnation of the preform (layup). A portion of the catalyzed resin composition (20 grams) was placed in an aluminum pan (6 cm diameter×1.5 cm depth) and the aluminum pan was placed on the heating table and covered with the flame resistant blankets. At 115 minutes after catalyzation (mold temperature 35° C.), the 20 gram catalyzed resin composition had formed a hard polymer gel having a hardness of 30 durometer. The hardness of the polymer gel was measured using a durometer (Model HP-10F-M) from Albuquerque Industrial Inc. At 115 minutes after catalyzation (mold temperature 35° C.), the heating table temperature was increased from 35° C. to 120° C. at a rate of 0.5° C. per minute and subsequently held at a temperature of 120° C. for two hours. After two hours the heating table was turned off and the molded composite laminate was allowed to cool to ambient temperature (20-25° C.), and subsequently demolded. The external surfaces of the molded composite laminate were visually inspected for structural defects and imperfections (e.g., voids, bubbles, and/or resin to substrate delamination, poor resin-reinforcement interface, etc.). Upon visual examination, no structural defects or imperfections were observed in the molded composite laminate obtained from Example 58.

Example 59

Following the procedure in Example 58, a composite laminate (FIG. 1) was prepared and allowed to equilibrate to 35° C. as measured by thermocouples (11a-11f). Resin Composition (B) (8,368 grams) was combined with a single metal carbene olefin metathesis catalyst in the form of a suspension (160 grams), where the single metal carbene olefin metathesis catalyst was C771 (monomer to catalyst ratio 45,000:1) suspended in mineral oil (Crystal Plus 70 FG) containing 2 phr Cab-o-sil TS610, where the catalyst suspension had a total monomer to catalyst ratio of 45,000:1. The resin composition (8,368 grams) and catalyst suspension (160 grams) were at ambient temperature (20-25° C.) immediately prior to mixing. The catalyzed resin composition was introduced into the composite laminate with complete impregnation of the preform (layup). A portion of the catalyzed resin composition (20 grams) was placed in an aluminum pan (6 cm diameter×1.5 cm depth) and the aluminum pan was placed on the heating table and covered with the flame resistant blankets. At 115 minutes after catalyzation (mold temperature 35° C.), the 20 gram catalyzed resin composition was at a string gel and therefore had not formed a hard polymer gel. At 115 minutes after catalyzation (mold temperature 35° C.), the heating table temperature was increased from 35° C. to 120° C. at a rate of 0.5° C. per minute and subsequently held at a temperature of 120° C. for two hours. After two hours the heating table was turned off and the molded composite laminate was allowed to cool to ambient temperature (20-25° C.), and subsequently demolded. The external surfaces of the molded composite laminate were visually inspected for structural defects and imperfections (e.g., voids, bubbles, and/or resin to substrate delamination, poor resin-reinforcement interface, etc.). Upon visual examination, the top surface of the molded composite laminate obtained from Example 59 possessed defects in the form of a whitened appearance, compared to the molded composite laminate obtained from Example 58, which did not possess such defects. Without being bound by theory, this white color or appearance (i.e., defect) is indicative of diminished compatibility between the resin matrix and the glass reinforcement, ultimately resulting in less than desirable properties. Without being bound by theory it is thought that this type of defect (e.g., whitened surface appearance/color) is the result of liquid cyclic olefin monomer (e.g., DCPD) being volatilized during the exotherm of the ROMP composition, particularly where the liquid cyclic olefin monomer did not reach a uniformly formed hard polymer gel throughout the different regions/sections of the mold or throughout the ROMP composition before the ROMP composition began to exotherm.

Example 60

Figure 2:
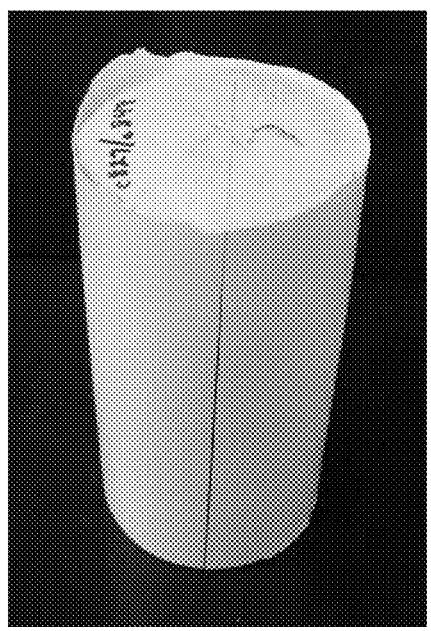
FIG. 2 are photographs of an article made from a cyclic olefin resin composition catalyzed with an olefin metathesis catalyst composition comprising two metal carbene olefin metathesis catalysts, according to Example 60, showing the absence of defects.
Figure 2:
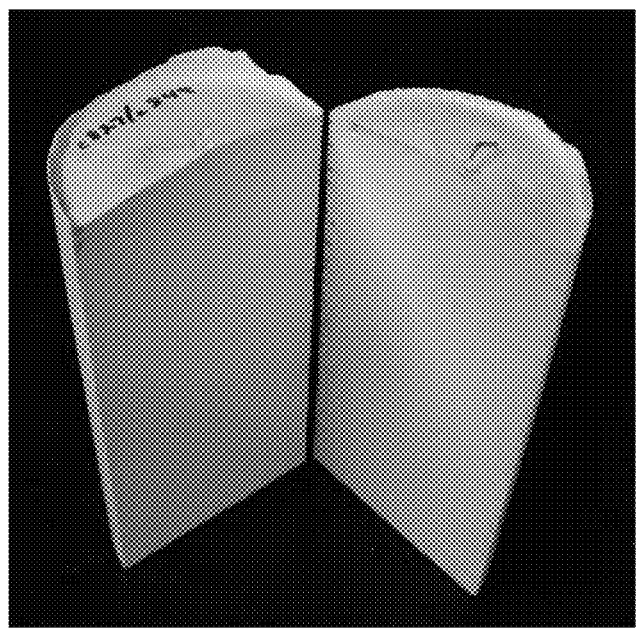

K25 hollow glass spheres (254 grams), available from 3M, were added to Resin Composition (C) (847 grams) to form a filled resin composition, which was mixed and subsequently degassed under vacuum. The filled resin composition (1101 grams) was combined with a catalyst composition (16.5 grams) comprising two metal carbene olefin metathesis catalysts, where the two metal carbene olefin metathesis catalysts were C848 (monomer to catalyst ratio 120,000:1) and C827 (monomer to catalyst ratio 120,000:1) suspended in mineral oil (Crystal Plus 70 FG) containing 2 phr Cab-o-sil TS610, where the catalyst suspension had a total monomer to catalyst ratio of 60,000:1. The filled resin composition and catalyst suspension were at ambient temperature (20-25° C.) immediately prior to mixing. The catalyzed resin composition was poured into a cylindrical aluminum mold (4" inner diameter and 9" height), where the mold was at ambient temperature (20-25° C.). At 90 minutes after catalyzation the aluminum mold was heated using a heating blanket. The catalyzed resin composition had an exotherm time of 103 minutes after catalyzation. The molded article was allowed to cool to ambient temperature and subsequently demolded. Photographs of the molded article are shown in FIG. 2, showing the absence of defects in the molded article.

Example 61

Figure 3:
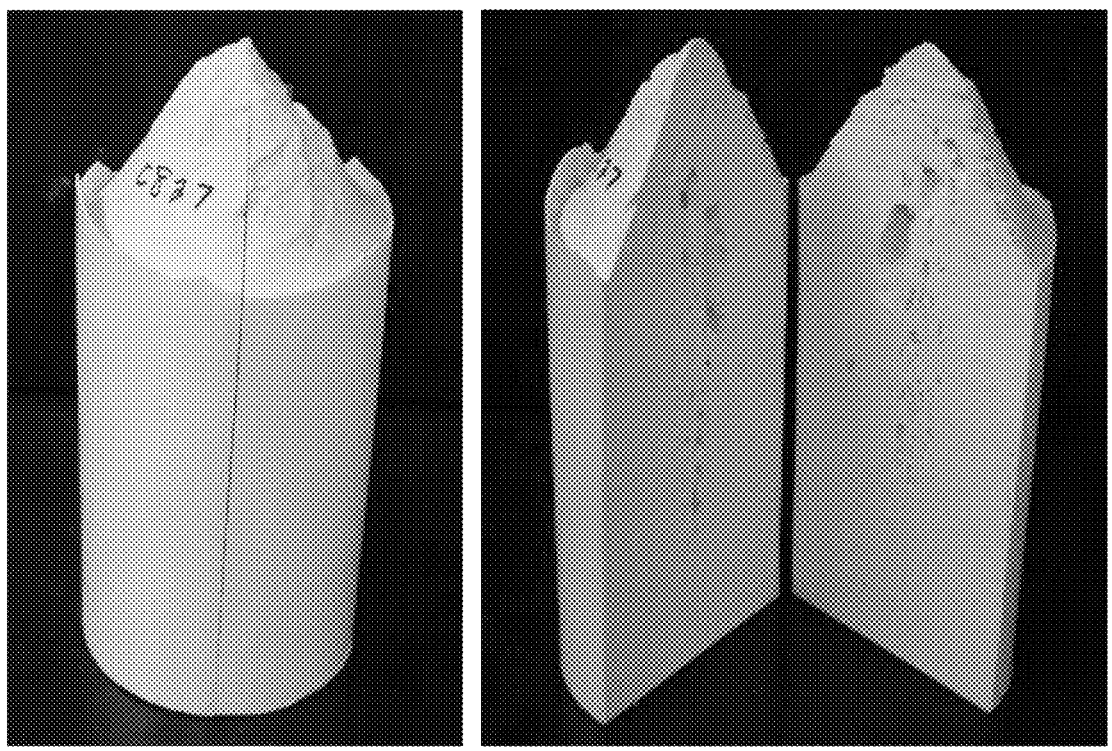
FIG. 3 are photographs of an article made from a cyclic olefin resin composition catalyzed with a single metal carbene olefin metathesis catalyst, according to Example 61, showing the presence of defects.

K25 hollow glass spheres (254 grams), available from 3M, were added to Resin Composition (C) (847 grams) to form a filled resin composition, which was mixed and subsequently degassed under vacuum. The filled resin composition (1101 grams) was combined with a single metal carbene olefin metathesis catalyst in the form of a suspension (16.5 grams), where the single metal carbene olefin metathesis catalyst was C827 (monomer to catalyst ratio 60,000:1) suspended in mineral oil (Crystal Plus 70 FG) containing 2 phr Cab-o-sil TS610, where the catalyst suspension had a total monomer to catalyst ratio of 60,000:1. The filled resin composition and catalyst suspension were at ambient temperature (20-25° C.) immediately prior to mixing. The catalyzed resin composition was poured into a cylindrical aluminum mold (4" inner diameter and 9" height), where the mold was at ambient temperature (20-25° C.). At 90 minutes after catalyzation the aluminum mold was heated using a heating blanket. The catalyzed resin composition had an exotherm time of 101 minutes after catalyzation. The molded article was allowed to cool to ambient temperature and subsequently demolded. Photographs of molded article are shown in FIG. 3, showing the presence of defects in the molded article. Without being bound by theory it is thought that these defects are the result of liquid cyclic olefin monomer (e.g., DCPD) being volatilized during the exotherm of the ROMP composition, particularly where the liquid cyclic olefin monomer did not reach a uniformly formed hard polymer gel throughout the different regions/ sections of the mold or throughout the ROMP composition before the ROMP composition began to exotherm.

Example 62

An electrolytic cell cover having a weight of approximately 880 lbs was molded from a resin composition polymerized with a single metal carbene olefin metathesis catalyst. The resin composition comprising (i) Ultrene® 99 Polymer Grade DCPD (containing 6% tricyclopentadiene); (ii) 2 phr Ethanox® 4702; and (iii) 4 phr Kraton® G1651H. The single metal carbene olefin metathesis catalyst was ruthenium catalyst C827 (monomer to catalyst ratio 60,000:1) suspended in mineral oil (Crystal Plus 500FG) containing 2 phr Cab-o-sil TS610. The electrolytic cell cover was molded in a composite mold. The mold comprised two composite sections, one male section to define the interior (core) of the electrolytic cell cover and one female section to define the exterior (cavity) of the electrolytic cell cover. Both the male and female sections of the mold contained heating/cooling channels for the circulation of liquid (water/propylene glycol mixture) to control the mold temperature. The mold had a width of approximately 5 feet, a length of approximately 8 feet, and a height of approximately 4 feet. The two mold sections (male and female) were held together by a series of latch action manual clamps. The mold was gated at the bottom, where the top of the electrolytic cell cover is defined and a plurality of vents (4) were distributed on the top of the mold, where the flanged base of the electrolytic cell cover is defined. The resin composition was combined with a single mix head with the catalyst suspension at 100:2 volume ratio (resin composition:catalyst suspension) and injected into the mold by the use of a three component reaction injection molding (RIM) machine at a continuous rate of approximately 131.6 lb/min at an injection pressure of 800-1200 psig. The catalyst suspension was injected from the reaction injection molding (RIM) machine at a continuous rate of approximately 2.7 lb/min at an injection pressure 800-1200 psig. The mold was inclined at less than 10 degrees compound angle. The female section of the mold (cavity) was 93° F. and the male section of the mold (core) was 73° F. The resin composition was 70° F. in the day tank immediately prior to injection. The catalyst suspension was 90° F. in the catalyst dispensing tank immediately prior to injection. The mold was filled in 6 minutes 30 seconds (shot time). The time to exotherm (smoke time) for the reactive formulation was observed at 42 minutes 34 seconds. The molded electrolytic cell cover was demolded after 57 minutes 0 seconds and allowed to cool to ambient temperature. Using a hand held portable light source, the translucent molded electrolytic cell cover was visually inspected for structural defects and imperfections; surface (external) imperfections (e.g., bubbles or unwanted voids); and subsurface (internal) imperfections (e.g., bubbles or unwanted voids). No structural imperfections, surface (external) imperfections, or subsurface (internal) imperfections were observed.

Example 63

Following the general procedure of Example 62, an electrolytic cell cover having a weight of approximately 880 lbs was molded from a resin composition polymerized with a cyclic olefin catalyst composition comprising two metal carbene olefin metathesis catalysts. The resin composition was (i) Ultrene® 99 Polymer Grade DCPD (containing 6% tricyclopentadiene); (ii) 2 phr Ethanox® 4702; and (iii) 4 phr Kraton® G1651H. The cyclic olefin catalyst composition was a mixture of two metal carbene olefin metathesis catalysts, where the catalyst composition comprised C827 (monomer to catalyst ratio 60,000:1) and C848 (monomer to catalyst ratio 500,000:1) suspended in mineral oil (Crystal Plus 500 FG) containing 2 phr Cab-o-sil TS610. The resin composition was injected into the mold at a continuous rate of approximately 127.8 lb/min at an injection pressure of 800-1200 psig and the catalyst suspension was injected at a continuous rate of approximately 2.5 lb/min at an injection pressure 800-1200 psig. The female section of the mold (cavity) was 95° F. and the male section of the mold (core) was 94° F. The resin composition was 76° F. in the day tank immediately prior to injection. The catalyst suspension was 78° F. in the catalyst dispensing tank immediately prior to injection. The mold was filled in 6 minutes 26 seconds (shot time). The time to exotherm (smoke time) for the reactive formulation was observed at 23 minutes 0 seconds. The molded electrolytic cell cover was demolded after 49 minutes 0 seconds and allowed to cool to ambient temperature. Using a hand held portable light source, the translucent molded electrolytic cell cover was visually inspected for structural defects and imperfections; surface (external) imperfections (e.g., bubbles or unwanted voids); and subsurface (internal) imperfections (e.g., bubbles or unwanted voids). No structural imperfections, surface (external) imperfections, or subsurface (internal) imperfections were observed. It is noteworthy that under similar molding conditions and using the same cyclic olefin resin composition, the time required to make an article (e.g., electrolytic cell cover) was reduced when an olefin metathesis catalyst composition comprising two metal carbene olefin metathesis catalysts was used in place of a single metal carbene olefin metathesis catalyst. This reduction in time (reduction in cycle time) provides for an economic advantage in that more articles (e.g., electrolytic cell covers) can be made during the same time period (e.g., 8 hour work day) when an olefin metathesis catalyst composition comprising at least two metal carbene olefin metathesis catalysts is used in place of a single metal carbene olefin metathesis catalyst.

The claimed invention is:
1. A composition comprising at least two metal carbene olefin metathesis catalysts, wherein the at least two metal carbene olefin metathesis catalysts are structurally different from each other, and wherein one of the at least two metal carbene olefin metathesis catalysts is represented by the Formula (V),

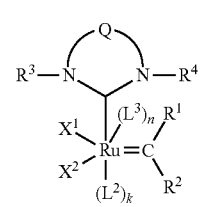

wherein, Q is a two-atom linkage having the structure —$CR^{11}R^{12}$—$CR^{13}R^{14}$— or —$CR^{11}$=$CR^{13}$—;
$R^{11}$, $R^{12}$, $R^{13}$, and $R^{14}$ are independently selected from the group consisting of hydrogen, hydrocarbyl, substituted hydrocarbyl, heteroatom-containing hydrocarbyl, and substituted heteroatom-containing hydrocarbyl;
$R^3$ and $R^4$ are the same and are each unsubstituted phenyl or phenyl substituted with up to three substituents selected from the group consisting of $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, and halide;

$L^2$ and $L^3$ are neutral electron donor ligands;

n is 0 or 1;

k is 0 or 1;

$X^1$ and $X^2$ are anionic ligands; and $R^1$ is hydrogen and $R^2$ is selected from the group consisting of $C_1$-$C_{20}$ alkyl, $C_2$-$C_{20}$ alkenyl and $C_5$-$C_{24}$ aryl; or $R^1$ and $R^2$ can be taken together to form an indenylidene moiety.

2. The composition according to claim 1, further comprising a resin composition comprising at least one cyclic olefin.

3. The composition according to claim 2, further comprising an optional exogenous inhibitor.

4. The composition according to claim 3, further comprising at least one substrate material.

5. The composition according to claim 4, further comprising at least one adhesion promoter.

6. An article of manufacture comprising the composition according to claim 2.

7. The article of manufacture according to claim 6, further comprising an optional exogenous inhibitor.

8. The article of manufacture according to claim 7, further comprising at least one substrate material.

9. The article of manufacture according to claim 8, further comprising at least one adhesion promoter.

10. A method of making an article of manufacture comprising, subjecting the composition according to claim 2 to conditions effective to polymerize the composition.

11. The method of making an article of manufacture according to claim 10, wherein the composition further comprises an optional exogenous inhibitor.

12. The method of making an article of manufacture according to claim 11, wherein the composition further comprises at least one substrate material.

13. The method of making an article of manufacture of claim 12, wherein the composition further comprises at least one adhesion promoter.

14. The composition according to claim 1, wherein one of the at least two metal carbene olefin metathesis catalysts is represented by the Formula (VII),

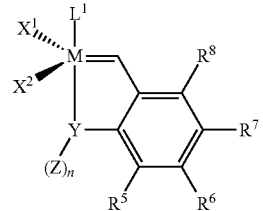

(VII)

wherein, M is the Group 8 transition metal Ru;

$L^1$ is a neutral electron donor ligands;

$X^1$ and $X^2$ are independently anionic ligands;

Y is O;

n is 1;

$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, and borate; and Z is a group selected from the group consisting of hydrogen, alkyl, aryl, functionalized alkyl, functionalized aryl where the functional group(s) may independently be one or more or the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl.

\* \* \* \* \*